United States Patent
Gurpinar et al.

(10) Patent No.: US 7,739,089 B2
(45) Date of Patent: *Jun. 15, 2010

(54) INTEGRATED RESERVOIR OPTIMIZATION

(75) Inventors: Omer M. Gurpinar, Denver, CO (US);
David J. Rossi, Katy, TX (US); Vidya B. Verma, Sugar Land, TX (US); Philip W. Pantella, Calgary (CA)

(73) Assignee: Schlumberger Technology Corporation, Houston, TX (US)

( * ) Notice: Subject to any disclaimer, the term of this patent is extended or adjusted under 35 U.S.C. 154(b) by 228 days.

This patent is subject to a terminal disclaimer.

(21) Appl. No.: 11/978,062

(22) Filed: Oct. 26, 2007

(65) Prior Publication Data

US 2008/0288226 A1 Nov. 20, 2008

Related U.S. Application Data

(63) Continuation of application No. 11/714,033, filed on Mar. 5, 2007, which is a continuation of application No. 11/070,457, filed on Mar. 2, 2005, now Pat. No. 7,478,024, which is a continuation of application No. 09/659,951, filed on Sep. 12, 2000, now Pat. No. 6,980,940.

(60) Provisional application No. 60/183,836, filed on Feb. 22, 2000.

(51) Int. Cl.
G06F 7/48 (2006.01)

(52) U.S. Cl. .................. 703/10; 702/13; 166/250.16

(58) Field of Classification Search .............. 703/10; 702/2, 13; 166/250.13, 250.15, 250.16, 313; 166/372; 340/853.2; 700/282; 367/73; 435/262

See application file for complete search history.

(56) References Cited

U.S. PATENT DOCUMENTS 4,633,954 A * 1/1987 Dixon et al. ............. 166/372

(Continued)

FOREIGN PATENT DOCUMENTS

JP 6167406 6/1994

(Continued)

OTHER PUBLICATIONS

Soleng, H. Oil Resrvoir Production Forecasting with Uncertainty Estimation Using Genetic Algorithms, Proceedings of the 1999 Congress on Evolutionary Computation, vol. 2, Jul. 1999, pp. 1217-1223.*

(Continued)

Primary Examiner—Russell Frejd

(57) ABSTRACT

The invention relates to a method of performing a numerical model study to accurately forecast a production of a well in a reservoir. The method involves determining a property distribution of the reservoir using a three dimensional (3D) structure and property model for providing an estimate of a 3D structure, wherein the estimate of the 3D structure includes the property distribution, determining a grid system, including a grid and layering mechanism that is superimposed on said 3D structure and said property distribution associated with the digital 3D structure and property model, using a 3D simulator grid system, and determining a rock model using an initial 3D reservoir simulator in response to the estimate of the property distribution associated with the digital 3D structure and property model and the grid system associated with the 3D simulator grid system, wherein the rock model is used to accurately forecast the production of the well in the reservoir.

45 Claims, 24 Drawing Sheets

U.S. PATENT DOCUMENTS

| | | | | |
|---|---|---|---|---|
| 4,757,314 | A * | 7/1988 | Aubin et al. | 340/853.2 |
| 4,969,130 | A * | 11/1990 | Wason et al. | 367/73 |
| 5,132,904 | A * | 7/1992 | Lamp | 700/282 |
| 5,305,209 | A | 4/1994 | Stein | |
| 5,363,094 | A | 11/1994 | Staron | |
| 5,465,323 | A | 11/1995 | Mallet | |
| 5,467,823 | A | 11/1995 | Babour | |
| 5,586,082 | A * | 12/1996 | Anderson et al. | 367/73 |
| 5,642,051 | A | 6/1997 | Babour | |
| 5,706,896 | A * | 1/1998 | Tubel et al. | 166/313 |
| 5,730,219 | A | 3/1998 | Tubel | |
| 5,732,776 | A * | 3/1998 | Tubel et al. | 166/250.15 |
| 5,764,515 | A * | 6/1998 | Guerillot et al. | 702/2 |
| 5,798,982 | A * | 8/1998 | He et al. | 367/73 |
| 5,803,167 | A | 9/1998 | Bussear | |
| 5,829,520 | A | 11/1998 | Johnson | |
| 5,841,280 | A | 11/1998 | Yu | |
| 5,975,204 | A * | 11/1999 | Tubel et al. | 166/250.15 |
| 5,992,519 | A * | 11/1999 | Ramakrishnan et al. | 166/250.15 |

FOREIGN PATENT DOCUMENTS

| | | |
|---|---|---|
| JP | 9046833 | 2/1997 |
| WO | 97/38207 | 10/1997 |

OTHER PUBLICATIONS

Norris, et al.; "Improved reservoir characterization and management of a mature oil field via integrated team approach"; SPE Annual Technical Conference and Exhibition, Dallas, TX, Oct. 1995, pp. 533-547; SPE 30754.

Bastian, et al.; "A case history of an integrated study of a mature carbonate waterflood"; SPE Annual Technical Conference and Exhibition, Villahermosa, Mexico, Mar. 1998, pp. 145-154; SPE 39841.

Poe, et al.; "Production data analysis and forecasting using a comprehensive analysis system"; SPE Mid-Continent Operations Symposium, Oklahoma City, OK, Mar. 1999; SPE 52178.

Chan, et al.; "Comprehensive reservoir study and management through effective geological and engineering teamwork"; 60th Annual Technical Conference and Exhibition of the Society of Petroleum Engineers, Las Vegas, NV, Sep. 1985; SPE 14174.

Thakur, et al.; "Engineering studies of G-1, G-2, and G-3 reservoirs, Meren Field, Nigeria" 1982 Society of Petroleum Engineers of AIME, Apr. 1982, pp. 721-732; SPE 10362.

Bitsindou, et al.; "Gas well production optimization using dynamic nodal analysis"; 1999 SPE Mid-Continent Operations Symposium, Oklahoma City, OK, Mar. 1999, SPE 52170.

Bryan, et al.; "Integration of old and new measurements to optimize redevelopment of the lower Lagunillas Reservoir of Bloque IV, Lake Maracaibo, Venezuela", 1996 SPE Latin America and Carribean Petroleum Engineering Conference, Port-of-Spain, Trinidad & Tobago, Apr. 1995; SPE 39096.

Doublet, et al.; "An integrated geologic and engineering reservoir characterization of the North Robertson (Clearfork) Unit: A case study"; 1995 Joint Rocky Mountain Regional Meeting and Low-Permeability Reservoirs Symposium, Denver, CO, Mar. 1995, SPE 29594.

Doublet, et al.; "Decline curve analysis using type curves-anaylsis of oil well production data using material balance time: Application to Field Cases"; Oct. 1994; SPE 28688.

Freeman, et al.; "The fundamentals can still solve engineering problems"; 1996 SPE Eastern Regional Meeting, Columbus, OH, Oct. 1996, SPE 37349.

Saleh; "An improved model for the development and analysis of partial-water drive oil reservoirs"; International Technical Meeting jointly hosted by the Petroleum Society of CIM and the Society of Petroleum Engineers in Calgary, Jun. 1990, SPE 21568.

Roberts, et al.; "Productivity of multiply fractured horizontal wells in tight gas reservoirs"; Offshore Europe Conference, Aberdeen, Scotland, Sep. 1991; SPE 23113.

Salam, et al.; "Rapid assessment of development planning options for giant oil reservoirs in West Kuwait"; 1999 Middle East Oil Show, Bahrain, Feb. 1999; SPE 53167.

Lea, et al.; "Production optimization using a computerized well model"; SPE 1986 International Meeting, Beijing, China, 1986; SPE 14121.

Andrews, et al.; "Montrose: A case study of innovative, cost effective field rejuvenation"; European Petroleum Conference, London, UK, Oct. 1994; SPE 28836.

Hussain; "Dukhan Field (Onshore Qatar) Uwainat Reservoir optimum development scheme"; SPE Middle East Oil Technical Conference & Exhibition, Bahrain, Apr. 1993; SPE 25530.

Bourgeois, et al.; "Additional use of well test analytical solutions for production prediction"; 1996 SPE European Petroleum Conference, Milan, Italy, Oct. 1996; SPE 36820.

Baker, et al., "Permanent monitoring-looking at lifetime reservoir dynamics", Schlumberger Oilfield Review, Winter, 1995, pp. 32-46.

Beamer, et al., "From pore to pipeline, field-scale solutions", Schlumberger Oilfield Review, Summer 1998, pp. 2-19.

Beckner, et al., "Field development planning using simulated annealing-optimal economic well scheduling and placement", Proc. Annual SPE Tech Conf. Dallas, Oct. 22-25, 1995, pp. 209-221, SPE 30650.

Bittencourt, "A.C. reservoir development and design optimization", Proc. Annual SPE Tech. Conf., San Antonio, Oct. 5-8, 1997, pp. 545-558, SPE 38895.

Briggs, et al., "Trends in reservoir management", Schlumberger Oilfield Review, Jan. 1992, pp. 8-24.

Currie, et al., "Optimized reservoir management using mixed linear programming", Proc. SPE Hydrocarbon Econ. & Evaluation Symp., Dallas, Mar. 16-18, 1997, pp. 235-241, SPE 37963.

Gawith, et al., "Decision-directed reservoir modeling: the next big thing", Proc SPE Reservoir Simulation Symposium, Feb. 14-17, 1999, Houston, Texas, pp. 131-134, SPE 51890.

Pedersen, et al., "Seismic snapshots for reservoir monitoring", Schlumberger Oilfield Review, Winter 1996, pp. 32-43.

Ramakrishnan, et al., "Testing and interpretation of injection wells using rate and pressure data", SPE Form. Eval. 9, pp. 228-236, 1994.

Trayner, "Defining business critical workflows for integrated reservoir optimization", SPE India Oil and Gas Conference Exhibition, New Delhi, India, Feb. 17-19, 1998, SPE 39576.

Zakirov, "Optimizing reservoir performance by automatic allocation of well rates", 5th European Conference on Mathematics of Oil Recovery, Leoben, Austria, Sep. 3-5, 1996, pp. 375-384.

* cited by examiner

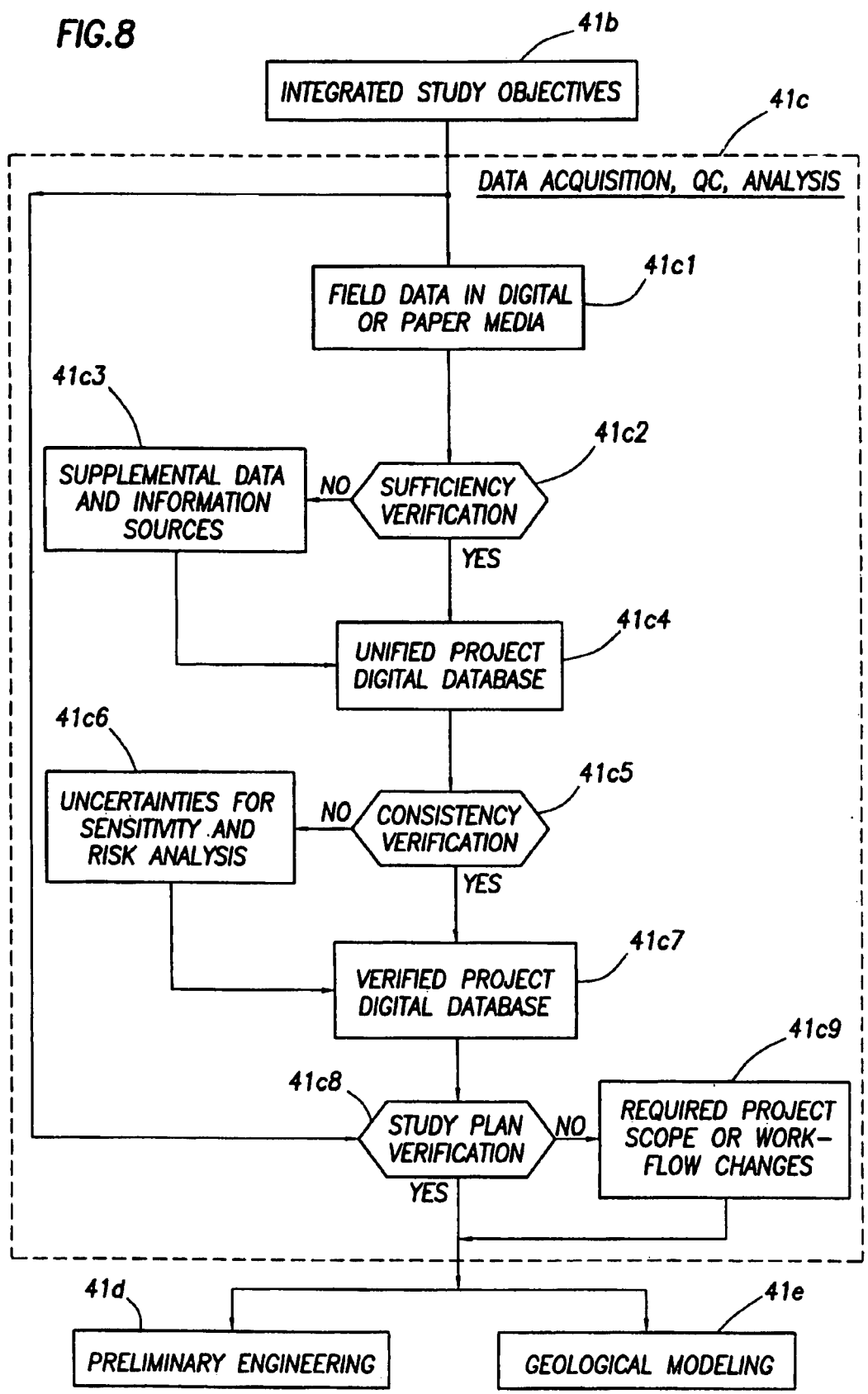

INTEGRATED RESERVOIR OPTIMIZATION

CROSS REFERENCE TO RELATED APPLICATIONS

This is a Continuation of application Ser. No. 11/714,033 filed on Mar. 5, 2007, which is a Continuation of application Ser. No. 11/070,457 filed on Mar. 2, 2005, now U.S. Pat. No. 7,478,024, which is a Continuation of application Ser. No. 09/659,951 filed on Sep. 12, 2000, now U.S. Pat. No. 6,980,940, which is a Utility application of prior Provisional application Ser. No. 60/183,836 filed on Feb. 22, 2000.

BACKGROUND OF THE INVENTION

The invention relates to a method known as "Integrated Reservoir Optimization" (IRO) which includes a method for monitoring and controlling the extraction of fluid and gas deposits from subsurface geological formations. This includes a method for monitoring the status of fluid and gas deposits in subsurface geological formations and controlling the location and use of physical resources and extraction rates to maximize the extraction of such deposits from the subsurface geological formations.

During the production life cycle of oil and gas extracted from reservoir fields in geological formations, certain stages are followed which include exploration, appraisal, reservoir development, production decline, and abandonment of the reservoir. Important decisions must be made at each of these stages in order to properly allocate resources and to assure that the reservoir meets its production potential. In the early stages of the production life cycle, one begins with almost complete ignorance about the distribution of internal properties within the reservoir. As development continues, diverse types of reservoir data are collected, such as seismic, well logs, and production data. That reservoir data are combined to construct an evolving understanding of the distribution of reservoir properties in an earth formation. Therefore, the understanding of that reservoir data is key to making proper reservoir management decisions.

Various prior art approaches that the oil and gas industry has taken to reservoir management have been reported in numerous books and technical journal articles, such as are listed in the References section toward the end of this specification. For example, in the reservoir management method taught in the Satter and Thakur book cited in the References section below, short and long-term goals for managing a gas or oil reservoir are first identified. A plurality of data, which is subsequently collected about the reservoir, are then used to develop a reservoir management plan, also called a development plan. The development plan is then implemented by drilling wells, setting production and injection rates for the reservoir, and performing workover operations. As oil and/or gas is extracted from the reservoir, new data are obtained and the goals and development plans for managing the reservoir are periodically re-evaluated to maximize production of gas and/or oil from the reservoir. As the reservoir is depleted, the goals and development plans are changed, and eventually the reservoir is abandoned.

Some U.S. patents teach and claim various steps in the processes of locating and developing reservoirs, such as, but not limited to, collection of reservoir data, such as seismic, well logs and production data, locating sites for wells, controlling the rate of extraction from wells, and maximizing the rate of production from individual wells and the reservoir as a whole. Some of these patents are described in the following paragraphs.

U.S. Pat. No. 5,992,519 to Ramakrishnan et al teaches a method and hardware for monitoring and controlling a plurality of production oil wells to satisfy predetermined, updatable production criteria. An oil reservoir model is used in conjunction with a reservoir simulation tool in order to determine a production strategy by which oil is controllably produced from the reservoir using flow valves. Information gleaned as a result of adjustments to the flow valves is used to update the reservoir model. Oil wells are drilled based on a fixed production strategy and the fluid flow rates from the wells, as adjusted, are based on a variable production strategy.

U.S. Pat. No. 5,706,896 to Tubel et al teaches a system for controlling and/or monitoring a plurality of production wells from a remote location. The control system is composed of multiple downhole electronically controlled electromechanical devices and multiple computer based surface systems operated from multiple locations. The system provides the ability to predict the future flow profile of multiple wells and to monitor and control the fluid or gas flow from either the formation into the wellbore, or from the wellbore to the surface. The control system is also capable of receiving and transmitting data from multiple remote locations such as inside the borehole, to or from other platforms, or from a location away from any well site.

U.S. Pat. No. 5,732,776 to Tubel et al teaches another similar system for controlling and/or monitoring a plurality of production wells from a remote location. The multi-zone and/or multi-well control system is composed of multiple downhole electronically controlled electromechanical devices and multiple computer based surface systems operated from multiple locations. This system has the ability to predict the future flow profile of multiple wells and to monitor and control the fluid or gas flow from either the formation into the wellbore, or from the wellbore to the surface. This control system is also capable of receiving and transmitting data from multiple remote locations such as inside the borehole, to or from other platforms, or from a location away from any well site.

U.S. Pat. No. 5,975,204 to Tubel et al teaches and claims a downhole production well control system for automatically controlling downhole tools in response to sensed selected downhole parameters without an initial control signal from the surface or from some other external source.

U.S. Pat. No. 4,757,314 to Aubin et al describes an apparatus for controlling and monitoring a well head submerged in water. This system includes a plurality of sensors, a plurality of electromechanical valves and an electronic control system which communicates with the sensors and valves. The electronic control system is positioned in a water tight enclosure and the water tight enclosure is submerged underwater. The electronics located in the submerged enclosure control and operate the electromechanical valves based on input from the sensors. In particular, the electronics in the enclosure uses the decision making abilities of the microprocessor to monitor the cable integrity from the surface to the well head to automatically open or close the valves should a break in the line occur.

U.S. Pat. No. 4,633,954 to Dixon et al teaches a fully programmable microprocessor controller which monitors downhole parameters such as pressure and flow and controls the operation of gas injection to the well, outflow of fluids from the well or shutting in of the well to maximize output of the well. This particular system includes battery powered solid state circuitry comprising a keyboard, a programmable memory, a microprocessor, control circuitry and a liquid crystal display.

U.S. Pat. No. 5,132,904 to Lamp teaches a system similar to the '954 patent wherein the controller includes serial and parallel communication ports through which all communications to and from the controller pass. Hand held devices or portable computers capable or serial communication may access the controller. A telephone modem or telemetry link to a central host computer may also be used to permit several controllers to be accessed remotely.

U.S. Pat. No. 4,969,130 to Wason et al teaches a system for monitoring the fluid contents of a petroleum reservoir, wherein a reservoir model is employed to predict the fluid flow in the reservoir, includes a check on the reservoir model by comparison of synthetic seismograms with the observed seismic data. If the synthetic output predicted by the model agrees with the observed seismic data, then it is assumed that the reservoir is being properly modeled. If not then the reservoir model, in particular its reservoir description, is updated until it predicts the observed seismic response. The seismic survey may be periodically repeated during the productive life of the reservoir and the technique used to update the reservoir model so as to ensure that the revised reservoir description predicts the observed changes in the seismic data and hence reflects the current status of fluid saturations.

U.S. Pat. No. 5,586,082 to Anderson et al teaches a method for identifying subsurface fluid migration and drainage pathways in and among oil and gas reservoirs using 3-D and 4-D seismic imaging. This method uses both single seismic surveys (3-D) and multiple seismic surveys separated in time (4-D) of a region of interest to determine large scale migration pathways within sedimentary basins, and fine scale drainage structure and oil-water-gas regions within individual petroleum producing reservoirs.

U.S. Pat. No. 5,798,982 to He et al teaches a method for the mapping and quantification of available hydrocarbons within a reservoir and is useful for hydrocarbon prospecting and reservoir management.

While these patents individually teach various aspects associated with locating reservoirs, locating sites for wells, controlling the rate of extraction from wells, and attempting to maximize the rate of production from individual wells and a reservoir as a whole, none of the above cited prior art or any other patents or literature suggests or teaches integrating all these many functions into a more comprehensive method for maximizing the production of gas and/or oil from the entire reservoir.

Thus, there is a need for a new and more comprehensive method for managing an oil and/or gas reservoir for the purpose of maximizing the production of gas and/or oil from a reservoir.

In addition, in the prior art, a development plan would be produced for a first reservoir field, an operator would make a decision from a number of alternatives available to him in relation to the first reservoir field, and then the operator would implement a particular process in the first reservoir field. At this point, the operator would focus his attention to a second reservoir field or a second property while allowing the first reservoir field or first property to be operated by a field staff and a maintenance staff. The first reservoir field would not receive any particular attention for several years when things started to go wrong in that first reservoir field. The operator would then re-focus his attention to the first reservoir field and ask how the resultant activity or results obtained from the first reservoir field or property differed from the operator's original expectations with regard to that first reservoir field. In addition, the operator would initiate a study to find out what happened with regard to the first reservoir field. This process seemed to be a "hit and miss" type of interest reflecting only a sporadic interest in the first reservoir field property.

Accordingly, in the above referenced quest to obtain a new and more comprehensive method for managing an oil and/or gas reservoir, there is a further need to provide a more organized, efficient, and automated process for automatically updating on a periodic basis the original development plan for the first reservoir field property when the resultant activity or results obtained from the first property are initially received. As a result, a new development plan can be produced for the first property and the new development plan can be implemented in connection with that first property following the generation of the results or resultant activity from the first property.

SUMMARY OF THE INVENTION

Accordingly, it is a primary object of the present invention to disclose a novel and more comprehensive method for managing a fluid or gas reservoir.

In accordance with the above primary object of the present invention, a more comprehensive method for managing a fluid or gas reservoir is disclosed. The novel method of the present invention for managing a fluid or gas reservoir will maximize the production of oil or gas from the reservoir by bringing together all available data in order to perform a function which will hereinafter be termed 'Integrated Reservoir Optimization' or 'IRO' (a trademark of Schlumberger). The 'Integrated Reservoir Optimization (IRO)' method of the present invention for managing a fluid and/or gas reservoir comprises a process involving a continuous ongoing effort to maximize the value of a reservoir property. This objective, of maximizing the value of the property, is accomplished by developing an initial development plan, partly implementing the initial development plan, examining a set of results obtained from the implementing step, and confirming that the set of results do in fact agree with an initial set of projections. If the results do agree with the initial set of projections, the next step includes proceeding with the implementation of the initial development plan. As the initial development plan is implemented, a day-to-day monitoring and surveillance step is implemented in order to keep track of and monitor events which occur at the property. As part of the implementation of the initial development plan, a detailed data gathering and data acquisition program is implemented in order to generate a new set of data for the purpose of gaining as much information as possible with regard to a response of the reservoir property to whatever actions that have been taken by operators on the property. A feedback loop is installed whereby the new set of data (which has been gathered during the above referenced data gathering step) is accessible to the parties who originally designed the initial development plan for the purpose of: (1) merging the new set of data into previous interpretations, (2) doing any reinterpretations which are necessary, and then (3) modifying the initial development plan in an "ongoing and iterative process" to produce another development plan. Thus, the "ongoing and iterative process" includes the steps of: (1) developing an initial development plan, (2) implementing the initial development plan, (3) refining by performing data gathering and data acquisition in order to acquire new data in response to the implementing step, (4) re-developing a new development plan based on the newly acquired data obtained during the refining step, (5) re-implementing the new development plan, (6) re-refining by performing additional data gathering and data acquisition in order to acquire further new data in response to the re-implementing step, etc. Therefore, the initial development plan is not discarded; rather, improvements are made to the initial development plan since the initial development plan is changed and modified in response to the newly acquired data. For example, the initial development plan may be changed or modified based on how the wells are completed, or how many wells are drilled, or where the wells are positioned, etc. However, in accordance with one feature of the present invention, 'different types of data' are obtained in response to measurements taken on a reservoir during the lifetime of the reservoir. These 'different types of data' range from a 'first type of data' which are obtained from occasional time-lapse measurements that are taken on an 'infrequent' basis to a 'second type of data' which are obtained from continuous measurements that are taken on a 'frequent' basis by permanently installed systems. In the prior art, the performance of reservoirs were monitored solely on an 'infrequent' basis and the results were used to change the reservoir development plan at certain time intervals. In contrast, in accordance with the teaching of the present invention, the performance of reservoirs is monitored and data is acquired based on measurements taken both on a 'frequent' basis (for wells and facilities) and on a less frequent or 'infrequent' basis (for repeat logging and macroscopic reservoir measurements). In addition, these 'different types of data' also range in spatial coverage from 'local well/surface monitoring data' to more 'global reservoir-scale monitoring measurements'. Examples of systems or equipment which acquire the 'local well/surface monitoring data' include: re-entry logging systems, permanent pressure gauges, and formation evaluation sensors placed inside and outside cased wells. Note that wellbore and surface production rates are taught in the Baker, Babour, Tubel, Johnson, and Bussear references which are listed in the References section located at the end of this specification. Examples of systems or equipment which acquire the 'global reservoir-scale monitoring measurements' include: systems utilizing time-lapse or 4D seismic, systems involving gravimetry, and systems involving deep-reading/cross-well electrical and acoustic measurements as taught in the Pedersen, Babour and He references listed in the References section located at the end of this specification. Accordingly, the incoming streams of 'different type of data', which are obtained from measurements taken on a reservoir during the lifetime of that reservoir, are obtained from measurements taken during: (1) differing acquisition time scales, and (2) differing spatial scales of coverage. The methods disclosed in the cited Satter reference (reference 17 in the References section set forth below) and related publications are not entirely adequate because such methods fail to assimilate all of these 'different types of data'. The 'Integrated Reservoir Optimization' method in accordance with the present invention for managing a fluid and/or gas reservoir will assimilate all these 'different types of data' for the purpose of optimizing the overall performance of oil and gas reservoirs. In addition to the 'reservoir development plan', there exists a 'day-to-day operational plan'. The long term 'reservoir development plan' is continually updated in response to the data acquired based on both: (1) the measurements on the reservoir which are taken on an 'infrequent' basis (i.e., the occasional time-lapse measurements), and (2) the measurements on the reservoir which are taken on a 'frequent' basis (i.e., the continuous measurements taken by permanently installed systems). In addition, the 'day-to-day operational plan' is continually updated in response to that long term 'reservoir development plan'. As a result of the continual updating of the 'day-to-day operational plan' from the 'reservoir development plan' in response to the two above referenced measurements taken on a frequent and an infrequent basis, a more precise determination of 'two parameters' is obtained: (1) the location of underground deposits of hydrocarbon, and (2) the pressure distribution within the subsurface geological formations. When these 'two parameters' are optimized, the following 'further parameters' are also optimized: the number of wells, well completions, well interference, and production plans. When these 'further parameters' are optimized, the production of oil and/or gas from an oil or gas reservoir is maximized.

Accordingly, it is a further object of the present invention to disclose a method of managing a fluid (such as oil) and/or gas reservoir which assimilates diverse data having different acquisition time scales and spatial scales of coverage for iteratively producing a reservoir development plan which is used for optimizing an overall performance of said reservoir, including the steps of: (a) generating an initial reservoir characterization, (b) from the initial reservoir characterization, generating an initial reservoir development plan, (c) when the reservoir development plan is generated, incrementally advancing and generating a capital spending program, (d) when the capital spending program is generated, monitoring a performance of the reservoir by acquiring high rate monitor data from a first set of data measurements taken in the reservoir, (e) further monitoring the performance of the reservoir by acquiring low rate monitor data from a second set of data measurements taken in the reservoir, (f) assimilating together said high rate monitor data and said low rate monitor data, (g) from said high rate monitor data and said low rate monitor data, determining when it is necessary to update said initial reservoir development plan to produce a newly updated reservoir development plan, (h) when necessary, updating the initial reservoir development plan to produce the newly updated reservoir development plan, and (i) when the newly updated reservoir development plan is produced, repeating steps (c) through (h), said reservoir being nearly depleted when the newly updated reservoir development plan is not produced during step (h).

It is a further object of the present invention to disclose a method of managing a fluid and/or gas reservoir, where the step (d) which monitors the performance of the reservoir by acquiring high rate monitor data further includes the steps of (d1) acquiring and accumulating and quality checking the high rate monitor data, (d2) using said high rate monitor data to evaluate a single well or a region of several wells and returning to step (c), and (d3) using said high rate monitor data to evaluate a global field or reservoir, returning to step (e) when the reservoir development plan should be updated or when new low rate reservoir monitor data should be acquired, and returning to step (c) when the reservoir development plan should not be updated or when new low rate reservoir monitor data should not be acquired.

It is a further object of the present invention to disclose a method of managing a fluid and/or gas reservoir, where the step (e) which monitors the performance of the reservoir by acquiring low rate monitor data includes the steps of: (e1) determining when new low rate reservoir monitor data should be acquired via new measurements by performing a sensitivity analysis survey predesign study to determine if the new measurements are expected to introduce new information, (e2) acquiring the new low rate reservoir monitor data when it is determined that the new low rate reservoir monitor data should be acquired and the new measurements will introduce new information, (e3) updating a reservoir model when new low rate reservoir monitor data should not be acquired via new measurements, and (e4) updating a production forecast and an economic analysis when the reservoir model is updated or when the low rate reservoir monitor data is acquired during step (e2).

It is a further object of the present invention to disclose a method of managing a fluid and/or gas reservoir, where the generating step (a) for generating an initial reservoir characterization includes performing a preliminary engineering step in parallel with a geological modeling step in order to reconcile the geoscience interpretations made using static data during the geological modeling step with the engineering interpretations made using dynamic or performance related data during the preliminary engineering step.

It is a further object of the present invention to disclose a method of managing a fluid and/or gas reservoir, where the generating step (a) for generating an initial reservoir characterization further includes: (a1) determining for a particular reservoir field a set of development and depletion strategies, (a2) determining a set of integrated study objectives, (a3) performing data acquisition, quality control, and analysis, (a4) performing preliminary engineering, and (a5) performing geological modeling in parallel with the preliminary engineering.

It is a further object of the present invention to disclose a method of managing a fluid and/or gas reservoir, where the generating step (b) for generating an initial reservoir development plan from the initial reservoir characterization includes (b1) performing either a numerical model studies step or an analytical model studies step, (b2) generating a production and reserves forecast in response to the numerical model studies or the analytical model studies, (b3) generating facilities requirements from the production and reserves forecast, (b4) considering environmental issues in response to the development and depletion strategies determined during step (a1), (b5) performing an economics and risk analysis study while taking into account the environmental considerations, the production and reserves forecast, and the facilities requirements, and (b6) producing an optimized development plan in response to and in view of the economics and risk analysis.

It is a further object of the present invention to disclose a method of managing a fluid and/or gas reservoir, where the performing step (a3) for performing data acquisition, quality control, and analysis includes (a3.1) gathering together a first set of data relating to a particular reservoir field under study in a study plan and then gathering a set of supplemental data from alternative sources to supplement said first set of data if said first set of data is not sufficient to produce a database of data which includes a plurality of data, (a3.2) verifying that the plurality of data in the database are consistent with each other thereby producing a verified database having a plurality of data, and (a3.3) verifying said study plan to verify that said plurality of data in the verified database is sufficient as to amount or quality or quantity, and, if said plurality of data is not sufficient, adjusting a scope of said study plan.

It is a further object of the present invention to disclose a method of managing a fluid and/or gas reservoir, where the performing step (a4) for performing preliminary engineering includes: (a4.1) knowing a 'set of fluid properties' in a reservoir fluid properties model, comparing reservoir pressures in a set of reservoir pressure survey data when the 'set of fluid properties' is known, and adjusting the reservoir pressures to a common datum thereby producing a corrected 'reservoir pressure history' which reflects the history of the reservoir pressure corrected to a common datum, (a4.2) generating a corrected well 'production and injection history' in response to the set of fluid properties and a reported field production, (a4.3) conducting production and pressure test interpretations adapted for conducting a well test of one or more wells, measuring a plurality of pressure and rate versus time test data from the one or more wells, and interpreting the test data when the set of fluid properties is known, (a4.4) determining a set of well drilling and completion histories which examines where a set of wells are drilled and how the wells are drilled and completed, (a4.5) determining a set of production enhancement opportunities in response to the well test of step (a4.3) and the drilling and completion histories of step (a4.4) to identify what immediate opportunities exist to stimulate a well or install a pump that will result in higher production rates, (a4.6) performing material balance volume and acquifer interpretations for estimating and determining, after extraction and injection of fluids into a formation, what were the original volumes of the fluids in place in the formation, (a4.7) determining an incremental rate and recovery potential for estimating incremental oil rates and potential oil recoveries associated with the production enhancement opportunities, (a4.8) determining completion workover and infill guidelines adapted for monitoring the impact of a completion workover or infill workplan, generating additional production data, determining if the production enhancement opportunities are correct, and redesigning the completion workover of the completion workover and infill guidelines in response thereto, (a4.9) determining, in a relative permeability and capillary pressure saturation model, the flow characteristics of oil and gas and water when all exist simultaneously in a reservoir, (a4.10) investigating, in a single well or reservoir 'sector model', specific reservoir mechanisms and the impact the mechanisms have on a full field model design, (a4.11) using, in connection with reservoir mechanism sensitivity, alternative grid descriptions with one of the 'sector models' and determining which 'particular alternative grid description' better represents a mechanism which exists in the reservoir field, and (a4.12) with respect to a reservoir model design criteria, determining what must be done to properly design a reservoir model and producing a set of 'reservoir model design criteria' in response to the 'reservoir fluid properties' and the 'production injection history' and the 'reservoir pressure history' and the 'particular alternative grid description'.

It is a further object of the present invention to disclose a method for performing preliminary engineering having limitations which are similar to one or more of the limitations set forth in the above paragraph.

It is a further object of the present invention to disclose a method of managing a fluid and/or gas reservoir, where the performing step (a5) for performing geological modeling includes: (a5.1) determining a preliminary petrophysical model representing a method for converting well logs into a calculated reservoir property profile at each well location, (a5.2) determining a final petrophysical model from the preliminary petrophysical model and said preliminary engineering, said final petrophysical model representing information relating to a set of more detailed reservoir properties within said structural framework, (a5.3) determining a regional geologic model representing a regional geology in an earth formation associated with a particular reservoir field and applying a framework of sedimentology and stratigraphy to said formation during a sedimentologic and stratigraphic analyses, (a5.4) in response to the sedimentologic and stratigraphic analyses, performing detailed stratigraphic correlations between wells and establishing continuity of geologic horizons across the reservoir field, (a5.5) performing a geomechanical analysis which in association with a set of geomechanical properties of the reservoir enables the conversion of time measured data from seismic into depth measurements and provides an indication of reservoir stresses which can be computed from the geomechanical properties, (a5.6) defining a structural framework of the reservoir in response to the geomechanical analysis and the detailed stratigraphic correlations, the structural framework of the reservoir describing an overall shape of the reservoir, (a5.7) defining a set of well and interval property summaries in response to said final petrophysical model and a seismic attribute analysis, the well and interval property summaries providing seismic information enabling one to relate a seismic response to a set of measured properties from well logs, (a5.8) defining a reservoir structure and property model in response to the well and interval property summaries and the seismic attribute analysis and the structural framework, (a5.9) performing reservoir volume calculations which provide an estimate of fluids in place in the reservoir in response to the reservoir structure and property model, (a5.10) comparing, in a volumes consistent decision, the reservoir volume calculations with a material balance from preliminary engineering, and, if the comparing step reveals the volumes are consistent, a geoscience interpretation of that which is underground agrees with an interpretation of the reservoir from a performance standpoint, and, if the comparing step reveals the volumes are not consistent, either adjusting said geoscience interpretation or identifying unresolved uncertainties.

It is a further object of the present invention to disclose a method for performing geological modeling having limitations which are similar to one or more of the limitations set forth in the above paragraph.

It is a further object of the present invention to disclose a method of managing a fluid and/or gas reservoir, where the performing step (b1) for performing numerical model studies includes: (b1.1) defining a property distribution in a 3D structure and property model, (b1.2) defining a grid system in a 3D simulator grid system, (b1.3) defining a fluid property and saturation model, (b1.3) defining preliminary estimates of the extent or size of an aquifer in an initial reservoir conditions and aquifer model, (b1.4) combining the property distribution and the grid system and the fluid property and saturation model and the preliminary estimates of the extent or size of the aquifer in a 3D reservoir simulator for defining a rock model in the reservoir simulator and superimposing a saturation distribution in the rock model and creating an initial reservoir model in the reservoir simulator, (b1.5) performing a volumes consistent check to determine whether there is consistency in initial volumes and whether the grid system that is superimposed on the rock model is a reliable representation of a property description developed during the geological modeling step (a5), (b1.6) when there is consistency in the initial volumes, generating a corrected volume model, (b1.7) when there is not consistency, since the grid system fails to reproduce the property description, adjusting, in a model property adjustments step, the grid system until the grid system is a reliable representation of the property description, (b1.9) defining historical production and injection rate constraints, (b1.10) combining the corrected volume model with the historical production and injection rate constraints for running, in a model response to historic rate constraints step, the model through a historic period, obtaining a set of model responses, and comparing the model responses to actual measured performance, (b1.11) comparing, in a model reproduces history step, the model performance to the historical data to determine if the model performance reproduces the historical data, (b1.12) if the model performance did not reproduce the historical data, making adjustments, in a model property adjustments step, to the model properties, (b1.13) storing and identifying the adjustments to the model properties as uncertainties in sensitivity and risk analysis, (b1.14) if the model performance did reproduce the historical data after having performed the making adjustments step and since a history calibrated model is created, generating a first output signal for use by a production and reserves forecast, said first output signal including the history calibrated model and the uncertainties.

It is a further object of the present invention to disclose a method for performing numerical model studies having limitations which are similar to one or more of the limitations set forth in the above paragraph.

It is a further object of the present invention to disclose a method of managing a fluid and/or gas reservoir, where the performing step (b1) for performing analytical model studies includes: (b1.1) providing input data to the analytical model study, said input data including analogous reservoir performance, well drilling and completion histories, historic well performance trends, reservoir property and structure maps, and material balance volumes and aquifer model, (b1.2) from plots of production trends in the historic well performance trends, establishing a set of decline characteristics or a set of productivity characteristics of the reservoir field thereby generating well production decline characteristics which forecasts future performance trends from existing wells, (b1.3) from the historic well performance trends, mapping, in map displays of well performance indicators, several performance indicators such as the total volumes of fluids at different well sites in order to examine which areas of a reservoir field are better or worse than average or better or worse than their companions wells at the different well sites, (b1.4) comparing, in a conformance decision, the map of the performance indicators at the different well sites indicative of production quality from the map displays of well performance indicators with a geologic interpretation set forth in the reservoir property and structure maps and determining if any disagreement exists between said map and said geologic interpretation, (b1.5) if the disagreement does not exist and there is no total conformance, identifying any potential infill well opportunities reflecting any opportunities to drill any infill wells, (b1.6) if the disagreement does exist and there is total conformance, determining, in a volumetric and material balance fluids in place estimates step, how the well performance trends balance out with estimates of fluids in place and pressure support from material balance calculations, (b1.7) in response to the well production decline characteristics generating during the establishing step (b1.2), identifying workover and artificial lift candidates, (b1.8) in response to the well production decline characteristics, identifying from actual well performance, in a statistical analysis of well indicators, an average expected performance, (b1.9) comparing individual wells to said average expected performance to determine where in the reservoir field there exists superior performing wells and where in said field there exists poorer performing wells, and, responsive thereto, selecting via said potential infill well opportunities step opportunities to either enhance existing wellbores or to drill new wellbores, (b1.10) in response to the well production decline characteristics and having established the decline characteristics for existing wells, forecasting for that group of existing wells, in current well forecasts of production and reserves, future performance trends of the reservoir field if no action is taken, (b1.11) in response to the well production decline characteristics and the workover and artificial lift candidates, generating incremental production forecasts, (b1.12) in response to the well production decline characteristics and the potential infill well opportunities, generating infill forecasts of production and reserves representing a forecast of what an extra well in a particular location might generate, (b1.13) determining if conformance exists between the incremental production forecasts, the current well forecasts of production and reserves, the infill forecasts of production and reserves, and the volumetric and material balance fluids in place estimates, (b 1.14) if conformance does exist, generating a second output signal for use by a production and reserves forecast, the second output signal including current well forecasts of production and reserves, enhanced well production forecasts, and infill forecasts of production and reserves, and (b1.15) if conformance does not exist, identifying uncertainties and then generating said second output signal.

It is a further object of the present invention to disclose a method for performing analytical model studies having limitations which are similar to one or more of the limitations set forth in the above paragraph.

It is a further object of the present invention to disclose a method of managing a fluid and/or gas reservoir, where the generating step (b2) for generating a production and reserves forecast in response to the numerical model studies or the analytical model studies includes: (b2.1) in response to a plurality of constraints and to the first output signal from the numerical model studies step which includes the history calibrated model, running a model in a simulator (the simulator production and reserves forecast) and generating a production forecast representing the way a reservoir responds to a development plan, said development plan defining a mechanism representing a process that is active in the reservoir field, (b2.2) determining whether an implementation plan of the mechanism or whether the constraints can be changed or optimized, (b2.3) if the implementation plan or the constraints can be changed or optimized, changing the implementation plan of the mechanism or the constraints, re-running the model in the simulator, and generating another production forecast, (b2.4) if the implementation plan or the constraints cannot be changed or optimized, determining if the mechanism representing the process that is active in the reservoir field can be changed, (b2.5) if the mechanism can be changed which represents a new development plan or new mechanism, revising an implementation plan of the new mechanism to create a new implementation plan and re-running the model in the simulator thereby generating still another production forecast, (b2.6) if the new implementation plan or the constraints cannot be changed or optimized and if the new mechanism cannot be changed, determine if there is any need for parametric sensitivity runs, (b2.7) if there is a need for parametric sensitivity runs, identify a set of uncertainties, alter a reservoir description in the history calibrated model, and repeat steps (b2.1) to (b2.5), (b2.8) if there is no need for any parametric sensitivity runs, generating a third output signal which includes reservoir fluids production rates and pressures and total fluids injection rates and pressures for the facilities requirements step (b3) and a reservoir development plan for the economics and risk analysis step (b5), the facilities requirements step (b3) responding to that third output signal; (b2.9) in response to the plurality of constraints and the second output signal from the analytical model studies step which includes the current well forecasts of production and reserves, the enhanced well production forecasts, and the infill forecasts of production and reserves, performing, in the analytical production and reserves forecast, analytical modeling and, responsive thereto, generating an analytical forecast for a particular mechanism and a particular set of development constraints, and (b2.10) repeating steps (b2.2) through b(2.8) until there is no need for any parametric sensitivity runs and generating a fourth output signal which includes reservoir fluids production rates and pressures and total fluids injection rates and pressures for the facilities requirements step (b3) and a reservoir development plan for the economics and risk analysis step (b5), the facilities requirements step (b3) responding to that fourth output signal.

It is a further object of the present invention to disclose a method for generating a production and reserves forecast having limitations which are similar to one or more of the limitations set forth in the above paragraph.

It is a further object of the present invention to disclose a method of managing a fluid and/or gas reservoir, where the generating step (b3) for generating facilities requirements from the production and reserves forecast includes: (b3.1) in response to that portion of the third and the fourth output signals from the production and reserves forecasts step (b2) which includes the reservoir fluids production rates and pressures, estimating a first set of facilities that are required for the reservoir fluids production rates and pressures, (b3.2) determining if one or more first set of changes are required to said first set of facilities, (b3.3) if the one or more first set of changes to the first set of facilities is required, making said first set of changes to said first set of facilities, said one or more first set of changes having associated therewith a capital cost and possible incremental operating cost adapted for use by the economics and risk analysis step (b5), (b3.4) in response to that portion of the third and the fourth output signals from the production and reserves forecasts step (b2) which includes the total fluids injection rates and pressures, estimating a second set of facilities that are required for the total fluids injection rates and pressures, (b3.5) determining if one or more second set of changes are required to said second set of facilities, (b3.6) if the one or more second set of changes to the second set of facilities is required, making said second set of changes to said second set of facilities, said one or more second set of changes having associated therewith a capital cost and possible incremental operating cost adapted for use by the economics and risk analysis step (b5).

It is a further object of the present invention to disclose a method for generating facilities requirements having limitations which are similar to one or more of the limitations set forth in the above paragraph.

It is a further object of the present invention to disclose a method of managing a fluid and/or gas reservoir, where the considering step (b4) for considering environmental issues includes: (b4.1) considering special emergency response plans and provisions, (b4.2) considering pre-construction environmental impact study requirements, (b4.3) considering interrupted or restricted access to wells and facilities, and (b4.4) considering government or regulatory approval and audit provisions.

It is a further object of the present invention to disclose a method of managing a fluid and/or gas reservoir, where the performing step (b5) for performing an economics and risk analysis study includes: (b5.1) in response to the reservoir development plan generated from the production and reserves forecast step (b2), evaluating a set of economics which is associated with said reservoir development plan by generating, responsive to the reservoir development plan, a reservoir production schedule and a reservoir injection schedule and a facility and well schedule, (b5.2) in response to the facilities requirements step (b3) which includes processing and drilling workover plans, generating a capital cost model and an operating cost model associated therewith, (b5.3) in response to the environmental considerations step (b4), generating special project costs, (b5.4) providing, in a plan economic profile, an economic profile and a cash flow summary for the reservoir development plan in response to the reservoir production schedule, the reservoir injection schedule, the facility and well schedule, the capital cost model, the operating cost model, and the special project costs, (b5.5) determining, in a development and operating risk decision, whether there are significant development and operating risks associated with the reservoir development plan in response to a set of reservoir risk factors, (b5.6) if there are significant development and operating risks associated with the reservoir development plan, making adjustments to a set of production forecast schedules and returning to step (b5.4) which provides the plan economic profile and the cash flow summary for the reservoir development plan that produces an estimate of risk associated costs, (b5.7) if there are no significant development and operating risks associated with the reservoir development plan, determining if there is a reservoir performance risk relating to a character and a nature of the reservoir that has not been established from history matching and geologic studies, (b5.8) if there is a reservoir performance risk, making adjustments to a set of production forecast schedules and returning to step (b5.4), (b5.9) if there is no reservoir performance risk, determining if there is an environmental risk, (b5.10) if there is an environmental risk, making adjustments to a set of production forecast schedules and returning to step (b5.4), (b5.11) if there is no environmental risk, determining if there are any alternative development plans which should be evaluated from an economic standpoint, (b5.12) if there are one or more alternative development plans which should be evaluated from an economic standpoint, repeating steps (b5.1) through (b5.11) for each of the one or more alternative development plans and, responsive thereto, generating one or more corresponding economic profiles associated, respectively, with the one or more alternative development plans, (b5.13) if there are no more additional alternative development plans which should be evaluated, comparing each of the economic profiles associated with each of the alternative development plans and assessing the risks associated with each of the economic profiles, and (b5.14) selecting a particular development plan from among the one or more alternative development plans evaluated during step (b5.12), the particular development plan selected during the selecting step (b5.14) representing the optimized development plan produced during the producing step (b6).

It is a further object of the present invention to disclose a method for performing an economics and risk analysis study having limitations which are similar to one or more of the limitations set forth in the above paragraph.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIG. 8 illustrates a detailed construction of the Data Acquisition, QC, and Analysis block of FIG. 7;

DETAILED DESCRIPTION OF THE PREFERRED EMBODIMENT

Figure 1:
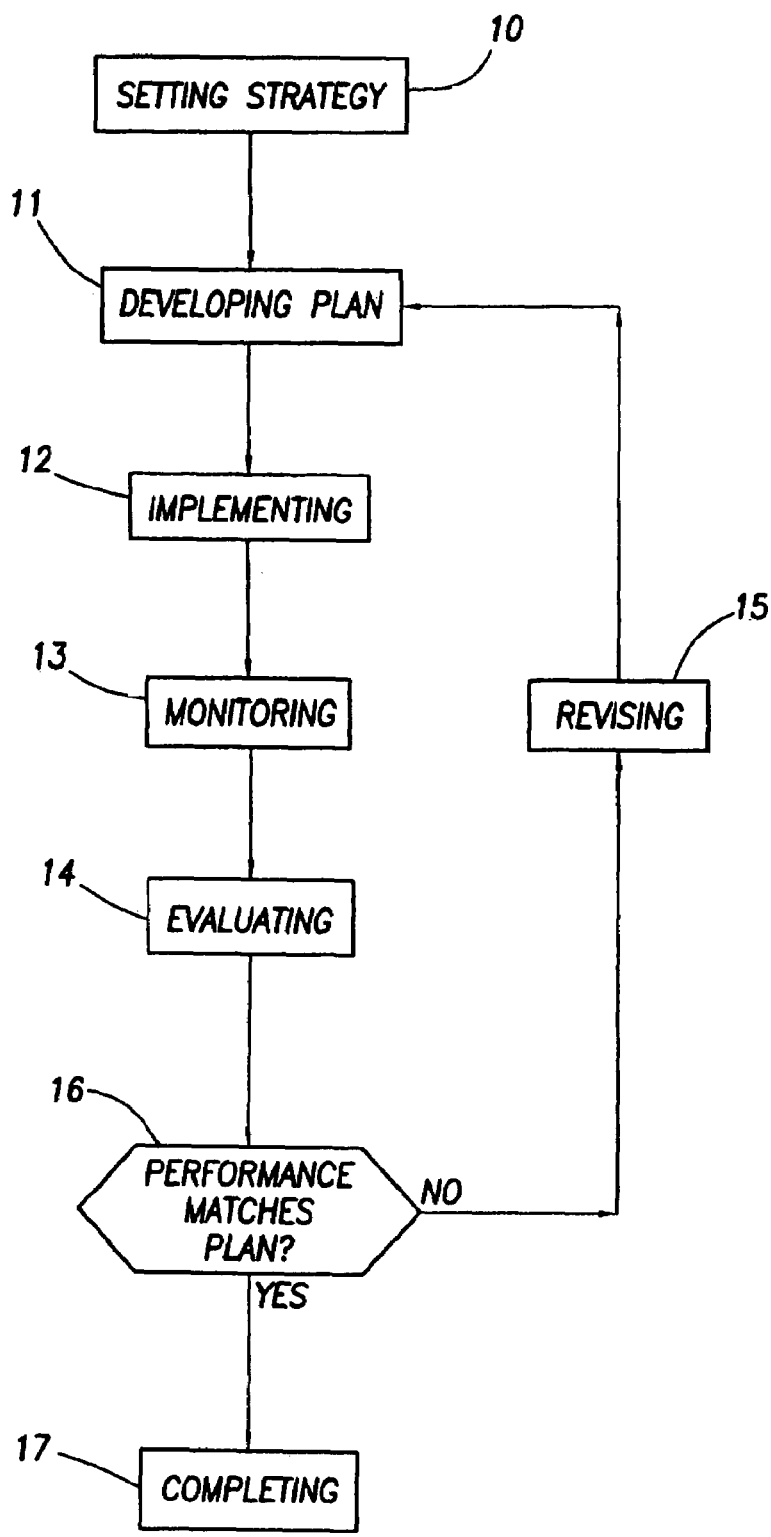
FIG. 1 illustrates one prior art method for managing a gas or oil reservoir.

Referring to FIG. 1, one prior art method for managing a gas or oil reservoir (as taught in the Satter and Thakur book cited in the References section below) is illustrated. FIG. 1 shows a sequence of key steps comprising reservoir management. These steps consist of: setting strategy 10, Developing Plan 11, Implementing 12, Monitoring 13, Evaluating 14, Performance matches plan 16, Revising 15, and Completing 17. Each of these steps or block of FIG. 1 will be discussed in detail below.

Setting Strategy, Block 10

In FIG. 1, the process begins with the Setting Strategy step in block 10 wherein short-term and long-term strategies or goals for managing the reservoir are set. This includes reviewing: the key elements of reservoir characteristics as is generally determined from seismic logging information, the total environment of the reservoir, and the available technology for developing the reservoir. Although one may not have a fixed strategy, one may nevertheless have several alternative strategies in mind, each of which would be designed to achieve a single goal: to produce a particular number of barrels or million cubic feet/day of oil or gas from a particular reservoir. In addition, one may have a particular schedule for achieving the above referenced production rates.

Developing Plan, Block 11

In FIG. 1, in the Developing Plan block 11, the reservoir Development Plan is prepared. This includes integrating diverse data that are available about the reservoir (such as seismic data, well logs, core samples, geological information, production data) and developing a sound technical plan for future reservoir management. In connection with this Developing Plan block 11, one would obtain any information available with regard to a particular resource or reservoir being evaluated, supplementing that information with data available from analogous systems, for the purpose of producing a comprehensive "Development Plan" which represents a plan for developing that particular resource based on the strategy set during the "setting strategy" block 10.

Implementing, Block 12

In the Implementing step of block 12, the aforementioned "Development Plan" is implemented. This "implementing step" includes designing and drilling new wells, setting well flow rates, or performing workover operations, such as cement squeeze, acidization, fracturing, gel treatments, and tubular repair that are all known in the art. During the "implementing step", one would go out into the field and take any actions which are necessary to establish the process facilities, wellbores, transportation facility, that will enable your strategy to be met.

Monitoring, Block 13 and Evaluation, Block 14

As the Development Plan is being put into place during the Implementing step of block 12, new data are obtained and gathered during the Monitoring step of block 13, and, following the data gathering step, the reservoir Development Plan is continually re-evaluated during the Evaluating step of block 14. Whenever a new wellbore is drilled or whenever something new is added to the reservoir, more information is obtained regarding the characteristics of the reservoir. The monitoring step, block 13, is very important in the early stages because this is when important capital investment decisions are being made and how efficiently your capital can be used. During the evaluating step, block 14, the data obtained during the monitoring step of block 13 is received and an attempt is made to "tie all the data together". That is, all the received data is assimilated and "tied together" for the purpose of obtaining a picture of what the reservoir looks like or otherwise determining the characteristics of the reservoir. For example, during the evaluating step of block 14, we ask: "how do we reconcile how our wells are performing with all the other information we have obtained from other sources including seismic, wellbores, completion engineers and productivity testing?"

Performance Matches Plan, Decision Triangle Block 16

In FIG. 1, if and when the ultimate reservoir performance no longer conforms to the reservoir "Development plan", or when other conditions change, a decision is made to return, via the Revising step of block 15, to the earlier Developing Plan step of block 11 in order to revise and re-establish a new reservoir "Development plan". As a result, the "no" output from the "Performance Matches Plan" decision triangle 16 is taken. More particularly, from the Evaluating step of block 14, the original "Development Plan" is examined. According to the original Development Plan, we needed to implement certain activities in order to achieve our strategy of obtaining a first number of barrels per day from a reservoir. However, the reservoir is actually producing a second number of barrels per day from the reservoir, which is not equal to the first number of barrels per day. Having obtained a set of new information about the reservoir, how do we change the original Development Plan in view of that new information? That is, when that new data or information is evaluated, the need for a new development of the reservoir is ascertained which is different than the original development set forth in the original Development Plan. Therefore, the original Development Plan must be revised in order to produce a new Development Plan so that the new Development Plan can be reconciled with the new data or information. Stated differently, although the reservoir itself never changes, your interpretation of the reservoir changes. When the first three wells are drilled in the reservoir, your understanding of the characteristics of that reservoir (i.e., what the reservoir looks like) is clearly less than it will be later when you drill additional wells and perform a multitude of seismic tests on the reservoir and obtain additional data which characterize the reservoir. Therefore, when additional data, knowledge and understanding is obtained regarding the characteristics of the reservoir, the Development Plan for that reservoir must be revised accordingly.

As a result, in FIG. 1, the "no" output from the "Performance Matches Plan" decision triangle 16 is taken and the "Revising" step of block 15 is implemented for the purpose of revising the original Development Plan to produce the new Development Plan.

Completing, Step 17

Later, if any further new data or information being evaluated during the Evaluating step of block 14 matches the new Development Plan, the "Completing" step of block 17 is reached. That is, during the Completing step of block 17, the reservoir is depleted and, as a result, the reservoir is eventually abandoned. Each of these blocks may comprise a considerable amount of work and activity. Some details of that work and activity are found in the cited 'Satter' reference. However, be advised that the "Completing" step of block 17 is not reached until near the end of the life of the reservoir. That is, the loop in FIG. 1 (consisting of the decision triangle 16, the Revising step 15, and the other steps of the loop including blocks 11, 12, 13, 14, and 16) will be traversed a multiple number of times on a continuous basis throughout the life of the reservoir field before depleting and abandoning the reservoir.

Figure 2:
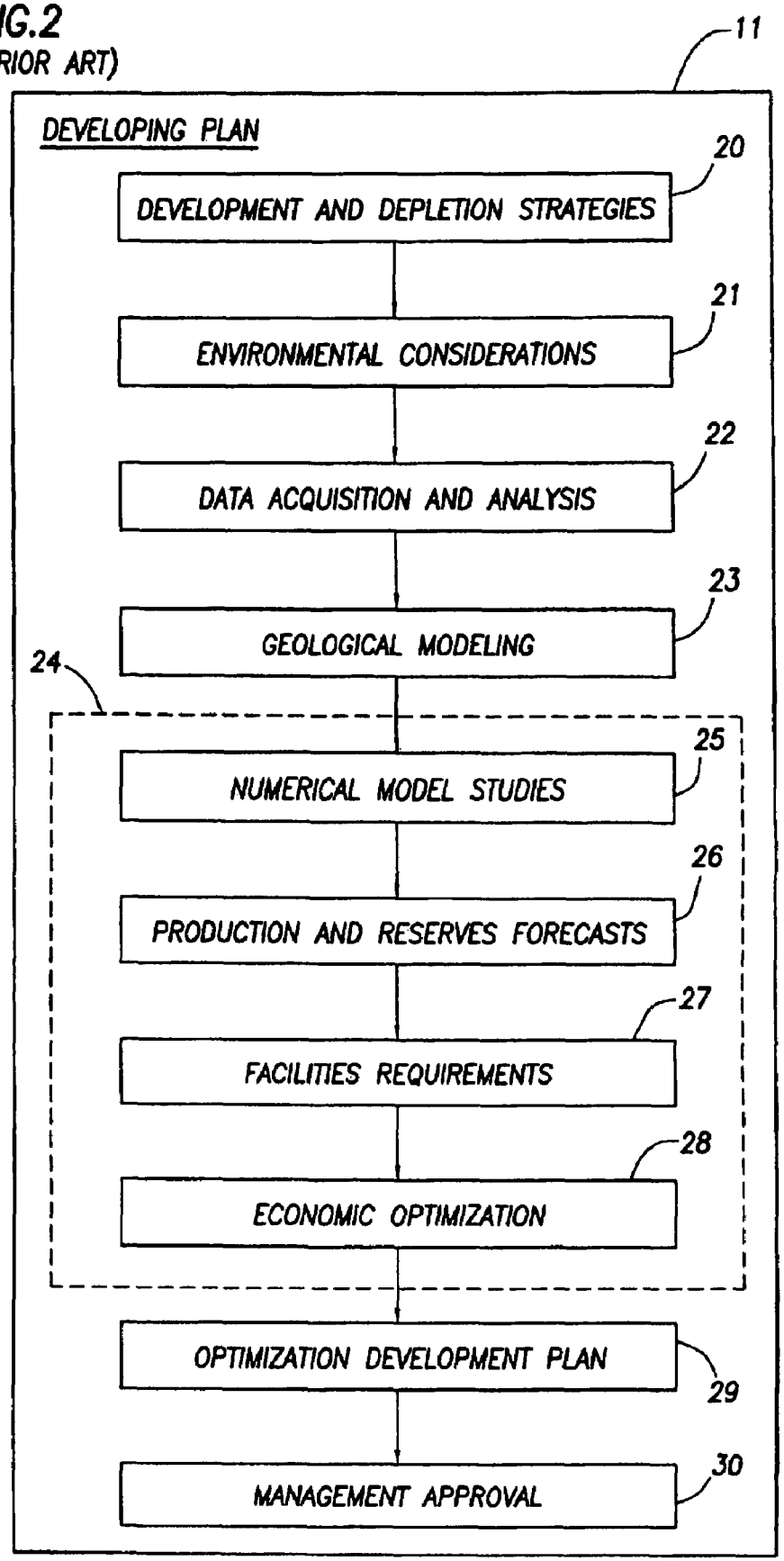
FIG. 2 illustrates a detailed construction of the Developing Plan block 11 of FIG. 1.

Referring to FIG. 2, the prior art steps involved in developing the reservoir Development Plan shown in Developing Plan block 11 of FIG. 1 is illustrated. In the "Development and Depletion Strategies" block 20 of FIG. 2, the steps for implementing an overall strategy in developing the reservoir Development Plan are first determined. The most important facet of a reservoir Development Plan are the strategies dealing with depletion of a reservoir to maximize oil recovery by applicable primary, secondary and enhanced oil recovery methods that are well known in the art. These strategies depend upon the stage in the life of the reservoir. When a reservoir is first discovered, issues such as the number of wells, well spacing, and recovery methods are the most important issues. Once the reservoir depletion mechanism is understood, secondary and tertiary recovery methods need to be investigated and implemented if deemed necessary. Therefore, the Development and Depletion Strategies of block 20 are linked not only to the size of the reservoir field, but also to where the field is physically located, the political stability of the region, and any environmental issues associated with the location of the reservoir field.

In the "Environmental Considerations" block 21 of FIG. 2, data pertaining to the environment in the area where the reservoir field is located is gathered in order to determine the steps required to develop the reservoir Development Plan. These 'environmental considerations' include: (1) ecological considerations, and (2) any federal and/or state governmental and regulatory agency rules and regulations which must be satisfied. For example, if a reservoir requires that water be injected into a well, the environmental consideration of a mountainous region surrounding the well coupled with tight governmental control over the water resources around the well would impact the strategies that are available for a particular reservoir field.

In the "Data Acquisition and Analysis" block 22 of FIG. 2, initial reservoir data is acquired and analyzed. This initial reservoir data is obtained from the following sources: seismic data, well logs, core data, geological information about the site of the reservoir, analysis of fluid samples obtained by performing well testing in the reservoir, and other geological or geophysical and other information gathered during exploration in the vicinity of the reservoir. At the early stages of the reservoir, the data collected from the reservoir is supplemented from outside sources. However, as the Development Plan is put into place, you have the opportunity to gather more and more data from new wells or wells coming into production. When the Development Plan coincides with the intended production rates from the wellbores in the reservoir field, the data collected which characterize the reservoir field includes seismic and wellbore interpretations, pressure measurements, and production rate measurement data. At some point, a single asset database must be created which contains and stores all of the data obtained from measurements taken in the reservoir over the lifetime of the reservoir field.

In the "Geological Modeling" block 23 of FIG. 2, all the above referenced data, which have been obtained during the implementation of the steps of blocks 20, 21 and 22 in FIG. 2, are integrated and combined in the "Geological Modeling" block 23 in FIG. 2 in order to create a structural and stratigraphic geological model of the reservoir. The geological model of the reservoir is derived from 'information' obtained from core and seismic and log measurements. However, that 'information' is extended by applying known concepts such as depositional environment, sequence stratigraphy, tectonism, and diagnoses. The Geological Modeling of block 23 is undertaken in order to describe the characteristics of the reservoir (i.e., to describe or ascertain what the reservoir looks like). For example, a petrophysicist looks at core analysis data and well logs to interpret properties such as porosity and water and oil saturation profiles, geomechanics look at geomechanic forces in the reservoir, geologists look at core samples in the reservoir, etc. The Preliminary Engineering phase (see FIG. 7) reconciles performance data obtained from the reservoir with the characteristics of the reservoir interpreted by a petrophysicist. The intent is to produce a coherent model of the reservoir that accommodates all the data sources that are available. In the "Numerical Model Studies" block 25 in FIG. 2, the geological model of the reservoir prepared in block 23 is then used in the Numerical Model Studies block 25 in order to prepare a numerical flow model of the reservoir that is used to estimate the distribution of gas and/or oil in the reservoir and its recovery potential. Recall that a petrophysicist and a geologist and a geophysicist each interpret the data and each contribute to a reservoir description that is the basis for the "Numerical Model Studies". The petrophysicist contributes interpretations of wellbore data. The geologist receives that wellbore data and, with his knowledge of the depositional environment and seismic interpretations, he determines how these properties are distributed throughout a 'three dimensional reservoir description'. That 'three dimensional reservoir description' (which is essentially a description of properties) is then introduced as 'input data' into the "Numerical Model Studies" block 25. The Numerical Model Studies of block 25 then, responsive to that description of properties, constructs a numerical flow model consisting of a multitude of grid blocks that represent discrete portions of the reservoir. In effect, a grid system is overlayed over the aforementioned 'three dimensional reservoir description' (hereinafter, a "model"). Each of the blocks of the grid system overlayed over the 'three dimensional reservoir description' are then assigned a specific set of properties to represent that specific portion of the reservoir. The wellbores, which have been drilled in the reservoir, are then installed into the model. The model is then tested by responding to a set of historical data of the reservoir in a 'history matching' test. If the model is responding differently than the observations in the field, one must then adjust, on an iterative basis, the description of that model in order that the model will ultimately reproduce that which has occurred in the reservoir in the past. At this point, we have a 'history matched reservoir model'. The 'history matched reservoir model' is then used as 'input data' to the "Production and Reserves Forecasts" block 26 of FIG. 2.

In the "Production and Reserves Forecasts" block 26 of FIG. 2, from the information inherent in the 'history matched reservoir model' obtained from the 'Numerical Model Study' in block 25, future production rates are simulated in the "Production and Reserves Forecasts" block 26 in FIG. 2. Well known material balance, volumetric, statistical methods (e.g., decline curve analysis), compositional, and other enhanced oil recovery numerical reservoir simulators are some of the tools used for this purpose. From the 'history matched reservoir model', do the following: conceptually design a Development Plan and set up constraints in the model. Having identified the constraints in the model, produce a 'production forecast' using the model where the 'production forecast' represents a 'performance of a reservoir' under a particular depletion plan. Then, look at that 'performance of the reservoir' that was obtained by using the model and then determine where that performance is deficient (e.g., the total production rate may fall off too quickly). At this point, ten or twelve different alternative strategies may exist that should be examined. From these ten or twelve alternative strategies, identify one or two of the aforementioned ten or twelve strategies that show the most promise and focus on those one or two strategies. Then, look at ways for optimizing the details of implementing the Development Plans associated with those one or two strategies. Those 'production forecasts and their associated capital investment plans' are the basis of running the "Facilities Requirements", block 27 in FIG. 2.

In the "Facilities Requirements" block 27 in FIG. 2, the 'production forecasts and associated capital investment plans' (i.e., the future production rates information) are needed in the "Facilities Requirements" block 27 to establish requirements for physical plant facilities, such as, but not limited to, downhole and surface flow strings, pumps, separators, treaters, and surface storage that will be needed to produce oil and/or gas from the reservoir. Therefore, from the aforementioned 'production forecasts and associated capital investment' information, the volumes which you must be able to handle are known and the pressure levels are also known. As a result, the facilities which are needed for those particular volumes and pressure levels are also known.

In the "Economic Optimization" block 28 in FIG. 2, the information obtained or derived from the previous blocks is analyzed in order to optimize the future economic return from the reservoir. That is, "Economic Optimization" relates to the process of deciding which of the development strategies best suits your overall corporate strategy for the particular resource or reservoir field. Generally higher recovery efficiency for a given reservoir can be achieved with higher associated production costs for each incremental barrel. Therefore, the process of Ecomonic Optimization involves the following considerations: what a company's financial resources are, whether this is a core property, whether this is a cash cow to generate cashflow for other properties, what processes meet your minimum rate of return requirements, what is the sensitivity to oil pricing, and, coupled with Economic Optimization is consideration of risk (i.e., what if the true volume of the reservoir is only 75% of what we think is the volume of that reservoir).

In the "Optimization Development Plan" block 29 of FIG. 2, the optimized economic information from block 28 is expressed as a development plan to be used for management review and approval, and then for development of the reservoir. An approved development plan is then implemented by the field or reservoir asset team. That is, having done the aforementioned risk analysis and economic projections for various depletion alternatives, a series of charts are produced for each development case which present additional considerations that must be taken into account. For example, one such additional consideration might be 'maximizing your net present value by recovering and producing less oil'. Therefore, these additional considerations are overlayed onto the above referenced considerations associated with "Economic Optimization". At this point, the "Reservoir Development Plan" is complete, and that Development Plan must now be submitted for management approval.

In the "Management Approval" block 30 of FIG. 2, management carefully reviews and approves the aforementioned "Reservoir Development Plan" constructed in the previous steps and work now begins to withdraw oil or gas from the reservoir. If changes to the reservoir development plan are warranted, the previously described steps in blocks 20 through 28 are repeated to derive a revised optimized Reservoir Development Plan for re-review by management.

In FIG. 2, although the steps of blocks 25 through 28 are illustrated as being performed sequentially, per the Satter reference, they are often performed in parallel or iteratively. One example of this consists of the group of activities set forth in blocks 25 through 28 which are enclosed by dotted line block 24 in FIG. 2. The Currie, Bittencourt, Beckner, and Zakirov papers listed in the References Section near the end of this detailed description describe an iterative series of steps to carry out steps 25 through 28.

Figure 3:
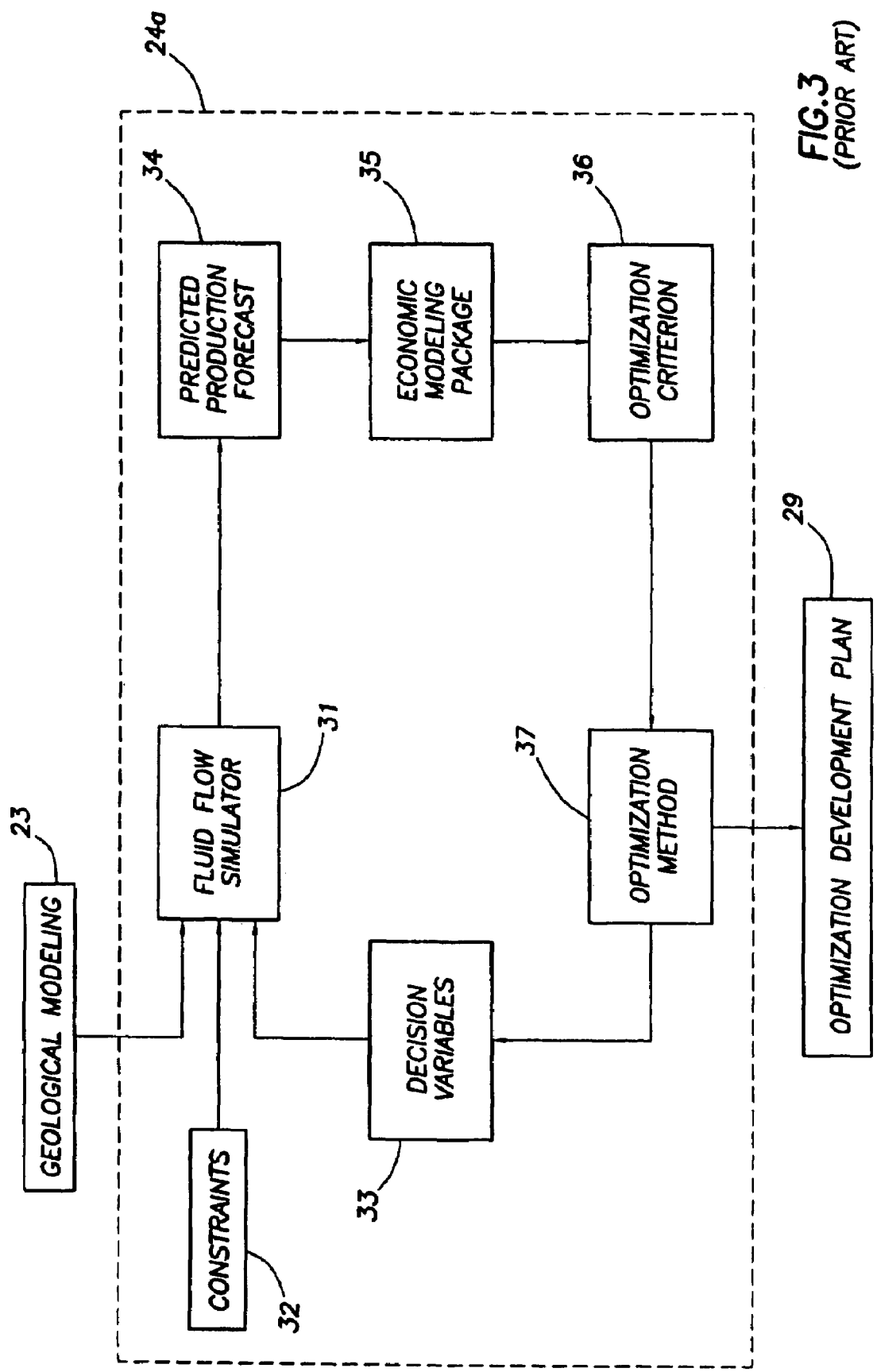
FIG. 3 illustrates an alternate construction of block 24 of the Developing Plan block of FIG. 2.

Referring to FIG. 3, a different construction of block 24 of FIG. 2 is illustrated. In FIG. 3, block 24A represents a construction which is different than the construction of block 24 in FIG. 2. In FIG. 2, block 24 illustrates a cascading linear process where one block leads to the next block. However, in FIG. 3, block 24A illustrates an iterative process. That is, block 24A of FIG. 3 illustrates a variant prior art method for performing some of the steps in the management of oil or gas reservoirs in a non-sequential manner. The non-sequential steps in block 24A of FIG. 3 would replace the sequential steps in block 24 of FIG. 2.

In FIG. 3, block 24A, the Geological Model 23 flows into the fluid flow simulator of block 31 which has a series of constraints, block 32, applied thereto. Presumably, the fluid flow simulator 31 has been calibrated or history matched. Therefore, the fluid flow simulator 31, having the constraints 32 as an input, will produce a production forecast, block 34. The production forecast 34 also include: the facilities that have been added, the wells that have been drilled, and associated capital and operating costs which then flow into the Economic Modeling Package, block 35. From the Economic Modeling Package 35, the results obtained from the Economic Modeling Package 35 are examined, in the Optimization Criterion block 36, to determine how that case performed economically against your criteria for selecting an economic process (which might include present value, rate of return, or a combination of the two, and risk). From the Optimization Criterion block 36, you would propose a method of changing the Development Plan in the Optimization Method block 37. Certain Decision Variables, block 33, must be taken into account. At this point, we reenter the Fluid Flow Simulator 31 again, run a new forecast, and repeat the process. FIG. 3 illustrates a better display of the activities occurring between the geologic description of the reservoir and the resultant production of a Development Plan in view of that geologic description.

In FIG. 3, like block 24 in FIG. 2, block 24A has an input which originates from the Geological Modeling block 23, and block 24A provides an output to the Optimized Development Plan block 29. The geological model of the reservoir, which is developed in Geological Modeling block 23, is input to 'Fluid Flow Simulator' block 31, along with two other inputs. An output from the 'Flow Simulator' block 31 represents a calculated flow simulation of the reservoir. One of the other inputs to block 31 is information regarding physical constraints concerning the reservoir originating from 'Constraints' block 32, such as the flow capacity of an existing or a planned surface gathering network. The last input to block 31 is a set of assumptions about how the reservoir would be managed as expressed by a set of decision variables or parameters in the 'Decision Variables' block 33. The 'Decision Variables' of block 33 are development scenarios which include the following: details about a future development drilling program (such as well placement), the total number of wells to be drilled, the drilling sequence, the vertical-versus-horizontal orientations, and the facilities design criteria. The facilities design criteria would include, for example, the size of oil, gas and water gathering and handling facilities. The calculated flow simulation from 'Flow Simulator' block 31 is input to the 'Predicted Production Forecast' block 34 which uses it and all the information described in the previous paragraph from blocks 32 and 33 to predict potential or hypothetical well and reservoir production forecasts for each development scenario. The resulting family of production forecasts, which are output from block 34, is evaluated in the 'Economic Modeling Package' block 35. The 'Economic Modeling Package' block 35 evaluates the resulting family of production forecasts by using economic modeling processes to calculate, among other things, net present value and total economically recoverable reserves of the reservoir for each of the development scenarios. The economic modeling information derived at block 35 is input to the 'Optimization Criterion' block 36 where the criteria to be used in optimizing the reservoir development plan are selected. In the 'Optimization Method' block 37, an optimization procedure determines the best reservoir management scenario, the corresponding decision variables, the optimum development plan, and the associated set of facilities requirements. After optimization has been achieved (by however many re-iterations of the processing are necessary within blocks 31 through 37), an optimized reservoir management scenario and other information are output to the 'Optimized Development Plan' block 29, where that optimized information is related to and corresponds to a Development Plan. That Development Plan is submitted to management for management review and approval, and it is then used for all other well known activities in the development of a particular reservoir.

Figure 4:
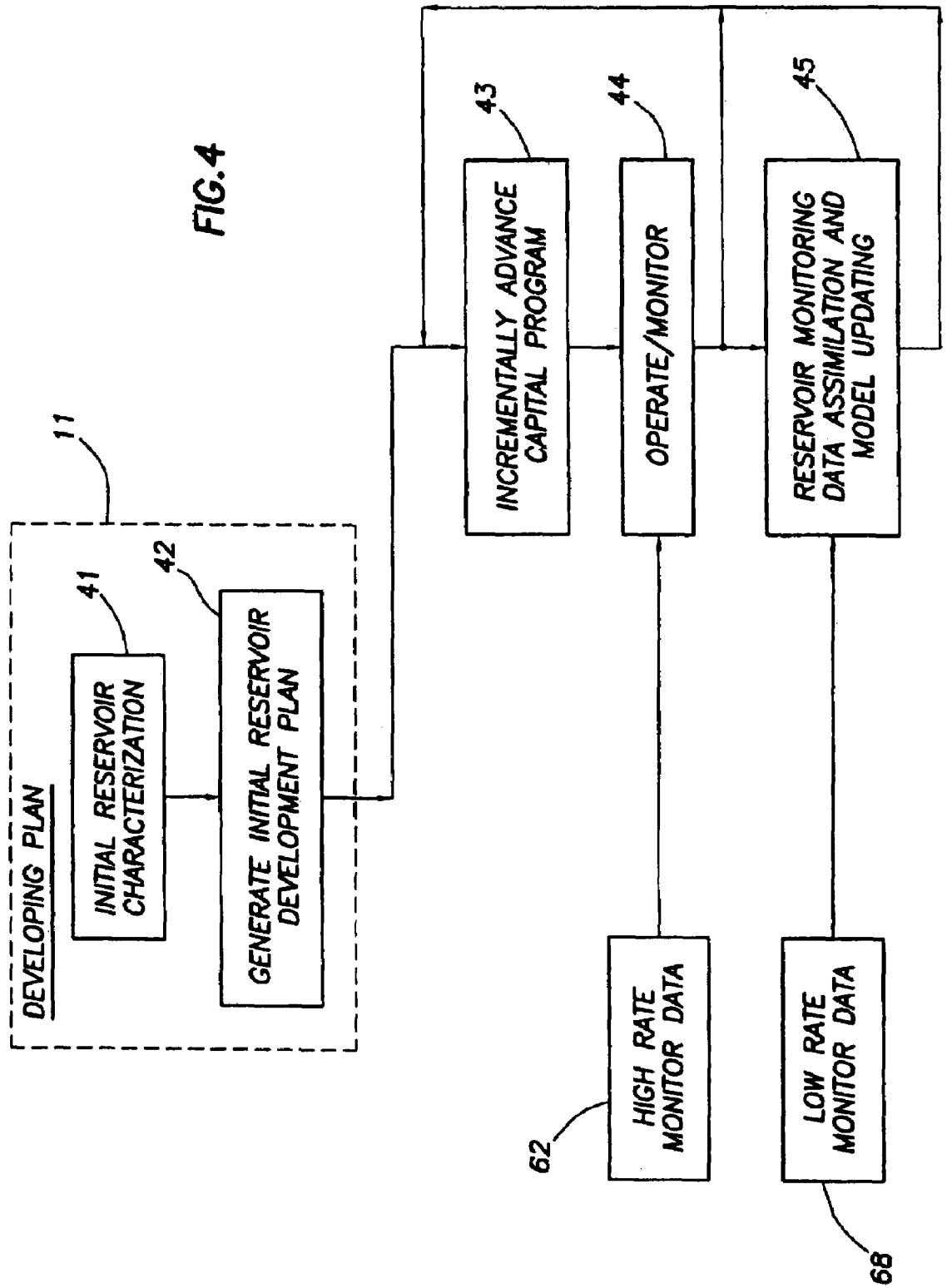
FIG. 4 illustrates a new and novel method, relative to the prior art method of FIG. 1, for managing a gas or oil reservoir in accordance with the teachings of the present invention.

Referring to FIG. 4, a new and novel method is illustrated for managing a gas or oil reservoir in accordance with the teachings of the present invention. The new and novel method for managing a gas or oil reservoir as shown in FIG. 4 is an improvement to the prior art method of managing a gas or oil reservoir as shown in FIG. 1.

In FIG. 4, turning now to describe the invention, the present invention comprises a novel method, described below with reference to FIG. 4, for managing a fluid (e.g., oil) or gas reservoir. The novel method manages the fluid and/or gas reservoir by continuously measuring, collecting, and assimilating different types of data obtained from different types of measurements (hereinafter, 'diverse data') for the ultimate purpose of obtaining an improved understanding of a particular reservoir. During and as a result of the continuous assimilation of the aforementioned 'diverse data', a continuously updated Reservoir Development Plan is produced. The continuously updated Development Plan results in an ongoing optimization of reservoir resources as described below with reference to FIGS. 5 through 16.

The aforementioned 'diverse data' comprises data acquired at different rates, the 'diverse data' ranging from 'time-lapse measurements' to 'continuous measurements' which produce data streams that are acquired with permanently installed data acquisition systems known in the art. The 'diverse data' range in spatial coverage from 'local well and surface monitoring data' to 'global reservoir-scale monitoring measurements'. Examples of 'local well and surface monitoring data' include: (1) data produced during re-entry cased-hole logging, and (2) data measured by permanent pressure gauges and formation evaluation sensors placed inside and outside cased wells. These individual local well and surface monitoring data acquisition methods and apparatus are taught in the Baker, Babour, Tubel, Johnson, Bussear and other references cited in the References Section at the end of this detailed description. Examples of the 'global reservoir-scale monitoring measurements' (i.e., the more spatially extensive reservoir monitoring measurements) include: (1) time-lapse or 4D seismic, (2) gravimetry, and (3) deep-reading and cross-well electrical and acoustic reservoir measurements. These individual reservoir monitoring measurement methods and apparatus are taught in the Pedersen, Babour, He and other references cited in the References Section.

The industry is increasingly faced with the challenge of determining how to assimilate the growing amount of incoming streams of 'diverse data' which characterize or represent a reservoir. The assimilation of the 'diverse data' is necessary in order to: (1) update an estimate of the spatial distribution of the reservoir properties, (2) update the hydrocarbon saturation and pressure distribution in the reservoir, and then (3) modify the corresponding Reservoir Development Plans accordingly, within the constraints resultant from prior development implementation. This is particularly challenging because the plethora of incoming data streams associated with the 'diverse data' often comprise a mix of time scales and spatial scales of coverage. The reservoir management methodologies presented in the cited Satter reference and other cited related publications and references are not adequate to assimilate the different arrays of well and reservoir 'diverse data'.

FIG. 4 illustrates a general block diagram of a plurality of method steps in accordance with the present invention for systematically assimilating 'diverse data' (i.e., different types of measured data collected from a particular reservoir). The systematic assimilation of the 'diverse data' is required for the purpose of: (1) improving our understanding of the particular reservoir, (2) producing a continuously updated Development Plan corresponding to the particular reservoir, and (3) implementing a continuously changing plan within pre-established constraints for optimization of a plurality of resources associated with the particular reservoir in response to the continuously updated Development Plans.

In FIG. 4, the novel reservoir optimization method shown in FIG. 4, for assimilating the 'diverse data' having different acquisition time scales and spatial scales of coverage, differs from reservoir management practices taught in the prior art in substantial ways. That is, in accordance with one feature of the present invention, the new reservoir optimization method shown in FIG. 4 includes parallel execution of local ("well-regional evaluation") and global ("field-reservoir evaluation") data assimilation, as shown in detail in FIG. 5.

In FIG. 1, the 'Developing Plan' block 11 of FIG. 1 includes the 'Initial Reservoir Characterization' block 41 of FIG. 4 and the 'Generate Initial Reservoir Development Plan' block 42 of FIG. 4.

In FIG. 4, the process begins with the 'Initial Reservoir Characterization' block 41 which is operatively connected to the 'Generate Initial Reservoir Development Plan' block 42. In the 'Initial Reservoir Characterization' of block 41, an initial reservoir characterization is performed which results in the production of a reservoir model. The overall function of the 'Initial Reservoir Characterization' block 41 is generally similar to the overall function performed by the 'Data Acquisition and Analysis' block 22 and the 'Geological Modeling' block 23 in FIG. 2. However, in accordance with another feature of the present invention, the new and novel method by which the 'Initial Reservoir Characterization' block 41 performs the initial reservoir characterization is discussed in detail below with reference to FIGS. 7, 8, 9, and 10 of the drawings.

In the 'Generate an Initial Reservoir Development Plan' of block 42, an initial Reservoir Development Plan is produced using the acquired, collected data. In addition, in block 42, an initial production forecast and an initial economic analysis for the reservoir are created. The overall function of the 'Generate an Initial Reservoir Development Plan' block 42 is generally similar to the overall functions performed by blocks 25 through 28 in FIG. 2. However, in accordance with another feature of the present invention, the new and novel method by which the 'Generate an Initial Reservoir Development Plan' block 42 produces the initial Reservoir Development Plan using the acquired data and creates the initial production forecast and the initial economic analysis for the reservoir is discussed in detail below with reference to FIGS. 7, 11, 12, 13, 14, 15, and 16 of the drawings.

Therefore, in accordance with another feature of the present invention, a detailed construction of the 'Initial Reservoir Characterization' block 41 and a detailed construction of the 'Generate Initial Reservoir Development Plan' block 42 will be discussed below with reference to FIGS. 7 through 16 of the drawings.

In FIG. 4, the next step in FIG. 4 is the 'Incrementally Advance Capital Program' block 43. This step is generally similar to that performed in the 'Implementing' block 12 in prior art FIG. 1, and it includes such activities as designing, drilling and completing wells, and implementing surface facilities. In the 'Incrementally Advance Capital Program' block 43, we have already completed the process of reservoir characterization and generating a development plan for the field. However, we still realize that there are some unresolved uncertainties. As a reservoir field gets older and we drill more and more wells, the amount of the uncertainties changes substantially. But, if we are in the early stages of reservoir field development, the Reservoir Development Plan will be strongly influenced by the drilling and production success of the initial few development wells. With a development plan calling for the drilling of 60 wells, for example, an initial budget might call for drilling only 10 of those wells. Therefore, this process calls for incrementally advancing the capital spending according to the development plan, but, at the same time, recognizing that you might need to adjust that development plan.

Figure 5:
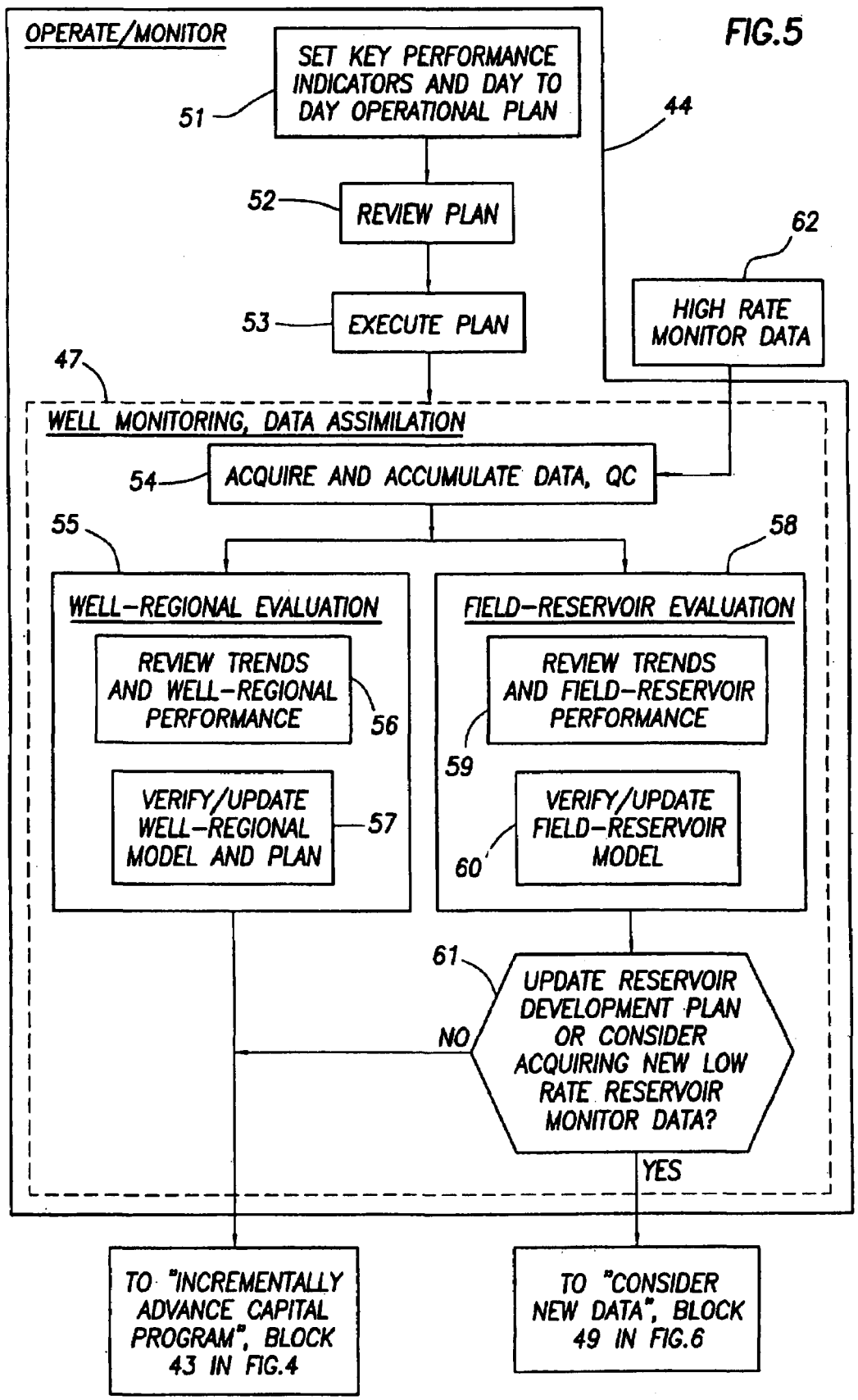
FIG. 5 illustrates a detailed construction of the operate/ monitor block 44 of FIG. 4.
Figure 6:
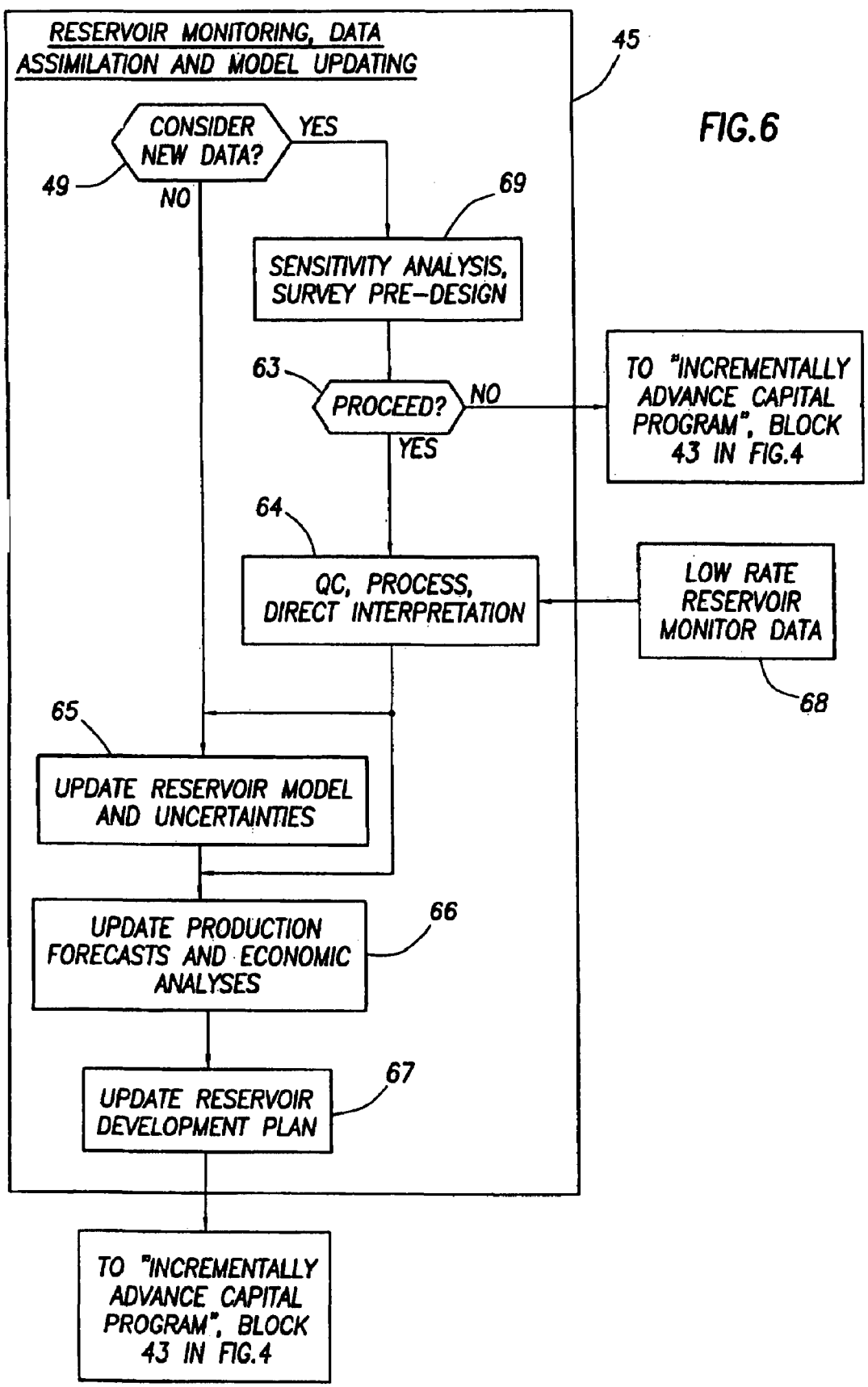
FIG. 6 illustrates a detailed construction of the Reservoir Monitoring Data Assimilation & Updating block 45 of FIG. 4.

In FIG. 4, the next two steps include the 'Operate/Monitor' block 44 and 'Reservoir Monitoring, Data Assimilation & Model Updating' block 45, each of which are expanded in FIGS. 5 and 6, respectively. In FIG. 4, by advancing the capital program in the 'Incrementally Advance Capital Program' block 43, more data and more information is acquired during the operating and monitoring step in the 'Operate/Monitor' block 44. In addition, the information that results from the reservoir monitoring and data assimilation and model updating step in the 'Reservoir Monitoring, Data Assimilation & Model Updating' block 45 loops back to the input of the 'Incrementally Advance Capital Program' block 43. As a result, any new interpretations that are created may subsequently affect the rate at which you continue to advance your development program. For example, if your initial development plan calls for drilling 10 wells in the first year in a reservoir field and then drilling an additional 20 more wells in the second year, the results obtained from the drilling of the initial 10 wells might change your initial development plan. For example, instead of drilling the additional 20 more wells in the second year as called for in the initial development plan, you might instead rewrite the development plan to call for the drilling of only 8 of the 20 wells and then, in addition, the running of a 3D seismic program.

In the 'Operate/Monitor' block 44 of FIG. 4, the day-to-day field operations are managed by a day-to-day operational plan that includes wellbore and surface operations to be conducted, such as well choke settings and intervention and work-over operations. The day-to-day operational plan is derived by transforming the longer-term reservoir development plan into a sequence of day-to-day operations that meet a set of key performance indicators. In addition, in block 44, constant monitoring of reservoir performance is necessary using high rate monitor data from the 'High Rate Monitor Data' block 62 to determine if the reservoir performance is conforming to the Reservoir Development Plan.

In the 'Reservoir Monitoring, Data Assimilation & Model Updating' block 45, different reservoir performance is measured using low rate monitor data from the 'Low Rate Monitor Data' block 68. The high rate monitor data and low rate monitor data are both assimilated and used to determine if the reservoir model should be updated. If it is decided that the reservoir model needs updating, the reservoir model is subsequently updated accordingly.

In FIG. 4, with reference to blocks 43, 44, and 45, two things should be noted about the novel methodologies described above with reference to blocks 43, 44 and 45. First, data collected at very different sampling rates are handled differently. Acquired data obtained at a rapid sampling rate (i.e., the high rate monitor data 62), such as that from wellbore and surface permanent pressure gauges, temperature sensors, and flow-rate devices, are handled differently than acquired data obtained at lower sampling rates (i.e., the low rate reservoir monitor data 68), such as time-lapse seismic. Second, data acquired with very different degrees of spatial coverage are handled differently. That is, acquired data that are related to the wellbore and surface hydrocarbon delivery system (e.g., pressure and production data) are handled differently from acquired data that are related to the reservoir drainage process (e.g. time-lapse seismic, gravimetry, deep probing reservoir electrical data).

The steps of the method performed by blocks 43, 44 and 45 are a novel expansion upon the steps performed at the 'Implementing' block 12, Monitoring block 13 and Evaluating block 14 in FIG. 1 in accordance with the teaching of the present invention.

In the prior art, the performance of reservoirs is monitored but the acquired data is assimilated into the model description and development plans on an infrequent basis to change a long-term reservoir development plan. From the long-term development plan, changes in equipment and pumping rates are only made on a monthly, quarterly, semi-annual, or even longer basis. In contrast, in accordance with the teaching of the present invention, the performance of reservoirs is monitored not only on an infrequent basis to yield low rate monitor data (block 68 in FIG. 4), but also on a frequent basis to yield high rate monitor data (block 62 of FIG. 4).

In FIG. 6, there exists both a Reservoir Development Plan and a day-to-day Operational Plan. Both the low rate reservoir monitor data and the high rate reservoir monitor data are used to continually update the Reservoir Development Plan in the 'Update Production Forecasts and Economic Analysis' block 66 of FIG. 6 and the 'Update Reservoir Development Plan' block 67 of FIG. 6, and from that updated Reservoir Development Plan, the day-to-day Operational Plan is also continually updated. The result is a more comprehensive method for better maximizing the production of gas and/or oil from a reservoir. Exemplary sources of high rate monitor data, block 62, and low rate monitor data, block 68, are detailed above.

Referring to FIGS. 5 and 6, referring initially to FIG. 5, the method steps performed in the 'Operate/Monitor' block 44 of FIG. 4 are discussed below with reference to FIG. 5. In addition, in FIG. 6, the method steps performed in the 'Reservoir Monitoring, Data Assimilation and Model Updating' block 45 of FIG. 4 are discussed below with reference to FIG. 6.

In FIG. 5, a more detailed expansion of the method steps represented in the 'Operate/Monitor' block 44 of FIG. 4 is illustrated. There are four main method steps comprising the Operate/Monitor block 44 as shown in FIG. 5. These steps are shown as blocks 51, 52, 53 and 47.

In FIG. 5, the first main step in the 'Operate/Monitor' block 44 is the 'Set Key Performance Indicators & day to day operational plan' block 51. Key performance indicators may include, for example, targets for oil and/or gas delivery by individual well or sets of wells, and the surface pipeline network to the point-of-delivery.

In FIG. 5, the second main step in the 'Operate/Monitor' block 44 is to frequently and periodically (e.g. daily or weekly) review the key performance indicators and to define and update the associated day-to-day operational plan, as represented by the 'Review Plan' block 52. The key performance indicators are periodically assessed to determine whether or not they are being met, that is, to determine whether or not current reservoir hydrocarbon production rates are meeting the planned levels of production. If not, the day-to-day operational plan is updated (for example, to intervene and correct production problems limiting production from one or more wells) and the cycle is then repeated. The day-to-day operational plan is derived by transforming the Reservoir Development Plan into a sequence of day-to-day operations designed to meet the set of key performance indicators defined in the 'Set Key Performance Indicators . . . ' block 51. The day-to-day operational plan may include, for example, (a) acidizing or fracturing work-over operations to enhance well productivity, (b) cement squeeze, gel injection, or re-perforating to alter the connectivity of the wellbore with different reservoir layers, (c) balancing 5-spot or 9-spot injection off-take rates for improved drainage, (d) adjusting the downhole flowrate, and/or (e) adjustment at well heads and at surface gathering system settings, with intelligent completion systems that comprise a set of flow control devices built into the well completion. These individual techniques (a)-(d) are taught in cited prior art references, such as Tubel, listed in the References Section at the end of this detailed description.

In FIG. 5, the third main step in the 'Operate/Monitor' block 44 is to continuously execute the current amended day-to-day operational plan as represented at 'Execute Plan' block 53 and extract hydrocarbons from the reservoir in an optimized manner.

In FIG. 5, the fourth main step in the 'Operate/Monitor' block 44 is to monitor well delivery data and assimilate the data obtained by the steps performed in the 'Well Monitoring, Data Assimilation' block 47. In order to assure that the short-term key performance indicators are being met, and to adjust the day-to-day operational plan to meet the short-term key performance indicators, oil and/or gas delivery rate data from different wells in the reservoir are monitored by types of monitoring apparatus well known in the art. The data are then processed at 'Well Monitoring, Data Assimilation' block 47 to determine if the short-term key performance indicators are being met and to adjust the day-to-day operational plan if necessary to meet those key performance indicators. To do this, high rate monitor data from the wells (see 'High Rate Monitor Data' block 62) are first acquired, accumulated and quality checked at 'Acquire & Accumulate Data, QC' block 54 in FIG. 5. The 'high rate monitor data' are typically readings of well or surface pressures and oil-water-gas flow rates from each well, which are measured using well known pressure gauges, temperature sensors, flow-rate devices and separators. The 'high rate monitor' data are used in two very different ways in the process performed at 'Well Monitoring, Data Assimilation' block 47. These two different uses are described in the following paragraphs for each of: (a) the evaluation of a "localized" or single well, or regional/several wells in an area in the 'Well—Regional Evaluation' block 55; and (b) the evaluation of a global field or reservoir in the 'Field—Reservoir Evaluation' block 58.

In FIG. 5, the step of evaluation of a single well or regional/several wells is accomplished in the 'Well—Regional Evaluation' block 55. To perform this step in the process, the trends in the accumulated and checked high rate monitor data are first generated and then reviewed in the context of the single well or regional/several well performance in the 'Review Trends and Well-Regional Performance' block 56. This includes, for example, a review of bottom-hole and surface flowing pressures, multi-phase flow rates, etc, that are used to indicate the degree to which the single well or several wells is meeting production potential. Such data provide various diagnostic information, including water and/or gas breakthrough in oil producing zones, differential pressure decline in different layers, and skin buildup that impedes fluid movement in the vicinity of the wellbore. Also included in this evaluation is the analysis of data coming from 'in situ' reservoir formation evaluation sensors inside and outside well casings, such as an array of electrical resistivity electrodes to monitor the movement of formation water behind the well casings. Such electrical resistivity arrays are taught in the cited Babour reference.

In FIG. 5, the single well or regional/several well production model is then verified and/or updated in the 'Verify/Update Well—Regional Model and plan' block 57. The well or local reservoir model is updated to include the latest measurements of oil, gas and water saturation distribution around the well, as well as improved understanding of the well bore skin factor, storage, and connectivity architecture evidenced by uneven pressure decline.

In FIG. 5, the step of evaluation of a global field or reservoir is accomplished in the 'Review Trends and Field—Reservoir Performance' block 59. To perform this step in the process, trends in the high rate data from 'High Rate Monitor Data' block 62 are first generated and then reviewed in the context of the field or reservoir performance in the 'Review Trends and Field-Reservoir Performance' block 59. This includes bottom-hole and surface shut-in pressures and/or transient testing responses, multiphase flow-rate, etc, that indicate the degree to which the reservoir or a sector of the reservoir is draining during production.

In FIG. 5, the global field or reservoir model is then verified at 'Verify/Update Field—Reservoir Model' block 60. Discrepancies between the global field-reservoir model and the field reservoir performance may be observed, such as for example, different saturation distributions and/or different pressure distributions across the reservoir and/or between the reservoir zones, suggesting that the reservoir model and/or the reservoir development plan should be updated.

In FIG. 5, based on the results of the evaluation at 'Field—Reservoir Evaluation' block 58, it may be decided to update the Reservoir Development Plan and/or to consider acquiring additional low rate reservoir monitor data. This is done in the 'Update Reservoir Development Plan or Consider Acquiring Reservoir Monitor Data' decision triangle 61 in FIG. 5. The Reservoir Development Plan may need modifying, for example, if pressures are found to be declining in an uneven manner across the reservoir, suggestive of a sealing fault with an undrained reservoir compartment that requires additional in-fill drilling. Or, additional/new low rate reservoir monitor data may be considered if a sufficient time has elapsed since the last reservoir monitoring data (e.g. time-lapse seismic) were acquired, and another survey is needed. If the decision is made to update the Reservoir Development Plan or to consider acquiring new reservoir monitor data, the process goes to the 'Reservoir Monitoring, Data Assimilation & Model Updating' block 45 in FIG. 4, the detailed step(s) of which are described with reference to FIG. 6. If the decision is made not to update the Reservoir Development Plan or to consider acquiring new reservoir monitor data, the process goes to the 'Incrementally Advance Capital Program' block 43 in FIG. 4.

As illustrated in FIG. 4, the results output from 'Operate/Monitor' block 44 can continue to loop back to the input of 'Incrementally Advance Capital Program' block 43 to be re-processed therein, before again being processed in the 'Operate/Monitor' block 44 wherein the step in 'Set Key Performance Indicators' block 51 of FIG. 5 is redone to assure that the short-term reservoir management operational goals are being met. When it is affirmatively decided to update the Reservoir Development Plan or to consider acquiring new reservoir monitor data in decision block 61 of FIG. 5, the process moves to the less frequent, low rate (e.g. monthly or yearly) updating activity shown as multiple steps in the 'Reservoir Monitoring, Data Assimilation and Model Updating' block 45 in FIG. 4, the detailed steps of which are described herein with reference to FIG. 6.

In FIG. 6, entry into the analysis process steps shown in FIG. 6 occurs under two circumstances. Either the high rate reservoir monitor data from block 62 and processed in blocks 54 and 58 in FIG. 5 have indicated that the reservoir model and accompanying Reservoir Development Plan need modifying, or it is appropriate to consider the acquisition of new low rate reservoir monitor data. Accordingly, a decision is made in the 'Consider New Data' decision triangle 49 whether or not to consider acquiring new low rate (infrequent) reservoir monitor data. This low rate monitor data includes, for example, time-lapse seismic, repeat through-casing borehole data such as deep-reading vertical seismic profiles, gravimetry, sonic imaging, and cross-well or behind-casing deep-reading monitoring measurements, such as electrical resistivity. As mentioned previously, electrical resistivity measurements are described in the cited Babour reference.

In FIG. 6, if the decision made in the "Consider New Data" decision triangle 49 is 'Yes', the first step is to perform a study in the 'Sensitivity Analysis, Survey Pre-design' block 69. The objectives of the process steps in block 69 are first to assure, before expending resources developing and executing a reservoir monitoring operation, that the measurements are expected to bring needed information. In particular, a time-lapse reservoir monitoring system is numerically simulated in order to predict what sensor measurements would hypothetically be provided by such a system if it were implemented. This step allows the user to identify whether or not the expected signal is large enough to be detected and has the potential to provide the anticipated benefits. The second objective at block 69 of FIG. 6 is to use the same reservoir monitoring numerical modeling procedures to optimize the design of the monitoring sensor hardware and data acquisition system.

In FIG. 6, based on the 'sensitivity analysis survey and survey pre-design' at block 69, a decision is made, in the 'Proceed' decision triangle 63, whether or not to proceed with collecting and analyzing low rate reservoir monitoring data. If the decision is 'No' in the 'Proceed' decision triangle 63, the process leads to the 'Incrementally Advance Capital Program' block 43 in FIG. 4. If the decision is 'Yes' in the 'Proceed' decision triangle 63, the process leads to the block entitled 'QC, Process, Direct Interpretation' block 64 where the acquisition of new low rate reservoir monitor data, such as time-lapse seismic or deep electrical measurements, is obtained, checked, processed and interpreted. To be used for this purpose, an input to this step is the low rate (infrequent) reservoir monitor data from the 'Low Rate Monitor Data' block 68. More particularly, in block 64, the low rate reservoir monitor data are first quality checked, processed, and directly interpreted. For seismic data, this activity is similar to the traditional 3D seismic processing activity. For electrical resistivity array measurements, this activity is a direct processing of the electrical data, for example, by numerical inversion methods. Under favorable conditions, the outcome of this step is a "snapshot" or a view of the probed part of the reservoir at the time period of the data acquisition. This view of the reservoir can provide information about the patterns or spatial distribution of fluids in the reservoir such as oil, water and gas. The direct interpretation step in block 64 of FIG. 6 may require use of the existing reservoir model information, for example, the model developed during the characterization in the 'Initial Reservoir Characterization' block 41 in FIG. 4, or an updated model from a previous iterative activity in the 'Update Reservoir Model and Uncertainties' block 65 in FIG. 6.

In FIG. 6, in certain cases, the result of the direct interpretation step in block 64 of FIG. 6 is itself sufficient to determine opportunities to enhance reservoir drainage, e.g. identifying, through time-lapse seismic, a fault block that has not drained, or identifying, through time-lapse electrical mapping, a layer with unswept oil. In this case, the process may proceed directly to the steps performed in the 'Update Production Forecasts And Economic Analysis' block 66 in FIG. 6 where an economic analysis to justify the investment is performed before the Reservoir Development Plan is updated in the 'Update Reservoir Development Plan' block 67 in order to incorporate appropriate plans, e.g. to drill additional well(s) to drain a fault block.

In other cases, more advanced treatment of the data from 'Low Rate Monitor Data' block 68 is needed to update the model for the distribution of reservoir properties and the associated uncertainties at 'Update Reservoir Model and Uncertainties' block 65. This may be the case in very heterogeneous reservoirs or reservoirs in which more than one property is varying at a time and multiple data measurement types are acquired. This is described in the cited 'Yu' reference. In this case, in the 'Update Reservoir Model and Uncertainties' block 65, the processed low rate monitoring data from the 'QC, Process, Direct Interpretation' block 64 are combined with all other available reservoir information, including 'high rate monitor data' from block 62 in FIG. 5. The activity in the 'Update Reservoir Model . . . ' block 65, of updating the reservoir model and associated uncertainties, may alternatively be entered directly from the 'Consider New Data' decision triangle 49 as shown. The fluid flow simulator model is altered to reproduce the acquired reservoir production data by history matching as is taught in the cited Guerillot, Stein and Wason references. The degree of uncertainty in the reservoir simulator parameters is re-computed to account for the new reservoir measurements.

In FIG. 6, the updated reservoir model and uncertainties information produced from the 'Update Reservoir Model . . . ' block 65 are used to re-compute production forecasts in the 'Update Production Forecasts and Economic Analysis' block 66 in FIG. 4, and the Reservoir Development Plan is then updated in the 'Update Reservoir Development Plan' block 67. The details of this procedure are similar to the process previously described with reference to FIG. 3.

In FIGS. 4 and 6, the 'output' from the 'Update Reservoir Development Plan' block 67 in FIG. 6 is as follows: a periodically updated Reservoir Development Plan and description of the reservoir performance, uncertainties, and future production forecasts. As shown in FIG. 4, the output of block 67 of FIG. 6 continues to loop back to the input of the 'Incrementally Advance Capital Program' block 43 in order to continue carrying out the 'Incrementally Advance Capital Program' step in block 43 and the 'Operate/Monitor' step in block 44.

Thus, unlike anything known or taught in the prior art, 'diverse data', having different acquisition time scales and spatial scales of coverage, is systematically assimilated for improved reservoir understanding which thereby insures a continually updated Reservoir Development Plan for an ongoing optimization of reservoir resources.

Figure 7:
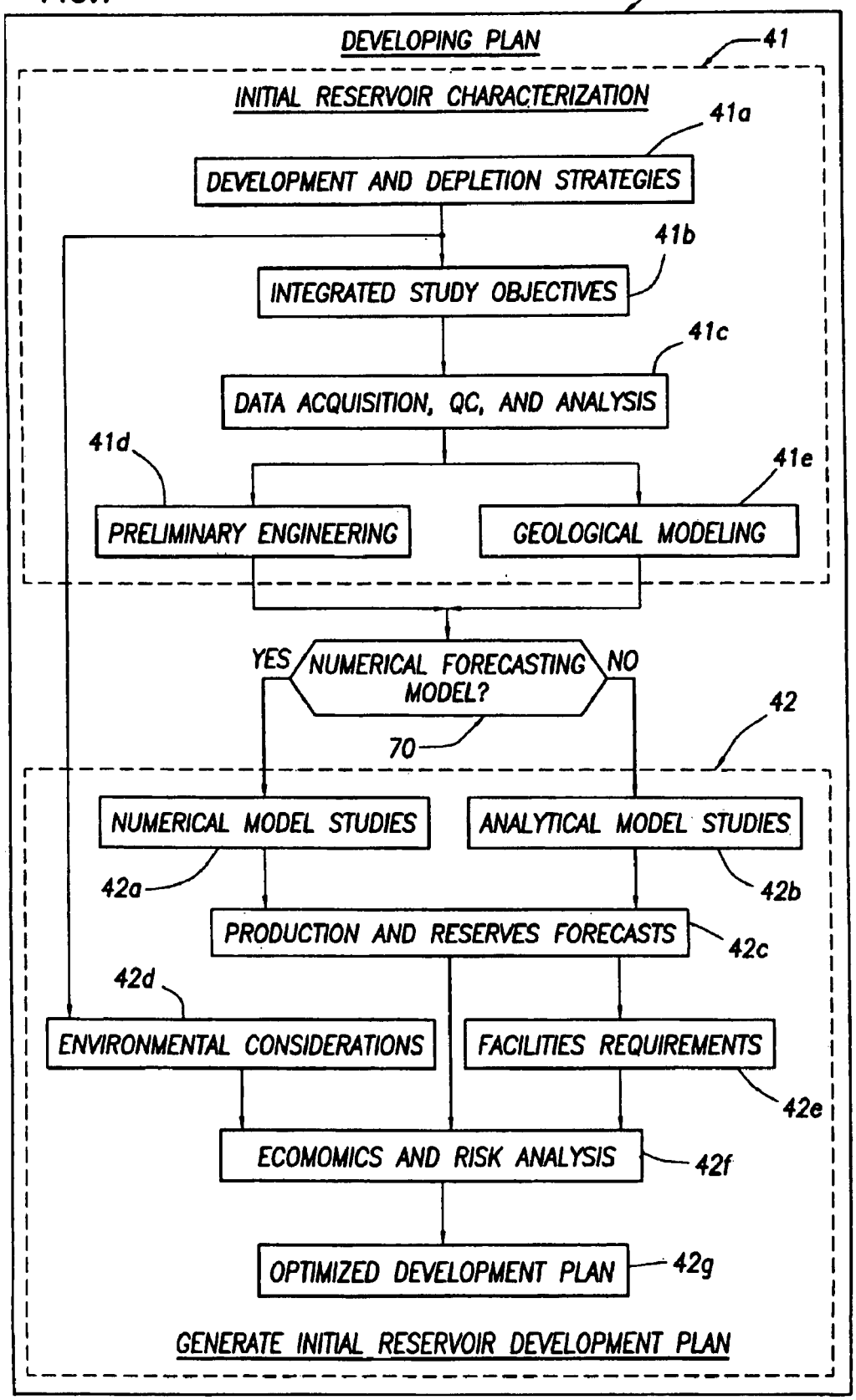
FIG. 7 includes a top half and a bottom half separated by a "Numerical Forecasting Model" decision triangle, the top half of FIG. 7 illustrating a detailed construction of the "Initial Reservoir Characterization" block 41 of FIG. 4, the bottom half of FIG. 7 illustrating a detailed construction of the "Generate Initial Reservoir Development Plan" block 42 of FIG. 4.

Referring to FIG. 7, a detailed construction of the 'Initial Reservoir Characterization' block 41 of FIG. 4, and a detailed construction of the 'Generate Initial Reservoir Development Plan' block 42 of FIG. 4 is illustrated.

In FIG. 7, in accordance with another feature of the present invention, the 'developing plan' block 11 of FIG. 1 includes the 'initial reservoir characterization' block 41, which describes the reservoir, the 'numerical forecasting model' decision triangle 70, and the 'generate initial reservoir development plan' block 42, which generates a development plan (keeping in mind the special characteristics of that reservoir) that provides the best opportunity to exploit the resource in the reservoir. The 'initial reservoir characterization' block 41 of FIG. 4 includes the following blocks: the 'development and depletion strategies' block 41a, the 'integrated study objectives' block 41b, the 'data acquisition, QC, and analysis' block 41c, the 'preliminary engineering' block 41d, and the 'geological modeling' block 41e. The outputs of the 'preliminary engineering' 41d and the 'geological modeling' block 41e are provided as inputs to the 'numerical forecasting model' decision triangle 70. The output of the 'numerical forecasting model' decision triangle 70 is operatively connected to the 'generate initial reservoir development plan' block 42. The 'generate initial reservoir development plan' block 42 of FIG. 4 includes the following blocks: the 'numerical model studies' block 42a and the 'analytical model studies' block 42b each of which are connected to the outputs of the 'numerical forecasting model' decision triangle 70, the 'production and reserves forecasts' block 42c, the 'Environmental Considerations' block 42d, the 'Facilities Requirements' block 42e, the 'economics & risk analysis' block 42f, and the 'optimized development plan' block 42g.

In FIGS. 2 and 7, recall that FIG. 2 represents a prior art method for developing a development plan and FIG. 7 represents a method in accordance with the present invention for developing a development plan. Comparing FIGS. 2 and 7, in accordance with another feature of the present invention, it is evident that the following differences exist between FIG. 7 and FIG. 2.

In FIG. 7, in the 'Initial Reservoir Characterization' block 41, the 'Preliminary Engineering' block 41d is being performed in parallel with the 'Geological Modeling' 41e in order to determine a unified interpretation of what the reservoir actually looks like. That is, block 41d is being performed in parallel with block 41e, using dynamic data (well performance, production and injection rates, reservoir pressure) in an effort to verify the interpretations made by the geoscience group based on static data (i.e., measurements made at a specific point in time from well logs, seismic). That is, in FIG. 7, block 41d is being performed in parallel with block 41e (before we create the first version of the numerical simulator) in order to reconcile the geoscience interpretations made using static data with the engineering interpretations made using dynamic or performance related data. This is different from the prior art shown in FIG. 2 because, in FIG. 2, in most cases, the prior art was conducted in a linear stepwise fashion; that is, the geologic modeling was done in a specific sequence before handing that interpretation to the reservoir engineers for their adjustment.

In FIG. 7, the 'Preliminary Engineering' block 41d and the 'Geological Modeling' block 41e are each input to a decision triangle 70 entitled "Numerical Forecasting Model?". The decision triangle 70 asks: do I want to use a rigorous scientific approach to build a numerical simulator to generate a production forecast (the "Yes" output from triangle 70), or do I want to use various standard analytical methods (i.e., decline curve analysis, etc) to generate the production forecast (the "No" output from triangle 70)? This decision triangle 70 recognizes that, for some field development planning in some locations, depending upon the stage of development at the time, you may not go through a full simulation process to produce a development plan. For a resource that is more minor in size for which you have limited data, you may find that there is a neighboring field that was exploited 15 years earlier that has a lot of performance data and what you must do is produce a development plan that accommodates the kind of performance that you saw in the neighboring field. Rather than going through the extended process of building an extended simulator to run a forecast, we can review the neighboring field, see how the wells in that field performed, make certain adjustments that recognize the unique character of our geologic description compared to the neighboring field, determine production forecasts (using basic engineering analysis) for various development scenarios and from those forecasts, determine economic analyses and select the best such economic analysis. Thus, this is an alternative way of determining a production and reserves forecast without going through the entire numerical modeling process.

In FIG. 7, the 'yes' output from the decision triangle 70 is input to the 'Numerical Model Studies' block 42a, and the 'no' output from the decision triangle 70 is input to the 'Analytical Model Studies' block 42b. In either event, when the steps in block 42a (the numerical studies) or the block 42b (the analytical studies) are performed, the production and reserves forecast in the 'Production and Reserves Forecast' block 42c will be generated.

In FIGS. 2 and 7, referring initially to FIG. 2, note that the 'environmental considerations' block 21 in FIG. 2 is located between the 'Development and Depletion Strategies' block 20 and the 'Data Acquisition and Analysis' block 22; however, in FIG. 7, the 'environmental considerations' block 42d is located between the 'development and depletion strategies' block 41a and the 'economic & risk analysis' block 42f. From a qualitative standpoint, in FIG. 2, it is correct to place the 'environmental considerations' block 21 between the 'development and depletion strategies' block 20 and the 'data acquisition and analysis' block 22 because the environmental considerations may function as a screen when determining what strategies of the 'development and depletion strategies 20' to adopt. However, in FIG. 7, the larger part of the impact of the environmental considerations in the 'Environmental Considerations' block 42d is on the 'Economic and Risk Analysis' (of block 42f) of the preferred depletion mechanism. That is, in FIG. 7, the 'environmental considerations' 42d have an impact on economic optimization (i.e., economic analysis and risk) 42f because various depletion plans associated with a particular project may have various environmental considerations associated with them.

In FIG. 7, note that the 'Production and Reserves Forecasts' block 42c has two outputs. One output goes directly to the 'Economics & Risk Analysis' block 42f for revenue calculations because the production and reserves forecast 42c is the basis for calculating cash flows in your revenue stream. The other output goes to the 'Facilities Requirements' block 42e because the production and reserves forecast 42c imposes demands on capital investment for the facilities (i.e., what kind of facilities do you need which is related to future capital investment). An output from the 'Facilities Requirements' block 42e goes to the 'Economics & Risk Analysis' block 42f because, when you define the size and the specs of the facilities you need, the size/specs of the required facilities will represent your estimate of capital investment that is required by the 'economics and risk analysis' block 42f.

I. Initial Reservoir Characterization, Block 41 in FIG. 7

A. Integrated Study Objectives, Block 41b

In FIG. 7, starting with block 41 entitled 'Initial Reservoir Characterization', the first block which is connected to the 'development and depletion strategies' 41a block is the 'Integrated Study Objectives' block 41b. In connection with the 'Integrated Study Objectives' block 41b, after you have determined what your alternative 'development and depletion strategies' 41a are for a particular reservoir field, but before you begin gathering data, you must first determine the objectives and the scope of the study that you are about to perform. That is, your different needs and the availability of required data are jointly going to impact what your objectives or expectations will be for the study that you are about to perform.

B. Data Acquisition, Quality Control (QC), and Analysis, Block 41c

Referring to FIG. 8, a detailed construction of the 'Data Acquisition, Quality Control (QC), and Analysis' block 41c of FIG. 7 is illustrated.

In FIGS. 2, 7 and 8, the 'Data Acquisition, QC, and Analysis' block 41c in FIG. 7 corresponds to the 'Data Acquisition and Analysis' block 22 in FIG. 2. However, in FIG. 8, the detailed construction of the 'Data Acquisition, QC, and Analysis' block 41c of FIG. 7 is new and novel and that detailed construction shown in FIG. 8 sets forth a third new and novel feature of the present invention.

In FIG. 8, now that the objectives or expectations for the study have been determined via the 'Integrated Study Objectives' block 41b, it is important to ensure that all necessary data sources are available. The first source of data are well logs and seismic measurements on the field for which you are conducting the development planning; that is, you must gather together all data that you can find for a particular reservoir field under study. Thus the block 'Field Data in Digital or Paper Media' 41c1 represents all such data including well logs and seismic data that has been gathered together for this particular reservoir field under study. Then, in connection with the 'Sufficiency Verification' decision triangle 41c2 of FIG. 8, you must ask, 'is that data sufficient for what you have in mind in the study in order to meet its objectives?'. If that data is not sufficient, the 'no' output from the decision triangle 41c2 leads to 'Supplemental Data and Information Sources' block 41c3. In the block 41c3, you look for supplemental data from alternative sources (such as companion fields, similar formations and/or similar operating practices) and then supplement your specific field data with outside sources. When the data gathered together during block 41c1 is combined with the supplemental data gathered together during block 41c3, the result is a 'Unified Project Digital Database', block 41c4. On the other hand, if the data gathered together during block 41c1 is sufficient, the output from the decision triangle 41c2 is 'yes' and the result is the 'Unified Project Digital Database'. This database constitutes everything you anticipate needing to meet your objectives, some of it from your field, and some of it from literature sources.

In FIG. 8, as previously mentioned, the detailed construction of the 'Data Acquisition, QC, and Analysis' block 41c of FIG. 7, as shown in FIG. 8, is new and novel and that detailed construction shown in FIG. 8 sets forth a third new and novel feature of the present invention. For example, in FIG. 8, the 'supplemental data and information sources' step set forth in block 41c3 is believed to be new and novel and therefore the 'supplemental data and information sources' block 41c3 in FIG. 8 constitutes another feature of the present invention.

In FIG. 8, now that the 'unified project digital database' has been created, it is now necessary to start verifying that various pieces of information are consistent with each other, as set forth in the 'Consistency Verification' decision triangle 41c5 in FIG. 8. For example, you may have collected reservoir fluid samples from the reservoir by different techniques and from different well locations, and you subjected them all to a series of lab tests. However, the lab tests have given you different results. Which one is right, or are they all right? You progress through this process to identify the base values that you are going to use in your future calculations, and you identify, at the same time, the uncertainties associated with some of those properties. Therefore, in FIG. 8, the 'Uncertainties for Sensitivity and Risk Analysis' block 41c6 will identify those uncertainties. For example, the 'uncertainties' might be the fact that you do not know exactly the fluid properties, the volume factor, or the gas content. You then retain those uncertainties which may be addressed later during the model calibration or history match phase, or perhaps later during the production forecasting. When all the consistency checks are performed (via block 41c5) on all your input data sources, and either reconciled them or chosen base values or identified error ranges (which you need address), you now have produced is a 'Verified Project Digital Database', block 41c7 in FIG. 8. At this point, in connection with your original concept of the study plan to address the objectives, you must question whether you can still accomplish the task reasonably well given the amount, quality and quantity of data that you have, or should you modify the study plan, or should you do something different in the study to accommodate either a shortage or an excess of data. Thus, in FIG. 8, in connection with the decision triangle 'Study Plan Verification' block 41c8, if the original study plan still remains valid, take the 'yes' output from decision triangle 41c8 and drop down and begin the 'Preliminary Engineering' 41d and 'Geological Modeling' 41e work. However, if the original study plan does not remain valid (adjustments are needed), take the 'no' output from decision triangle 41c8 and enter block 41c9 in FIG. 8 entitled 'Required Project Scope or Workflow Changes'. In block 41c9, start by identifying proposed changes that must be added or incorporated into the study scope, and, knowing those proposed changes to the study scope, begin your technical analysis with the adjusted changes to the study scope.

C. Preliminary Engineering, Block 41d

Figure 9A:
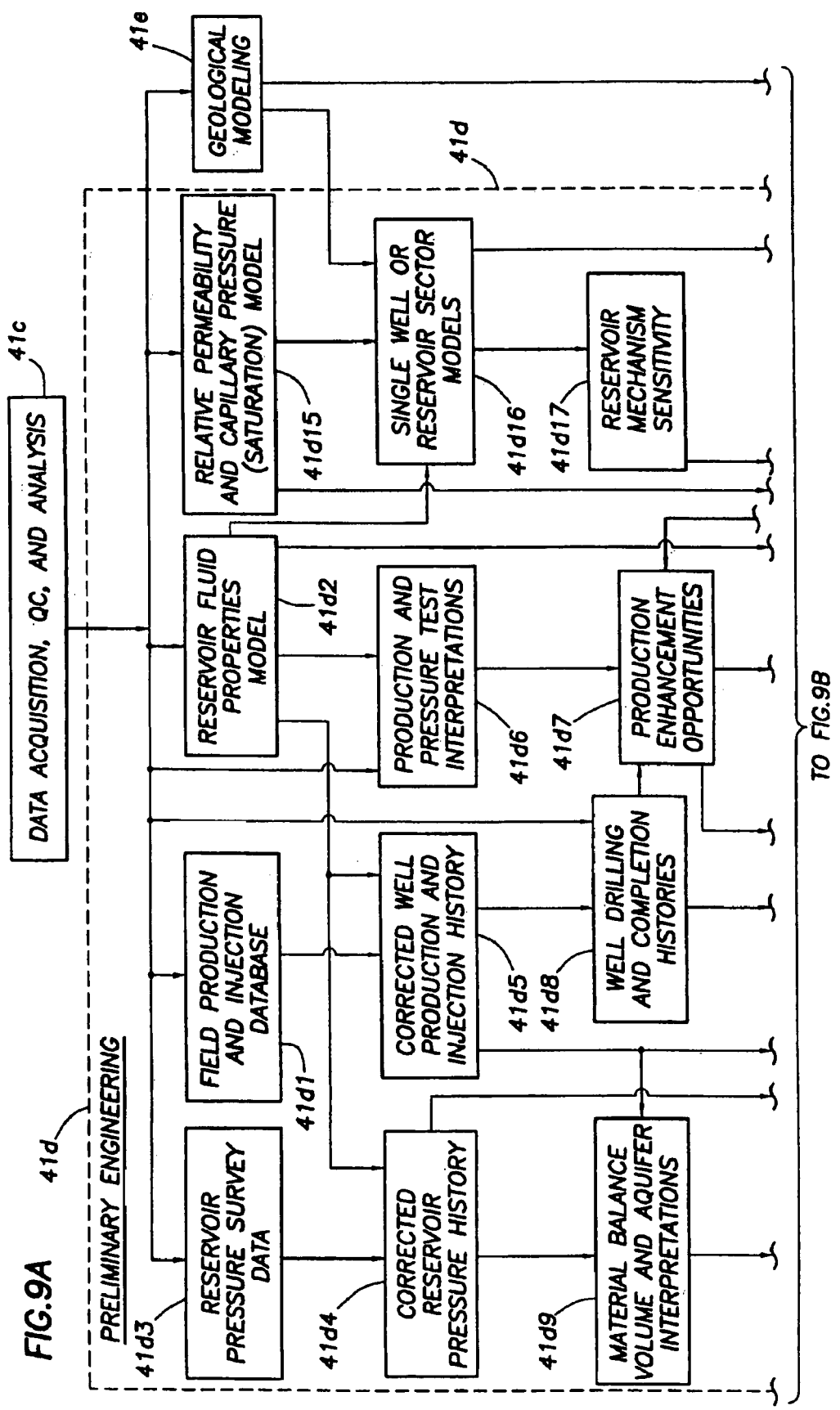
FIGS. 9A and 9B illustrate a detailed construction of the Preliminary Engineering block of FIG. 7.
Figure 9B:
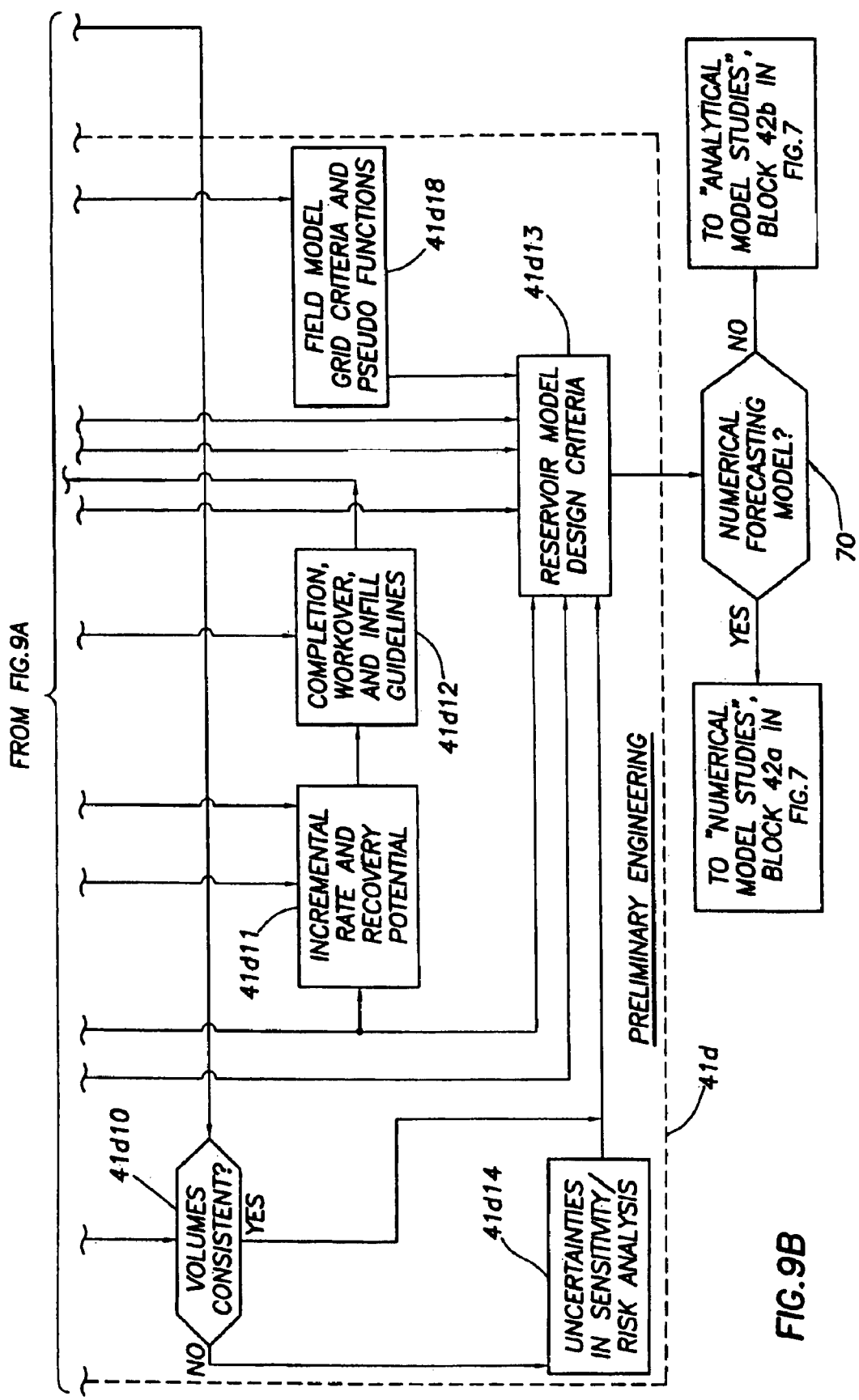

Referring to FIGS. 9A and 9B, a detailed construction of the 'Preliminary Engineering' block 41d of FIGS. 7 and 8 is illustrated. The detailed construction of the 'Preliminary Engineering' block 41d of FIGS. 7 and 8, as shown in FIGS. 9A and 9B, is new and novel and that detailed construction shown in FIGS. 9A and 9B sets forth a fourth new and novel feature of the present invention.

In FIGS. 9A and 9B, the basic data and information being input to the 'Preliminary Engineering' studies of block 41d in FIGS. 9A and 9B are: (1) the 'field production and injection database' block 41d1, (2) the laboratory tests or estimates of reservoir fluid properties in the 'reservoir fluid properties model' block 41d2, and (3) measurements of reservoir pressure that have been taken when wells were first completed and periodically thereafter in the 'reservoir pressure survey data' block 41d3. The above referenced data in blocks 41d1, 41d2, and 41d3 need to be manipulated or adjusted in order to do subsequent engineering calculations. For example, the field production of block 41d1 will be recorded from measurements on tanks or gauges. The reservoir fluid properties of block 41d2 must produce a consistent reservoir voidage in the formation for each unit of production measured at the surface. In connection with the 'reservoir fluid properties model' of block 41d2 in association with the 'reservoir pressure survey data' of block 41d3, when comparing reservoir pressures (see 'reservoir pressure survey data' of block 41d3), they must be adjusted to a datum. Therefore, you must know the fluid properties (see 'reservoir fluid properties model' of block 41d2) in order to calculate the pressure gradients in the reservoir and do the adjustment properly to a common datum. Therefore, with regard to the 'reservoir pressure survey data' of block 41d3, when you do the adjustments bearing in mind the reservoir fluid properties, the result is the 'corrected reservoir pressure history' of block 41d4, which reflects the history of the reservoir pressure corrected to some datum. In addition, by taking the reservoir properties in the 'reservoir fluid properties model' of block 41d2 in combination with the reported field production in the 'field production and injection database' of block 41d1, the result is a corrected well production history in the 'corrected well production and injection history' of block 41d5. In connection with the 'production and pressure test interpretations' block 41d6, when installing test equipment in a well to measure either its production capacity or the static reservoir pressure in the vicinity of the well, you will be conducting a well test and you will gather pressure and rate versus time data over a period of a few hours to a couple of weeks. In this case, you must import the reservoir fluid property data from the 'reservoir fluid properties model' of block 41*d*2 to enable an interpretation of the test data. As a result, the output of the 'production and pressure test interpretations' block 41*d*6 serves as an input to the 'production enhancement opportunities' block 41*d*7. That is, the analysis of the well test, which is the output from the 'production and pressure test interpretations' block 41*d*6, will give you an idea (when those analysis results are compared with the reported production rates) whether that well is performing according to your expectations. Another input into the 'production enhancement opportunities' block 41*d*7 (which identifies opportunities to enhance production) comes from the 'well drilling and completion histories' block 41*d*8 which examines where the wells were drilled and how the wells were drilled and completed. Therefore, by trying to tie together where the wells were drilled, how they were completed, what the test results are, and the basic nature of the reservoir, you can identify what immediate opportunities you have (in the 'production enhancement opportunities' block 41*d*7) to stimulate a well or install a pump that will result in higher production rates. Referring now to the 'material balance volume & aquifer interpretations' block 41*d*9, the reservoir pressure history adjusted to a common datum from block 41*d*4 and the production and injection history from block 41*d*5 can provide dual inputs to the 'material balance volume & acquifer interpretations' block 41*d*9. Block 41*d*9 represents a material balance reconciliation of the fluids in place; this is, block 41*d*9 is used to estimate and determine (after extraction and injection of fluids into the formation) what were the original volumes of fluid in place in the formation. Those volumes, output from the 'material balance . . .' block 41*d*9, then serve as an input to the 'volumes consistent' decision triangle 41*d*10 in order to provide a check against the calculations from the geologic interpretations which are output from the 'geological modeling' block 41*e*. The calculations from the geologic interpretations of block 41*e* represent what the geologic interpretations think are the fluids in place in the formation. Still referring to FIGS. 9A/9B, note that the 'well drilling and completion histories' block 41*d*8 provides an input to the 'production enhancement opportunities' block 41*d*7 (as previously discussed); however, both the 'well drilling and completion histories' block 41*d*8 and the 'production enhancement opportunities' block 41*d*7 provide an input to the 'incremental rate and recovery potential' block 41*d*11. Block 41*d*11 tries to estimate incremental oil rate and potential oil recoveries associated with the production enhancement opportunities in the 'production enhancement opportunities' block 41*d*7, after having reconciled the test data with drilling and completion practices. For example, we should recover an extra 100 thousand barrels of oil from the well. Having identified the incremental potential, and verified that it is worthwhile going after with this particular activity from the 'incremental rate and recovery potential' block 41*d*11, the output from block 41*d*11 provides an input to the 'completion workover, and infill guidelines' block 41*d*12. In block 41*d*12, we monitor the impact of a completion workover or infill workplan and, having monitored that impact, additional production data is generated at which point we loop back up to the 'production enhancement opportunities' block 41*d*7 to determine whether our estimate of the production enhancement opportunity was correct, or does it need adjustment, and, if it needs adjustment, the completions workover of the 'completion workover . . . ' block 41*d*12 would be redesigned. Referring now to the 'reservoir model design criteria' block 41*d*13, a 'plurality of inputs' to block 41*d*13 are being provided, each of those inputs having an impact on the 'reservoir model design criteria'. Block 41*d*13 (reservoir model design criteria) determines what must be done to properly design the reservoir model. For example, the 'plurality of inputs' to block 41*d*13 include the following: you need to consider the reservoir fluid properties from block 41*d*2, the production and injection history from block 41*d*5 which carries some constraint on how you design the field model, the reservoir pressure history from block 41*d*4 corrected to a common datum which will have an impact on the design criteria, the reconciliation of the volumes between material balance and geologic modeling from block 41*d*10, and the uncertainties that you are left with when those volumes do not exactly balance from the 'uncertainties in sensitivity/risk analysis' block 41*d*14 (e.g., is the pressure behavior wrong). Those uncertainties should be examined with the model and have an impact on the design criteria in the 'reservoir model design criteria' block 41*d*13. Referring now to block 41*d*15 entitled 'relative permeability and capillary pressure (saturation) model', in locations in the reservoir where oil, gas, and water may all exist simultaneously, what are the flow characteristics of each one? If you are displacing oil with either gas or water, what are the displacement characteristics? Block 41*d*15 will define those flow characteristics and displacement characteristics. In connection with the 'single well or reservoir sector models' block 41*d*16, the reservoir fluid properties from block 41*d*2, the relative permeability from block 41*d*15, and the geologic descriptions from block 41*e* all come together in the 'single well or reservoir sector models' block 41*d*16 which represent preliminary models. If you regard a 'full field model' as something that is extended over the entire field, the 'single well or reservoir sector models' will investigate specific reservoir mechanisms and the impact those mechanisms have on the full field model design. For that reason, an output from the 'single well or reservoir sector model' block 41*d*16 flows into the 'reservoir mechanism sensitivity' block 41*d*17 where you might use alternative grid descriptions with one of these 'sector models' from block 41*d*16 and determine which such alternative grid description does a better job of representing the mechanism that you expect to have in the field. The output from the 'reservoir mechanism sensitivity' block 41*d*17 is an input to the 'reservoir model design criteria' block 41*d*13. In connection with block 41*d*18 entitled 'field model grid criteria and pseudo functions', some mechanisms will require a very detailed grid design in order to reliably represent multiple fluids flowing at the same time. In very large reservoirs, if your sector model studies say that you need very small grid blocks and you have a very large reservoir, the size of the model was too large to use on any computer system. One approach was to take these sector models and adjust the basic relative permeability flow functions to utilize certain so-called 'pseudo functions'.

D. Geological Modeling, Block 41*e*

Figure 10A:
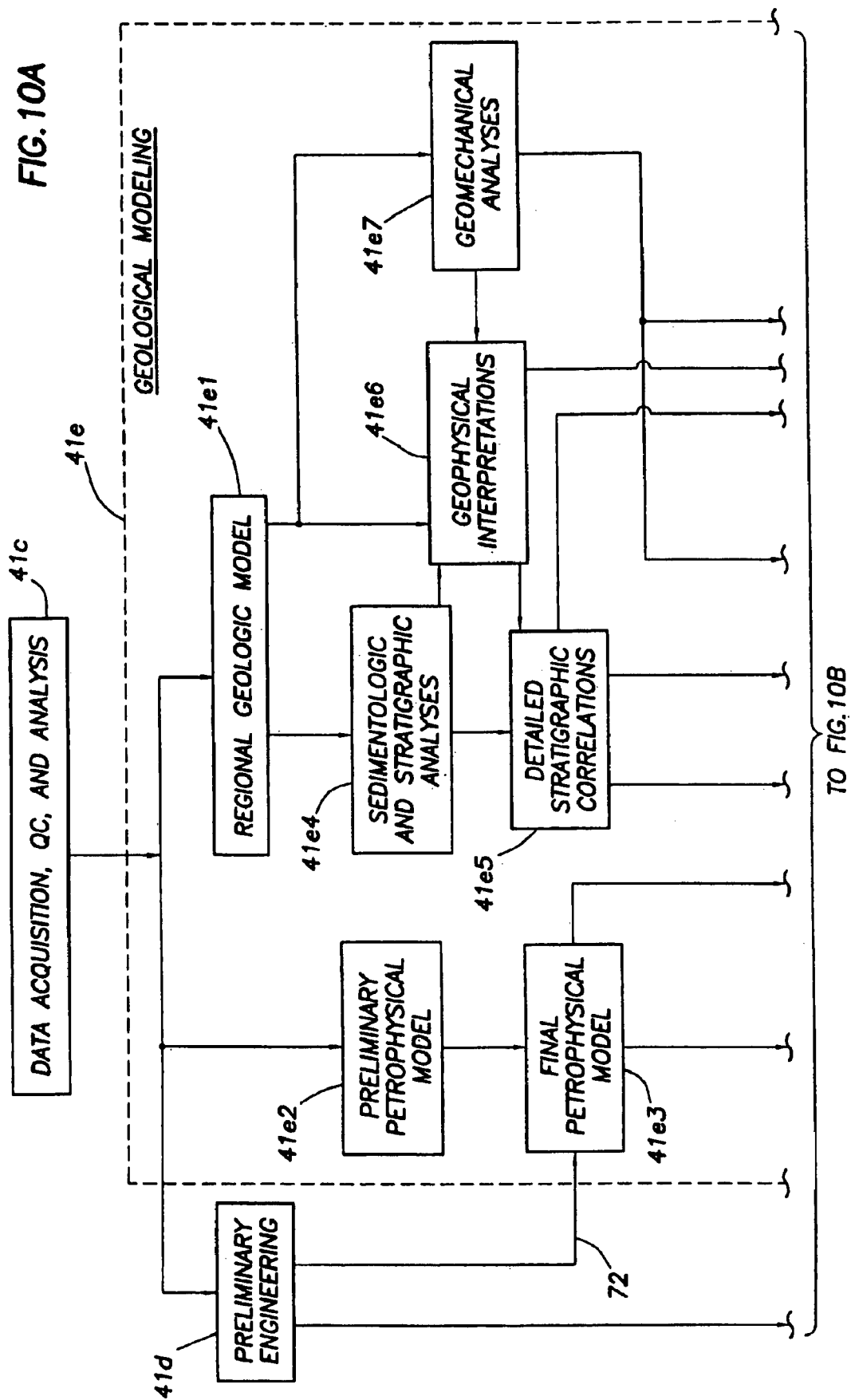
FIGS. 10A and 10B illustrate a detailed construction of the Geological Modeling block in FIG. 7.
Figure 10B:
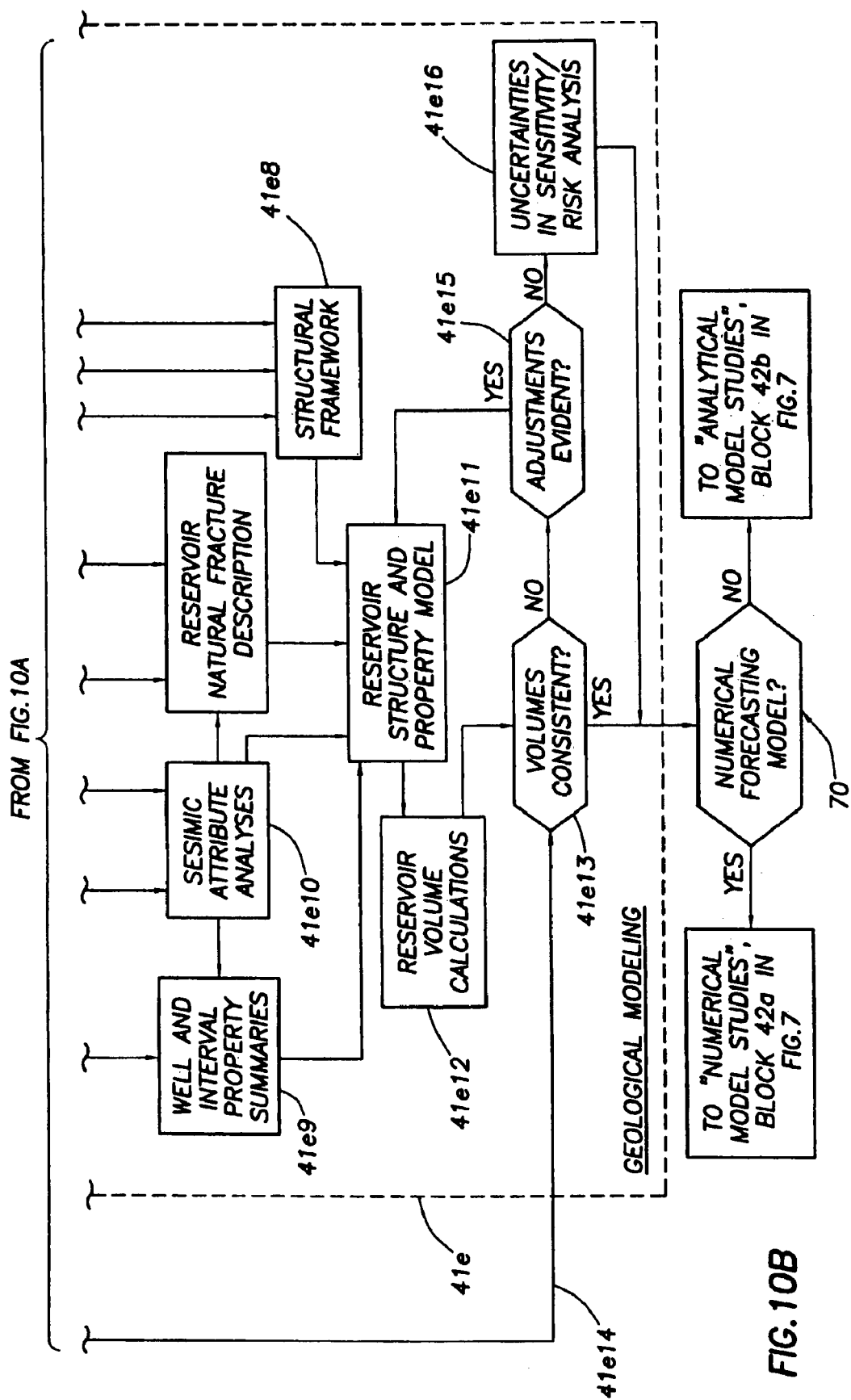

Referring to FIGS. 10A and 10B, a detailed construction of the 'Geological Modeling' block 41*e* of FIGS. 7 and 8 is illustrated. The detailed construction of the 'Geological Modeling' block 41*e* of FIGS. 7 and 8, as shown in FIGS. 10A and 10B, is new and novel and that detailed construction shown in FIGS. 10A and 10B sets forth a fifth new and novel feature of the present invention.

In FIGS. 10A and 10B, a particular reservoir is located in a particular basin and there is a particular regional geology associated with the formation in that basin in that area of the world. Consequently, we start with a 'regional geologic model' in block 41*e*1 which gives us a range of characteristics. This model in block 41*e*1 is the starting point from which we develop a more detailed and specific description for the reservoir for which we are trying to produce a development plan. In the 'preliminary petrophysical model' of block 41e2, this model 41e2 is generally based on well logs. Therefore, the 'preliminary petrophysical model' 41e2 is a way to convert well logs, drill cutting samples, and possibly special core studies into a calculated reservoir property profile at each well location. Thus, for each foot of depth that is traversed by a particular wellbore, a plurality of data measurements, such as formation density, resistivity, radioactivity, acoustic velocity and other parameters, may be processed with known techniques to yield reservoir properties (such as porosity, saturation of hydrocarbon, and the type of rock) for input into the 'preliminary petrophysical model' 41e2. In FIGS. 10A and 10B, one new feature of the 'geological modeling' block 41e in FIGS. 10A/10B relates to a new connection 72 between the 'preliminary engineering' block 41d in FIG. 10A and the 'final petrophysical model' 41e3. There is a need to bring in results from the 'preliminary engineering' block 41d, via the new connection 72, to verify various aspects of the geological model. One particular problem relates to calibrating the petrophysical model. Such calibration of the petrophysical model is needed, for example, when distinguishing the difference between water saturation and oil saturation in the reservoir. Thus, there is an input from the engineering studies at the 'preliminary petrophysical model' 41e2 to arrive at a 'final petrophysical model' 41e3. In connection with the 'sedimentologic & stratigraphic analyses' block 41e4, the 'geological model' 41e in FIGS. 10A/10B carries with it a certain framework of sedimentology and stratigraphy that the geologists would be applying to the formation in a qualitative sense. In addition, in connection with the 'detailed stratigraphic correlations' block 41e5, having an input from the 'sedimentologic & stratigraphic analyses' block 41e4 enables the geologists to perform detailed stratigraphic correlations between wells and to establish a continuity of geologic horizons across the reservoir. In connection with the 'geophysical interpretations' block 41e6, there would also be an input from the 'geophysical interpretations' block for identifying, in the 'detailed stratigraphic correlations' block 41e5, those structural correlations across the reservoir. In connection with the 'geomechanical analysis' block 41e7, geomechanical analysis and the geomechanical properties of the rock enables the conversion of time measured data from seismic into depth measurements. In addition, it also gives an indication of reservoir stresses which can be computed from geomechanical properties, the reservoir stresses allowing you to interpret whether or not you can expect to see faulting and fracturing in the reservoir. Therefore, the 'geomechanical analysis' block 41e7 provides an input into the 'geophysical interpretations' 41e6 as well. In connection with the 'structural framework' block 41e8, the 'structural framework' block 41e8 describes the 'overall shape' of the reservoir. One example of 'overall shape' of a reservoir is whether or not the reservoir is 'faulted'? The 'structural framework' block 41e8 (and in particular, the structural top and the structural base portion of the 'structural framework') responds to a 'plurality of inputs' which define a general framework for the reservoir, and these 'plurality of inputs' consist of: the 'geomechanical analysis' block 41e7, the 'geophysical interpretations' block 41e6, and the 'stratigraphic correlations' block 41e5. In connection with the 'well and interval property summaries' block 41e9, 'information relating to a set of more detailed reservoir properties' within the 'structural framework' of block 41e8 is developed from the petrophysical analysis at individual wellbores ('final petrophysical model' block 41e3) and the geologic correlations ('detailed stratigraphic correlations' block 41e5) that come from stratigraphy and sedimentology ('sedimentologic & stratigraphic analyses' block 41e4) and wellbore profiles. The aforementioned 'information relating to the set of more detailed reservoir properties' will be provided as an input to the 'well and interval property summaries' block 41e9. In addition, the 'seismic attribute analysis' block 41e10 will also provide an input to the 'well and interval property summaries' block 41e9. The 'seismic attribute analysis' block 41e10 provides seismic information which enables one to relate a seismic response (originating from portions of the reservoir which are located between the wellbores) to a set of measured properties from a plurality well logs (obtained from measurements in the wellbore itself). This establishes a guide on how to distribute reservoir properties at locations between wellbores where well data does not exist. The 'well and interval property summaries' block 41e9 and the 'seismic attribute analyses' block 41e10 and the 'structural framework' block 41e8 all come together as inputs to the 'reservoir structure and property model' block 41e11. Having defined all those properties in three dimensional space (position, void volume or porosity), such properties can be used to compute, from a geologic standpoint, an estimate of the fluids in place in the reservoir. This calculation, which is called a 'volumetric calculation' and which is performed in the 'reservoir volume calculations' block 41e12 of FIG. 10, is input from the 'reservoir volume calculations' block 41e12 to the 'volumes consistent' block 41e13. Another line 41e14 from 'preliminary engineering' 41d is also input to the 'volume consistent' block 41e13. In the 'volumes consistent' block 41e13, the aforementioned 'volumetric calculation' is subject to a consistency check by comparing the 'volumetric calculation' with the 'material balance' from 'preliminary engineering' 41d. In the consistency check, if the volumes are consistent, the geoscience interpretation of that which is underground in the reservoir agrees with your interpretation of the reservoir from a performance standpoint and, as a result, you can now proceed to develop a system of production forecasting. If they are not consistent, an adjustment in one case or the other must be made, in the 'adjustments evident' block 41e15. That is, the geologic interpretations may be adjusted to achieve a better agreement. If you cannot make any adjustments, the uncertainties are identified as being unresolved at this point, in the 'uncertainties in sensitivity/risk analysis' block 41e16. Those uncertainties can be dealt with in a sensitivity study in the forecasting model, or in a risk analysis during the economics.

II. Generate Initial Reservoir Development Plan, Block 42 in FIGS. 4 and 7

A. Numerical Model Studies, Block 42a

Figure 11A:
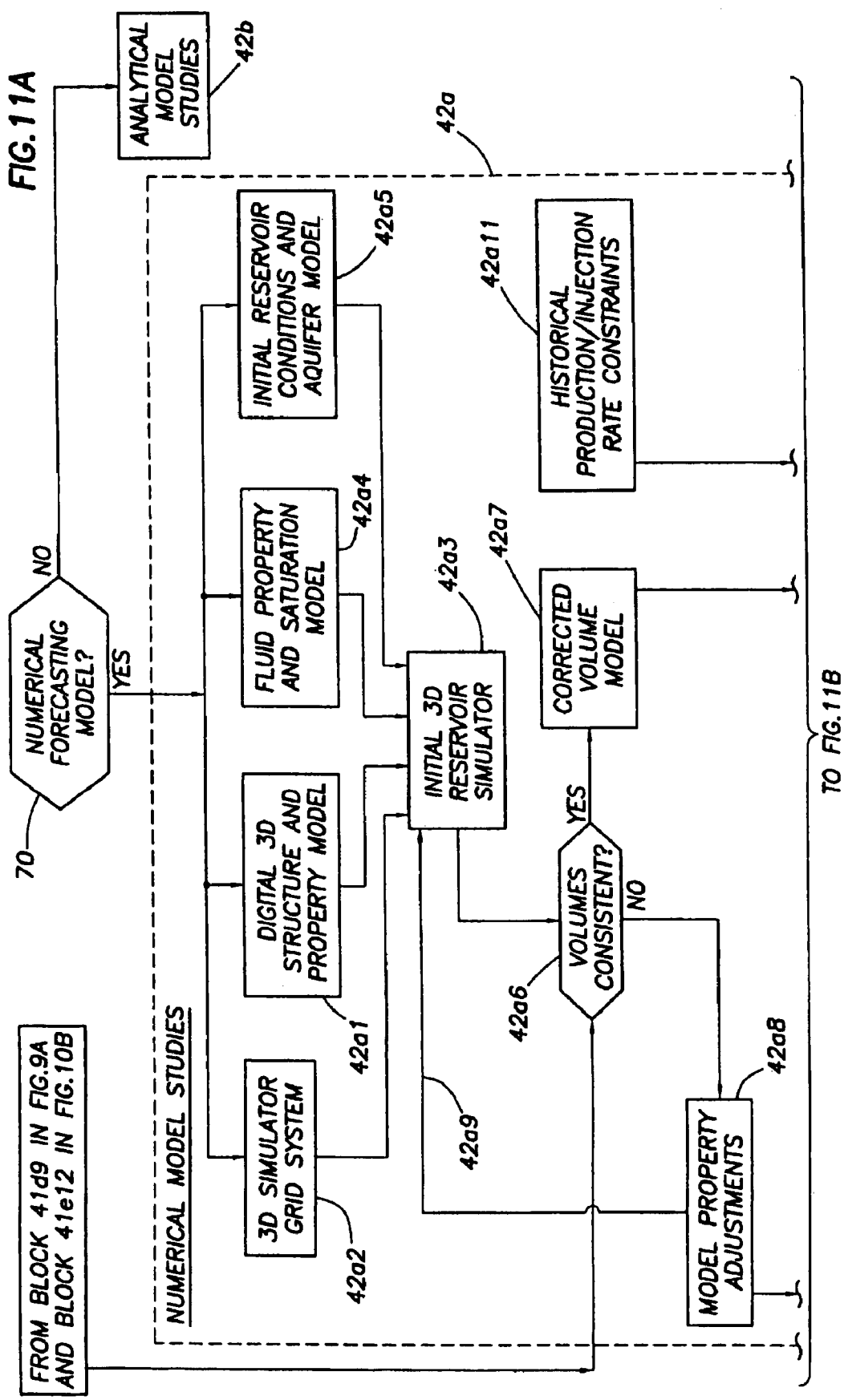
FIGS. 11A and 11B illustrate a detailed construction of the Numerical Model Studies block in FIG. 7.
Figure 11B:
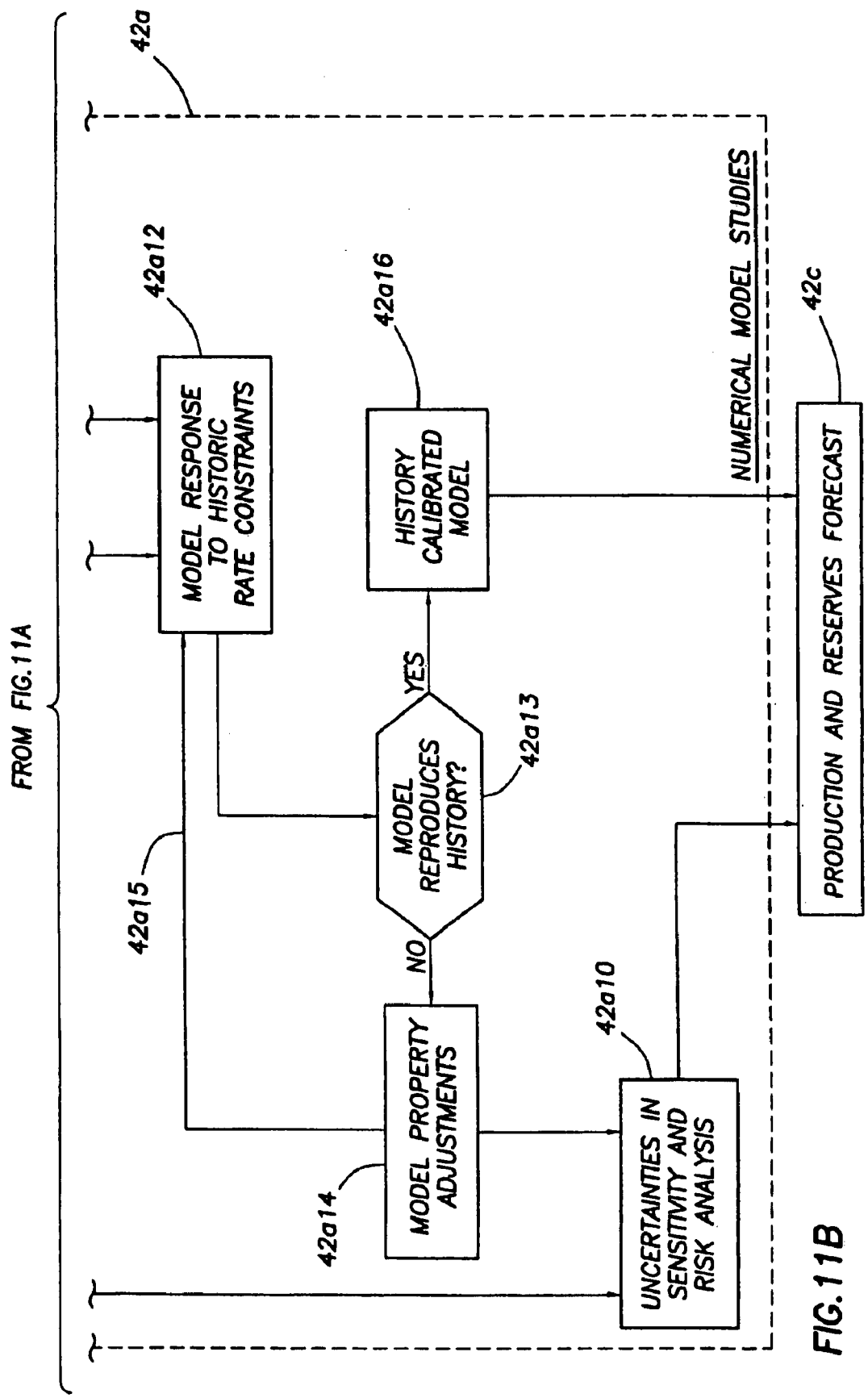

Referring to FIGS. 11A and 11B, a detailed construction of the 'Numerical Model Studies' block 42a of FIG. 7 is illustrated. The detailed construction of the 'Numerical Model Studies' block 42a of FIG. 7, as shown in FIGS. 11A and 11B, is new and novel and that detailed construction shown in FIGS. 11A and 11B sets forth a sixth new and novel feature of the present invention.

In FIGS. 11A and 11B, after doing the preliminary engineering and the reservoir description from the geologic standpoint, we enter the 'numerical forecasting model' decision triangle 70 to decide whether to do either numerical studies 42a or analytical studies 42b. During this part of the process, either the 'numerical model studies' 42a or the 'analytical model studies' 42b of FIG. 7 will be performed. Focusing initially on the 'numerical model studies' of block 42a in FIGS. 11A/11B, a numerical model study would take place in connection with a complex reservoir with a lot of data to manage and the reservoir has significant untapped potential or opportunities. The numerical model study 42a will help identify the specific potentials or opportunities associated with that reservoir. Assume that the decision which is output from the 'numerical forecasting model' of block 70 is a 'yes'. Having decided to do a numerical model study, one input is the 'digital 3D structure and property model' block 42a1 which comes out of the geologic studies and which provides a good first estimate of what the reservoir looks like. In order to model the reservoir numerically, a 'building block' model must be built to handle the flow characteristics. This is accomplished by building a horizontal grid and a layering mechanism that is superimposed on the three dimensional structure and property distributions. Structural positioning and reservoir properties are interpreted for each of the grid blocks of the horizontal grid. Therefore, the combination of the '3D Simulator Grid System' block 42a2 (which is the grid system you designed) and the 'digital 3D structure and property model' block 42a1 (which is the property distribution) defines the rock model in a reservoir simulator represented by the 'initial 3D reservoir simulator' block 42a3. In addition, when the 'fluid property and saturation models' block 42a4 is provided as an input to the reservoir simulator of block 42a3, a 'saturation distribution' is superimposed in that rock model in the reservoir simulator. The 'saturation distribution' determines where there is oil, water and gas in the reservoir, it determines the properties for these fluids, and it determines the way in which these fluids move in the reservoir when subjected to a pressure differential. In addition, outside influences must be defined in connection with the 'initial reservoir conditions and aquifer model' block 42a5. That is, the oil or gas accumulation might be in communication with a larger aquifer system and the interpretation of the extent of that aquifer comes from the regional work done in the geologic modeling. In addition, aquifer size can also be investigated in connection with the material balance calculations (block 41d9) of the 'preliminary engineering' (of FIGS. 9A/9B). Therefore, preliminary estimates of the extent or size of that aquifer from block 42a5 of FIGS. 11A/11B (and from block 41d9 of FIGS. 9A/9B) are provided as an input to the 'initial 3D reservoir simulator' block 42a3. Having created the initial reservoir model in the 'initial 3D reservoir simulator' block 42a3, the next step is to check, in the 'volumes consistent' block 42a6 of FIG. 11A, whether the volumes contained in that model are consistent with 'other information' you have determined. That 'other information' includes the volumes that you have calculated from the geologic description in connection with the 'reservoir volume calculations' block 41e12 of FIGS. 10A/10B. That 'other information' also includes the material balance estimates that have been calculated in connection with the 'material balance volume & aquifer interpretations' block 41d9 of FIGS. 9A/9B. Therefore, the comparison taking place in the 'volumes consistent' decision triangle 42a6 determines whether the grid system you have superimposed on the 3D rock model is a reliable representation of the property description developed by the geologic work. In addition, in connection with the 'volumes consistent' decision triangle 42a6, there must be consistency in the initial volumes. If they are consistent, the 'corrected volume model' block 42a7 indicates a corrected volume model (see more about this below). If they are not consistent, the grid system fails to reproduce the geologic description. In that case, in the 'model property adjustments' block 42a8, the grid can be manually adjusted to ensure that there is a proper representation between the grid system in the reservoir simulator and the geologic description, as indicated by the feedback loop line 42a9 in FIG. 11A extending between block 42a8 and block 42a3 (the reservoir simulator). Having made these adjustments as necessary in block 42a8, drop down to the 'uncertainties in sensitivity and risk analysis' block 42a10 which identifies any uncertainties that are remaining. If reasons cannot be identified or determined why there is some remaining disagreement or uncertainty between the various volume calculations, you would identify that uncertainty, try to bracket it, and deal with it later in a sensitivity or risk analysis approach. In any event, referring to the 'volumes consistent' triangle 42a6, if you have consistent volumes, move to the 'corrected volume model' block 42a7. At this point, in connection with the 'historical production/injection rate constraints' block 42a11, you need to add the following 'constraints' to the 'corrected volume model': (1) historical well data to enable you to run the model through a historical production period, (2) well positioning, (3) well trajectories, (4) where the wells have been completed over time, and (5) the history of well production and injection. When these 'constraints' have been added to the 'corrected volume model' 42a7, the method steps set forth in the 'model response to historic rate constraints' block 42a12 are practiced. In this 'model response . . . ' block 42a12, the method steps being practiced in this block 42a12 includes: running the model through the historic period, and obtaining a set of model responses to the production and injection stimuli that you are then able to compare to the actual measured performance. Having run the model through history and saved information pertaining to how the wells respond, refer now to the 'model reproduces history' decision triangle 42a13. In this decision triangle 42a13, you are comparing model performance to historical data. If you did not have a reliable representation of the measured performance, make some adjustments to the model properties in the 'model property adjustments' block 42a14. Having made those adjustments to the model properties, loop back via line 42a15 to the 'model response to historic rate constraints' block 42a12 and re-run the model through the historic period. This 'iterative process' (of running through history, comparing to measured data, and adjusting the model properties) continues until you have what you feel is a satisfactory representation of how the reservoir has actually performed. At that point, since you have now produced a 'history calibrated model', branch off from the 'model reproduces history' decision triangle 42a13 to the 'history calibrated model' block 42a16. In addition, while performing the above referenced 'iterative process' of running through history, comparing to measured data, and adjusting the model properties (hereinafter, the 'adjustments'), keep track of those 'adjustments' in the 'uncertainties in sensitivity and risk analysis' block 42a10. In addition, save the 'adjustments' therein for future sensitivity analyses either during the forecasting phase or later on when running a production forecast. Having reached the 'history calibrated model' stage in block 42a16 and having identified 'various uncertainties' that you are still unable to resolve or reconcile in block 42a10, both the 'history calibrated model' and the 'various uncertainties' are provided as inputs to the 'production and reserves forecast' block 42c.

B. Analytical Model Studies, Block 42b

Figure 12A:
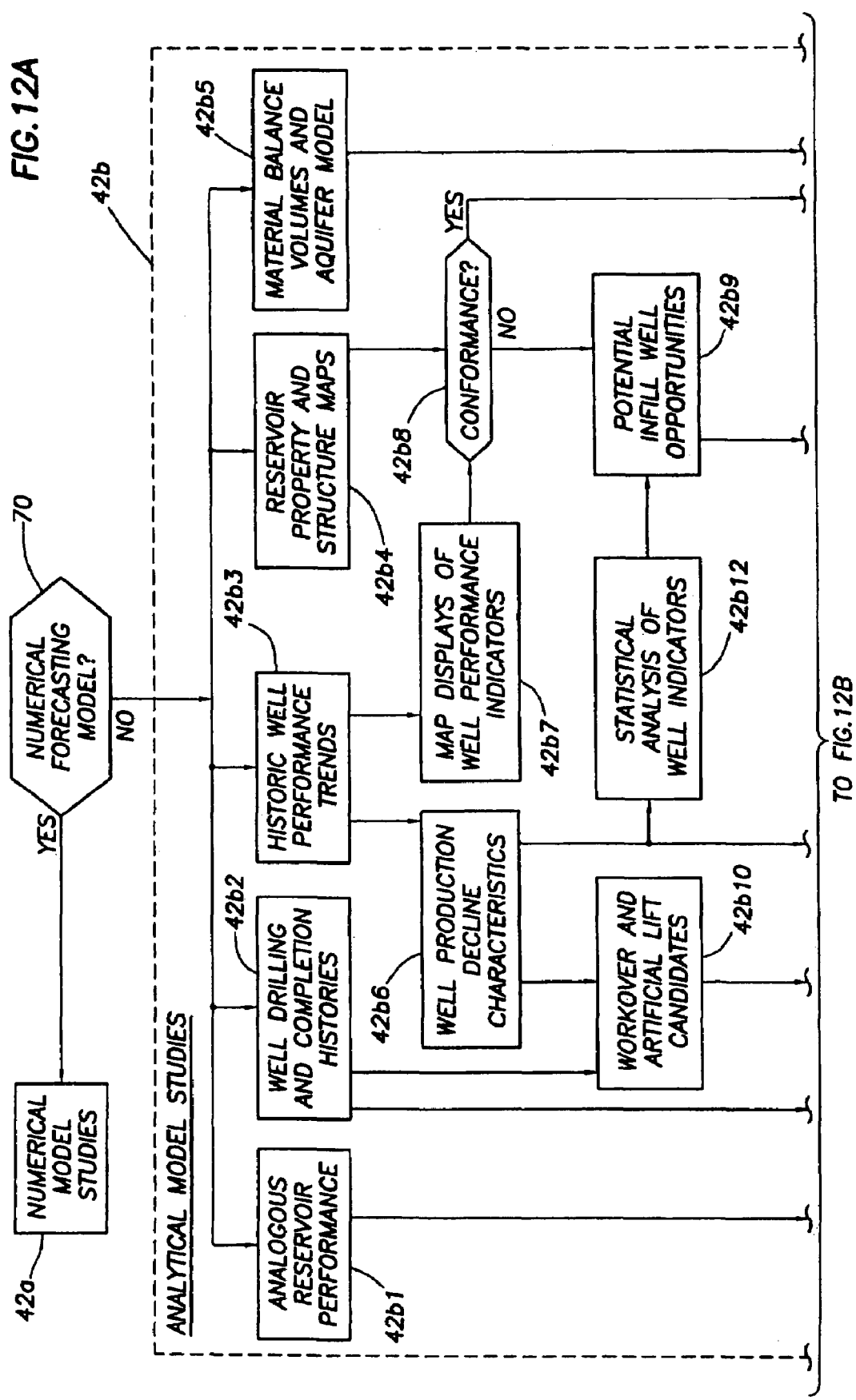
FIGS. 12A and 12B illustrate a detailed construction of the Analytical Model Studies block in FIG. 7.
Figure 12B:
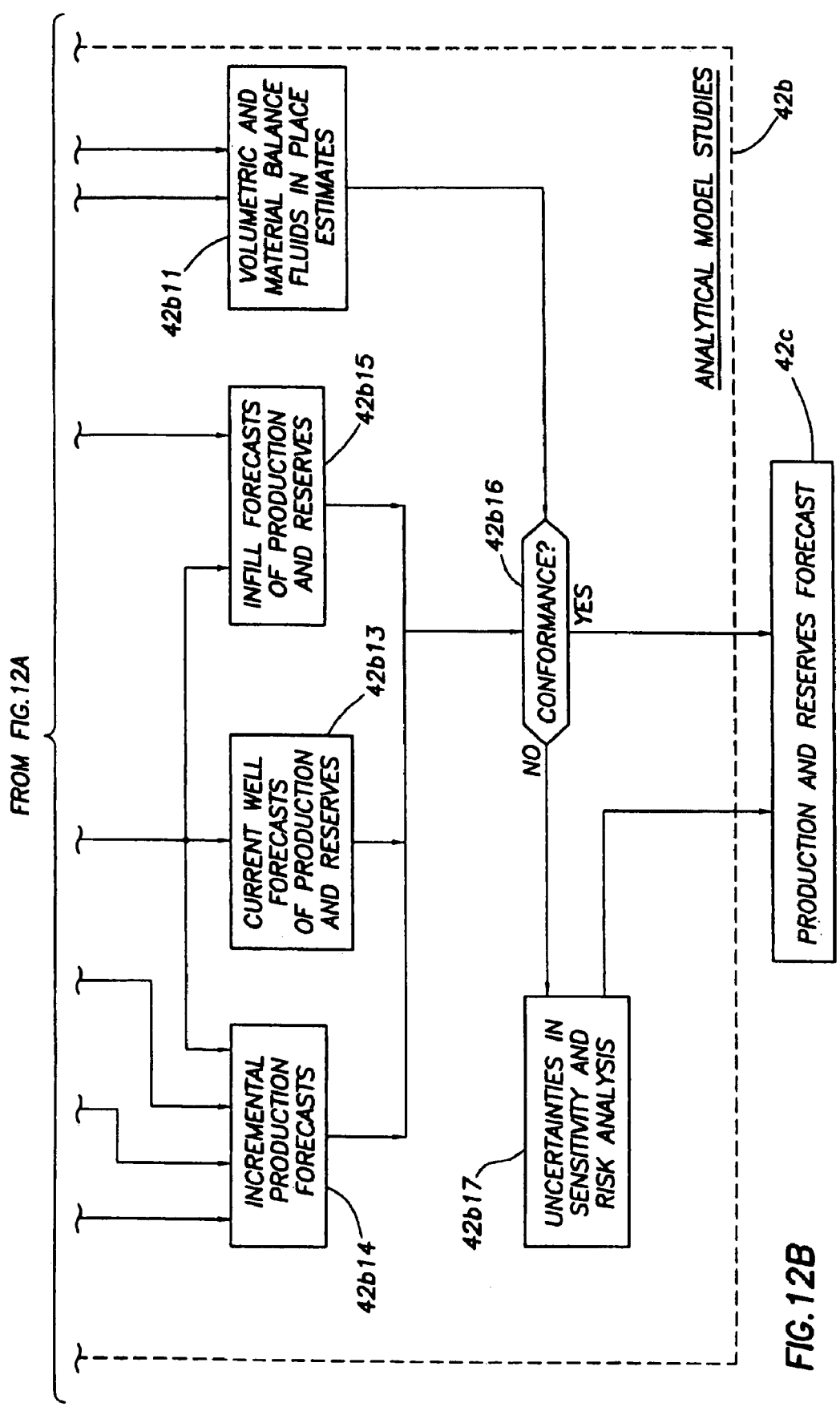

Referring to FIGS. 12A and 12B, a detailed construction of the 'Analytical Model Studies' block 42b of FIG. 7 is illustrated. The detailed construction of the 'Analytical Model Studies' block 42b of FIG. 7, as shown in FIGS. 12A and 12B, is new and novel and that detailed construction shown in FIGS. 12A and 12B sets forth a seventh new and novel feature of the present invention.

In FIGS. 12A and 12B, during this phase, either the 'numerical model studies' 42a or the 'analytical model studies' 42*b* will be performed. Assume that the output from the 'numerical forecasting model' decision triangle 70 is a 'no', in which case, we will now perform an analytical model study, block 42*b* in FIGS. 12A and 12B. In FIGS. 12A and 12B, therefore, we will now utilize an analytical approach for the purpose of forecasting a well's production, as opposed to modeling the well for the purpose of forecasting the well production. Therefore, one input to the 'analytical model study' block 42*b* in FIGS. 12A/12B, where a large part of your reliance exists, includes the 'analogous reservoir performance' block 42*b*1. When performing analytical model studies, you believe that the information available to you about your specific reservoir might not be reliable enough to describe a full reservoir simulator. Therefore, while using the data you have regarding a specific reservoir, you try to employ the trends that are available with regard to an analogous reservoir system to guide a forecast for the wells in your specific reservoir. That is, you can normalize the observations obtained from an analogous reservoir field and use that as a guide to help generate a forecast from your starting point in your specific reservoir field. Another input to the 'analytical model study' block 42*b* in FIGS. 12A/12B, where a large part of your reliance exists, include the 'well drilling and completion histories' block 42*b*2 of the wells. Still another input that is provided to the 'analytical model study' block 42*b* includes the 'historic well performance trends' of block 42*b*3. Here, you have the same measured historic well performance (i.e., production rates and pressure levels). Still another input that is provided to the 'analytical model study' block 42*b* includes the 'reservoir property and structure maps' of block 42*b*4 that you generate from the 3D geologic model. Still another such input includes the 'material balance volumes and aquifer model' of block 42*b*5 which include your material balance calculations and estimates for aquifer strength or to calibrate the initial volumes in place. Starting with the 'historic well performance trends' of block 42*b*3 and referring to the 'well production decline characteristics' block 42*b*6, from plots or graphs of the 'production trends', you can establish the decline characteristics or the productivity characteristics of the field. In a number of cases, your wells will fit any number of well production decline trends that are recognized in the literature for forecasting future production trends and recovery from the wells. From the 'historic well performance trends' of block 42*b*3, you can also map, in the 'map displays of well performance indicators' block 42*b*7, several performance indicators such as peak well rates or the total volumes of fluids produced from different well sites in order to examine which areas of a reservoir field are better or worse than average or better or worse than their companions. When you map those performance indicators in block 42*b*7, you can compare, in the 'conformance' decision triangle of block 42*b*8, that map of the performance indicators of block 42*b*7 with the geologic interpretation set forth in the 'reservoir property and structure maps' block 42*b*4 for the purpose of locating and observing any disagreement. For example, you may have some wells that show very good performance, lie in a very good part of the reservoir, and are consistent with the geologic interpretation; however, at the same time, the well behavior of one or more of those wells have, in fact, not been very good. Those wells therefore must be analyzed in detail to determine what went wrong, for example, during the drilling or the completion phase, etc. However, when the 'no' output of the conformance block 42*b*8 is set and there is no total conformance, the comparison, in the 'conformance' block 42*b*8, of production quality (from the 'map displays of well performance indicators' block 42*b*7) with the geologic interpretation (from the 'reservoir property and structure maps' of block 42*b*4) is intended to identify any 'potential infill well opportunities' of block 42*b*9 (or actions to be taken at individual wells as set forth in the 'workover and artificial lift candidates' block 42*b*10). The 'potential infill well opportunities' block 42*b*9 reflects any opportunities you have to drill some infill wells. However, if there is total conformance and the output of the 'conformance' block 42*b*8 is 'yes', drop down to the 'volumetric and material balance fluids in place estimates' block 42*b*11. In this block 42*b*11, it is necessary to determine how the well performance trends balance out with your estimates of fluids in place and pressure support from the material balance calculations. Referring to the 'well production decline characteristics' block 42*b*6, this block 42*b*6 is trying to forecast, by recognized analytical methods, future performance trends that you might expect from existing wells. The well production and decline characteristics, along with the way you drilled and completed the wells, are input to the 'workover and artificial lift candidates' block 42*b*10. In block 42*b*10, you are looking for workover candidates, artificial lift, and actions you can take at a specific well. That is, in block 42*b*10, if you drilled and completed two wells the same way, yet they showed different production decline characteristics, the poorer one of such wells may be presenting an opportunity for a workover. On the other hand, the poorer one may be in a portion of the reservoir field which is not being pressure supported sufficiently, which means you may need to install some sort of artificial lift. Recall that the 'well production decline characteristics' block 42*b*6 is trying to forecast future performance trends that you might expect from existing wells. Those forecasts, along with the way you drilled and completed the wells, are input to the 'statistical analysis of well indicators' block 42*b*12. The 'statistical analysis . . . ' block 42*b*12 includes approaches that are used in two types of studies, the purpose of which is to identify from actual well performance an average performance that you can expect and to compare individual wells to that average performance. As a result of this comparison, we can determine where in the reservoir field you have superior performers and where you have poorer performers and, from that determination, we can select, via the 'potential infill well opportunities' block 42*b*9, opportunities to either enhance the existing wellbores or drill new wells. Referring again to the 'well production decline characteristics' block 42*b*6, this block 42*b*6 is operatively connected to the 'current well forecasts of production and reserves' block 42*b*13. In block 42*b*13, having established what the decline characteristics are at the existing wells, the 'current well forecasts . . . ' block 42*b*13 includes a method of analytically forecasting for that group of wells what the future performance trends of the field will be if you take no action. In connection with the 'incremental production forecasts' block 42*b*14, in addition to receiving the decline characteristics of block 42*b*6, the 'incremental production forecasts' block 42*b*14 also receives an input from the 'workover and artificial lift candidates' block 42*b*10. In block 42*b*10, you have identified actions that you might take at specific wells wherein, if you perform a workover at that specific well, you might get some incremental production. The amount of incremental production would come from a comparison of the opportunity that you identify with a workover that had already been performed on a similar well in the field and you did see some success. When you consider all these opportunities and your estimate of what you could achieve if you did these workovers, it allows you to generate these 'incremental production forecasts' of block 42*b*14. In addition, referring to the 'infill forecasts of production and reserves' block 42*b*15, by the same analytical process, you may have identified opportunities for infill drilling, that is, areas of the field where there are not enough wells based on your geologic interpretations or where the existing wells are not providing adequate drainage. Therefore, having identified infill well locations, if you were to drill an infill well in those locations, how much production can be expected? In order to answer that question, we must rely on the 'well production decline characteristics' block 42*b*6 once again (i.e., the decline characteristics that were generated for existing wells). The basic production decline characteristics from block 42*b*6 allows us to forecast production for existing wells (in block 42*b*13). However, we have also identified some workover or artificial lift candidates (in block 42*b*10). We can use existing decline characteristics to estimate what incremental volumes we might produce from taking those field actions. We have also identified (in block 42*b*9) infill drilling opportunities. Again, we can use the decline characteristics of existing wells to get a forecast of what an extra well in a particular location might generate. When we combine the outputs from block 42*b*14 (incremental production forecasts), block 42*b*13 (current well forecasts . . . ), and block 42*b*15 (infill forecasts . . . ), in various combinations, into one input to the 'conformance' decision triangle of block 42*b*16, we can determine a forecast of what the field can produce. If we do a number of workovers, we can determine an incremental production. Thus, in a spreadsheet format, you can write the guides and ways of integrating individual well forecasts and forecasting what the production might be under various development plans. At this point, you must check the consistency of your forecasts with the estimates of the total amount of oil in place to be sure the decline curves are not overly optimistic based on what you would rightfully expect from the field. If there are some differences (the 'no' output from the 'conformance' triangle 42*b*16), where there are disagreements in particular areas of the field, it might be a result of an inability by analytical methods to properly account for interference effects between wells. Therefore, in connection with the 'uncertainties in sensitivity and risk analysis' block 42*b*17, these are the types of uncertainties that exist when you check if you have conformance via block 42*b*16. Having established the conformance (the 'yes' output from block 42*b*16) and the remaining uncertainties (block 42*b*17), we are now ready to do the 'production and reserves forecasting' block 42*c* of FIG. 7 and FIGS. 13A and 13B.

C. Production and Reserves Forecast, Block 42*c*

Figure 13A:
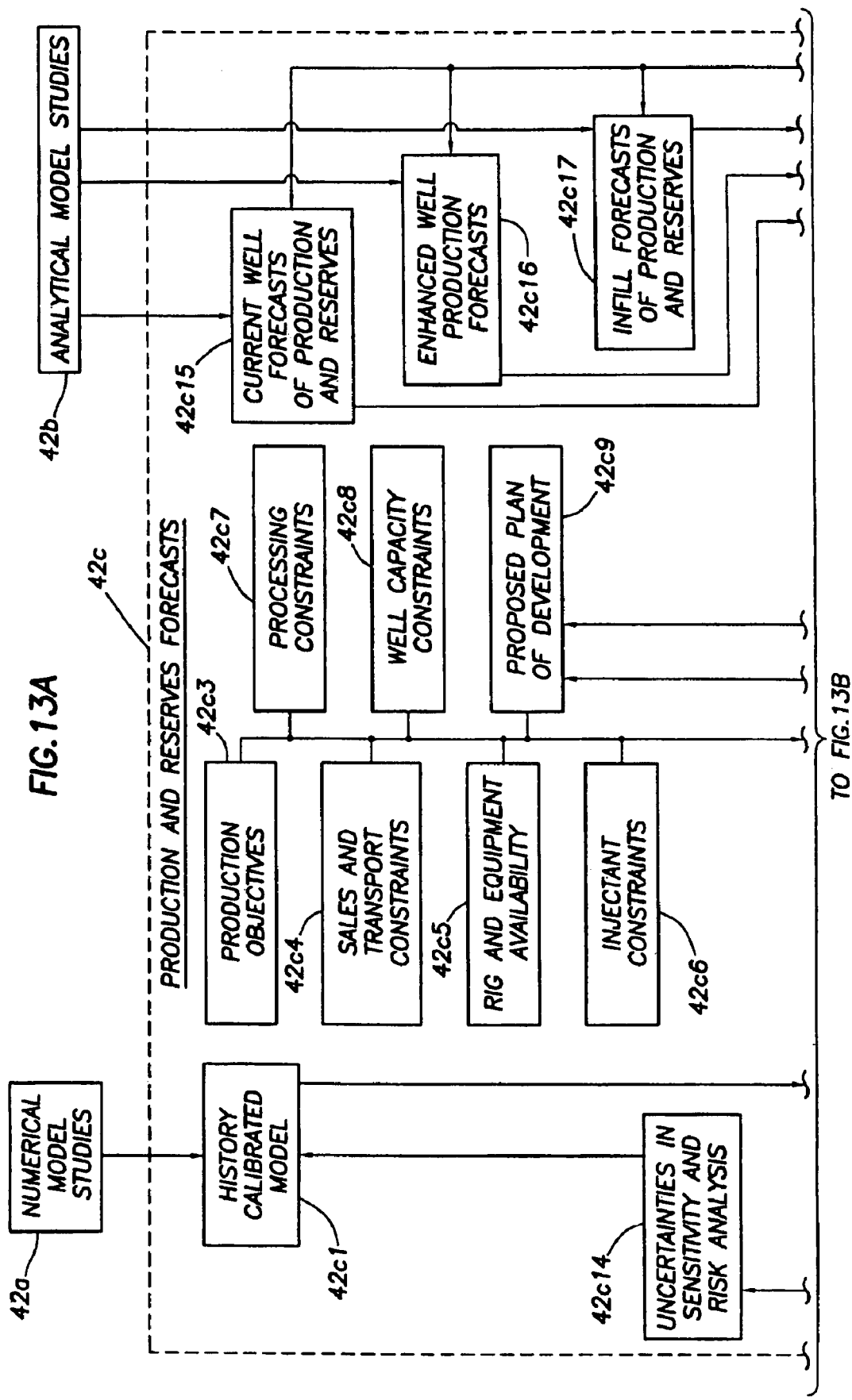
FIGS. 13A and 13B illustrate a detailed construction of the Production and Reserves Forecasts block in FIG. 7.
Figure 13B:
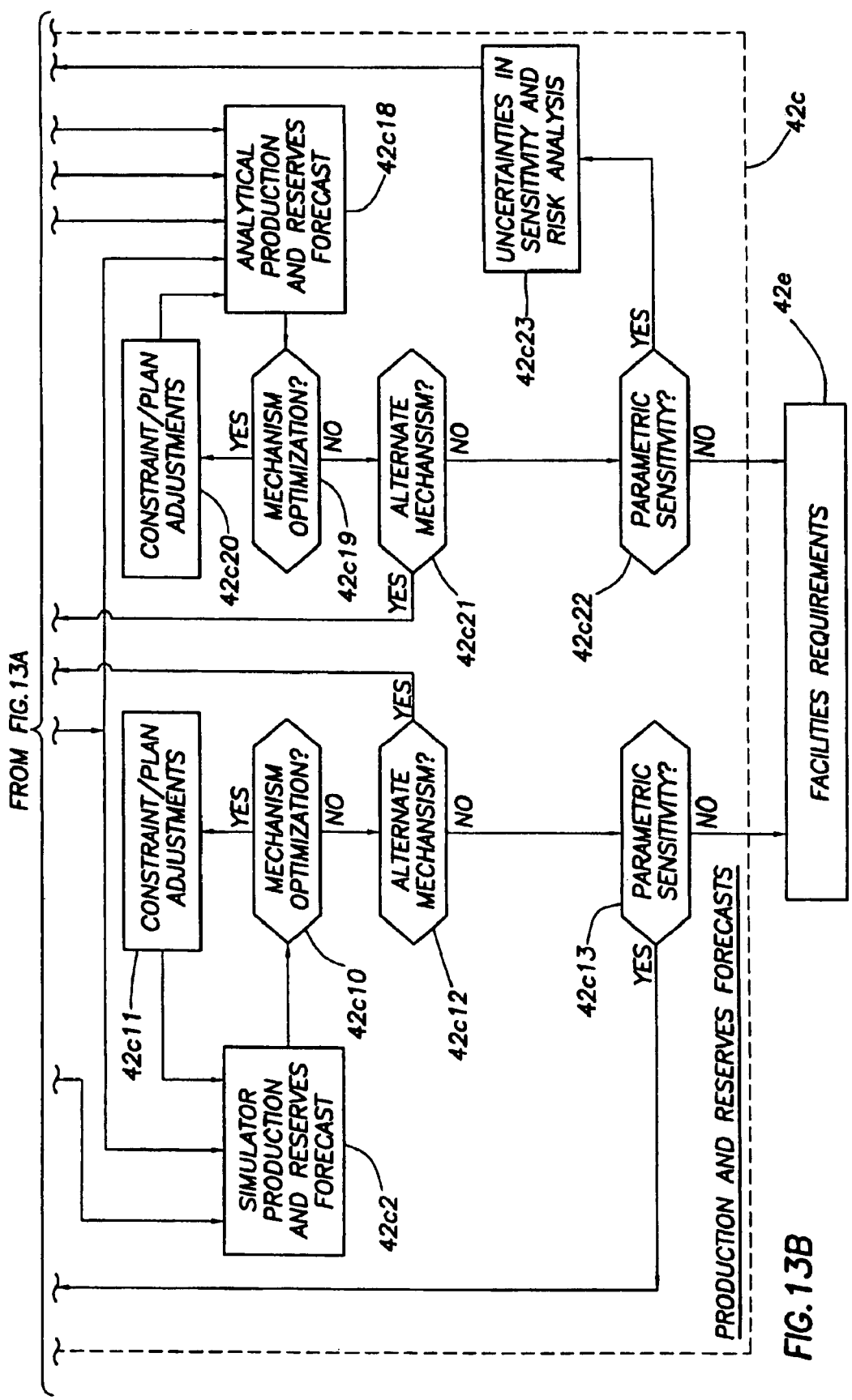

Referring to FIGS. 13A and 13B, a detailed construction of the 'Production and Reserves Forecast' block 42*c* of FIG. 7 is illustrated. The detailed construction of the 'Production and Reserves Forecast' block 42*c* of FIG. 7, as shown in FIGS. 13A and 13B, is new and novel and that detailed construction shown in FIGS. 13A and 13B sets forth an eighth new and novel feature of the present invention.

In FIGS. 13A and 13B, on the left hand side, there is illustrated a process for generating 'production and reserves forecasts' in response to the 'numerical model studies' 42*a*. The 'numerical model studies' block 42*a* provides an input to the 'history calibrated model' 42*c*1. The 'history calibrated model' 42*c*1, in turn, provides an input to the 'simulator production and reserves forecast' block 42*c*2, which is the actual simulation tool. That is, the 'simulator . . . ' block 42*c*2 will represent the well responses and the field responses to the various actions that are taken in the field (hereinafter, the "model"). We cannot specify a desired oil rate in the future. Therefore, it is necessary to set up an overlapping system of constraints on the well and reservoir that represent the conditions that exist out in the field. Then, allow the model to proceed and forecast, by itself, the following: when you impose these conditions, these are the kinds of oil and/or gas rates you will achieve. Therefore, there are a plurality of 'constraints' that are supplied to the model, and those constraints are shown and represented in FIGS. 13A and 13B by the following blocks: the 'production objectives' block 42*c*3, the 'sales & transport constraints' block 42*c*4, the 'rig & equipment availability' block 42*c*5, the 'injectant constraints' block 42*c*6, the 'processing constraints' block 42*c*7, the 'well capacity constraints' block 42*c*8, and the 'proposed plan of development' block 42*c*9. The 'production objectives' block 42*c*3 represents the target rates for the reservoir field or that which you are trying to achieve or the desire to maintain a production plateau for some period of time during the reservoir life. The 'processing constraints' block 42*c*7 represent the facilities that exist on the surface at that time which, for example, can only process a particular volume of water per day. When the model gets to the point where it wants to exceed that particular volume of water production in a given day, in order to meet the target oil production rate, the 'processing constraint' 42*c*7 will be initiated. This will result in a decline in the oil rate which is required in order to avoid exceeding the particular volume of water production per day. The 'well capacity constraints' block 42*c*8 are controlled by the following parameters: the surface delivery pressure that you need to meet, the reservoir pressure in the system, and the flow capacity of the existing completion. Each of these parameters are all provided to the model (the 'simulator production and reserves forecast' block 42*c*2). As a result, when the model knows a top hole or bottom hole pressure against which it must deliver, the model would then know the reservoir properties, and it can determine how much fluid it can deliver. The 'sales & transport contraints' block 42*c*4, which should be imposed over some portion of the field, include some sort of restriction that is related to existing pipelines and which can be changed for different forecasts. For example, if we were to increase the diameter of the pipe and demanded 500K barrels/day instead of 300K barrels of day, what would be the difference in the long term? In connection with the 'rig & equipment availability' block 42*c*5, we may be developing a field with a lot more wells and yet we will be drilling the wells in an effort to maintain the production target rate. The speed at which you can drill and complete the wells is related to the amount of equipment available. For example, if two rigs are taken from an adjacent field and made available to this field, how does that effect our ability to maintain an oil production target? In the 'injectant constraints' block 42*c*6, you may be in a position where you must maintain pressure in a field in order to maintain its deliverability and yet you have only a limited supply of injectant. Therefore, it is necessary to recognize these limitations for supplying the injectant in your production forecasts as well. In the 'proposed plan of development' block 42*c*9, this block relates to the scheduling of activities. Here, it is necessary to reflect, for the model, the actual implementation time as opposed to an implementation time which starts from a fictitious point. Therefore, all of these constraints (blocks 42*c*3, 42*c*4, 42*c*5, 42*c*6, 42*c*7, 42*c*8, and 42*c*9) feed into the 'simulator production and reserves forecast' block 42*c*2 as a mechanism for generating the production forecast. Using the 'simulator . . . ' of block 42*c*2, you would then run the model and obtain a forecast (i.e., your results) of the way the whole reservoir responds to your development plan. Those results are examined. In connection with the 'mechanism optimization' block or decision triangle 42*c*10, for the 'mechanism' that you have chosen (where the word 'mechanism' is defined as the process that is active in the reservoir, such as whether water or gas is being injected into the reservoir), is there a way to optimize the way the mechanism is implemented? For example, when doing water flood or injection, is there a different set of injection sites to examine? From the 'mechanism optimization' triangle $42c10$, if there are other cases which you believe should be examined, go to the 'constraint/plan adjustments' block $42c11$, make changes to your implementation plan or the constraints, and then go back to the 'simulator . . .' block $42c2$ and re-run another forecast. Now, you may have a water flood forecast number two. Continue to implement the loop from blocks $42c10$, $42c11$, $42c2$, and $42c10$ until you feel that you have reached the point where you have examined all reasonable alternatives for that particular mechanism. At that point, take the 'no' output from the 'mechanism optimization' block $42c10$ and drop down to the 'alternate mechanism' block or decision triangle $42c12$. The question now is: we have looked at all the water flood opportunities, is there something different that can be done in the field? For example, can we inject gas as an alternative? This would be a different 'mechanism'. Having identified a different mechanism, take the 'yes' output from the 'alternate mechanism' decision triangle $42c12$ and go back to the 'proposed plan of development' block $42c9$. Here, revise the implementation plan for your new development, and then drop back down to the 'simulator production and reserves forecast' block $42c2$, re-run the simulator for that new mechanism and then proceed with the same above referenced checks. From the results that you are getting from the reservoir response to that implementation plan, in the 'mechanism optimization' block $42c10$, is there a way to optimize it with more or less wells, different injection rates, different positioning, or different completion plans? Assuming that we have completed all the alternate mechanisms in the 'alternate mechanism' block $42c12$, refer now to the 'parametric sensitivity' decision triangle, block $42c13$. Having run, for example three different mechanisms and five different forecasts for each mechanism, fifteen cases have already been run using the basic history matched model. Of the fifteen cases, three, for example, may have the most merit because of the levels of production and recovery we have obtained. What happens when some of the uncertainty parameters are changed? How does that impact the performance of that model? Thus, there is a need for some parametric sensitivity runs. Having identified the need for some parametric sensitivity runs, take the 'yes' output from the 'parametric sensitivity' triangle $42c13$ which leads us to the 'uncertainties in sensitivity and risk analysis' block $42c14$. This block $42c14$ contains the uncertainties. Going back to the 'history calibrated model' block $42c1$, make the changes in the reservoir description which results in a new model. That new model drops back down to the 'simulator . . .' block $42c2$ along with all the constraints (from block $42c3$ through block $42c9$). Re-run the model for the selected cases that you wish to examine by the sensitivity work. However, if there is no need for any parametric sensitivity runs, take the 'no' output from the 'parametric sensitivity' triangle $42c13$ which leads us now to the 'facilities requirements' block $42e$. For example, if we changed the constraints (of blocks $42c3$ through $42c9$) to handle an extra 100K barrels/day of water capacity, how does that change or affect the 'facilities requirements' $42e$ to actually buy that 100K barrels/day of production capacity? Therefore, when you change the constraints, you must also change the surface requirements design parameters. In the 'analytical model studies' block $42b$ in FIG. 13A, by reviewing actual well performance histories, completion practices, workover practices, and comparisons of well quality versus the geological model, the 'analytical model studies' block $42b$ in FIG. 13A has generated the following 'output data' blocks: (1) 'current well forecasts of production and reserves' block $42c15$ representing decline trends for existing wells (a 'first forecast'), (2) 'enhanced well production forecasts' block $42c16$ representing workover opportunities and what additional oil may be producible by those workovers (a 'second forecast'), and (3) 'infill forecasts of production and reserves' block $42c17$ representing potential infill well candidates (a 'third forecast'). The 'first forecast' (i.e., the 'current well forecasts of production and reserves') block $42c15$ enables us to produce a first forecast of production and reserves for the existing wells (from the decline trends of the past). The 'second forecast' (i.e., the 'enhanced well production forecasts' block $42c16$) enables us to produce a second forecast which we call enhanced well production forecasts in cases where we do these workovers. The 'third forecast' (i.e., the 'infill forecasts of production and reserves' block $42c17$) enables us to produce a third forecast which are either including the enhanced wells and infill wells or just the current wells with some additional wells. The first, second, and third forecasts are generated from a spreadsheet type of format where we have the existing wells and their expectations from the decline curves. The above referenced first, second, and third forecasts generated from blocks $42c15$, $42c16$, and $42c17$ in FIG. 13A flow into the 'analytical production and reserves forecast' block $42c18$ which enables us to do an analytical forecast of a particular set of development constraints. Note also that all of the plurality of 'constraints' in blocks $42c3$, $42c4$, $42c5$, $42c6$, $42c7$, $42c8$, and $42c9$ are also provided as input data to the 'analytical production and reserves forecast' block $42c1$ because all of these same 'constraints' must also be applied in the analytical modeling phase as well. The analytical modeling phase is being implemented in the 'analytical production and reserves forecast' block $42c18$. When building an analytical forecast for a reservoir field, you cannot drill, for example, 50 wells a year if you know that your rig availability is a constraint. Having generated a forecast for a particular mechanism, the remaining part of this description set forth in blocks $42c19$, $42c20$, $42c21$, $42c22$, and $42c23$ is exactly the same as the numerical model. The only difference is: in the numerical model, you adjust the constraints and let the model forecast your production rate; however, in the analytical model studies case, you must adjust the way your spreadsheet analysis is summing up individual well contributions to arrive at a field forecast. In the analytical model studies case in FIG. 13, with respect to blocks $42c19$, $42c20$, $42c21$, $42c22$, and $42c23$, you can examine different production mechanisms, different ways of implementing them, different schedules of implementing them, and you can also address the uncertainties by running sensitivity type forecasts as well. Again, the results would flow into the 'facilities requirements' block $42e$ representing an analysis of what you need from the standpoint of surface processing or shipping facilities.

D. Facilities Requirements, Block $42e$

Figure 14A:
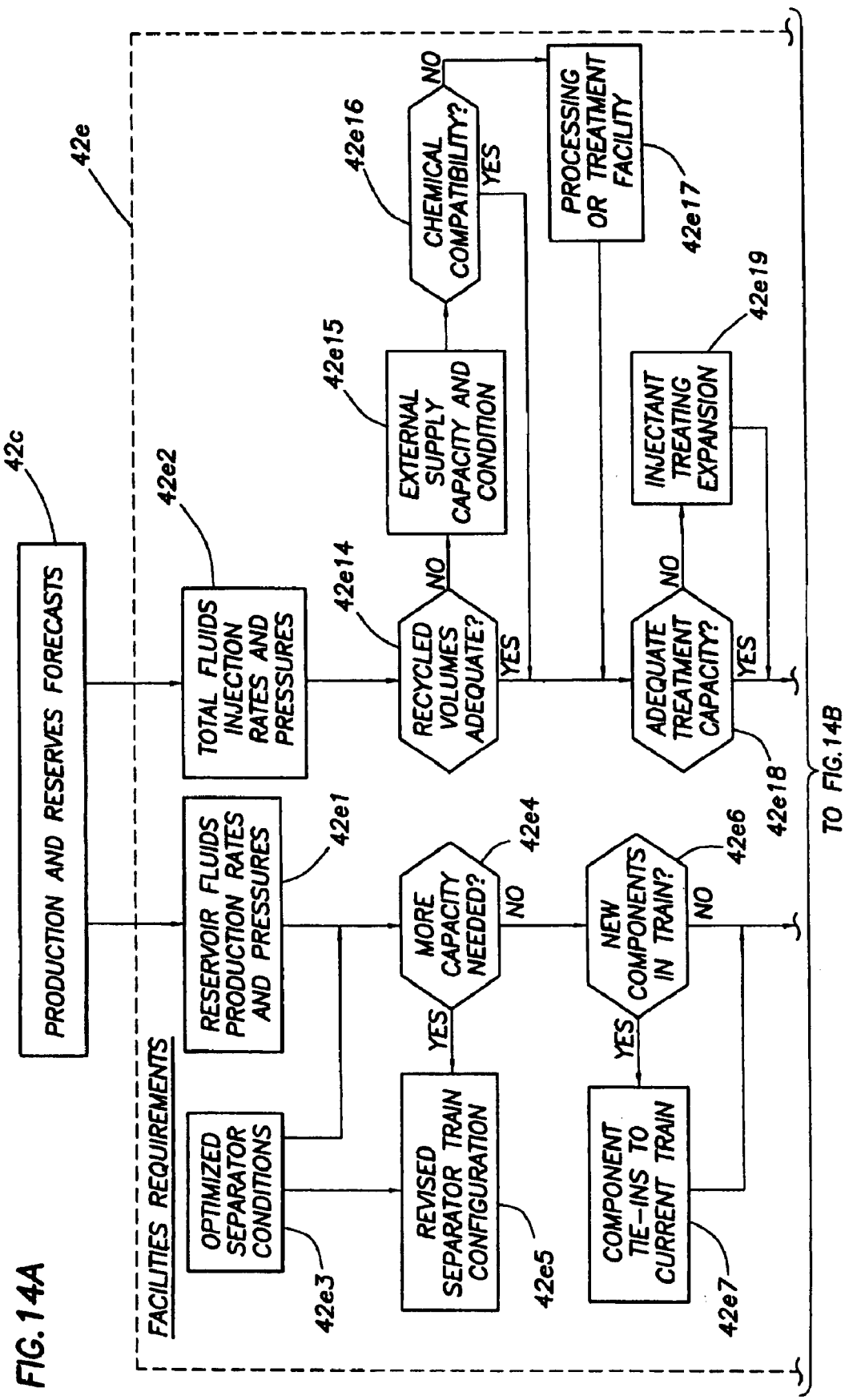
FIGS. 14A and 14B illustrate a detailed construction of the Facilities Requirements block in FIG. 7.
Figure 14B:
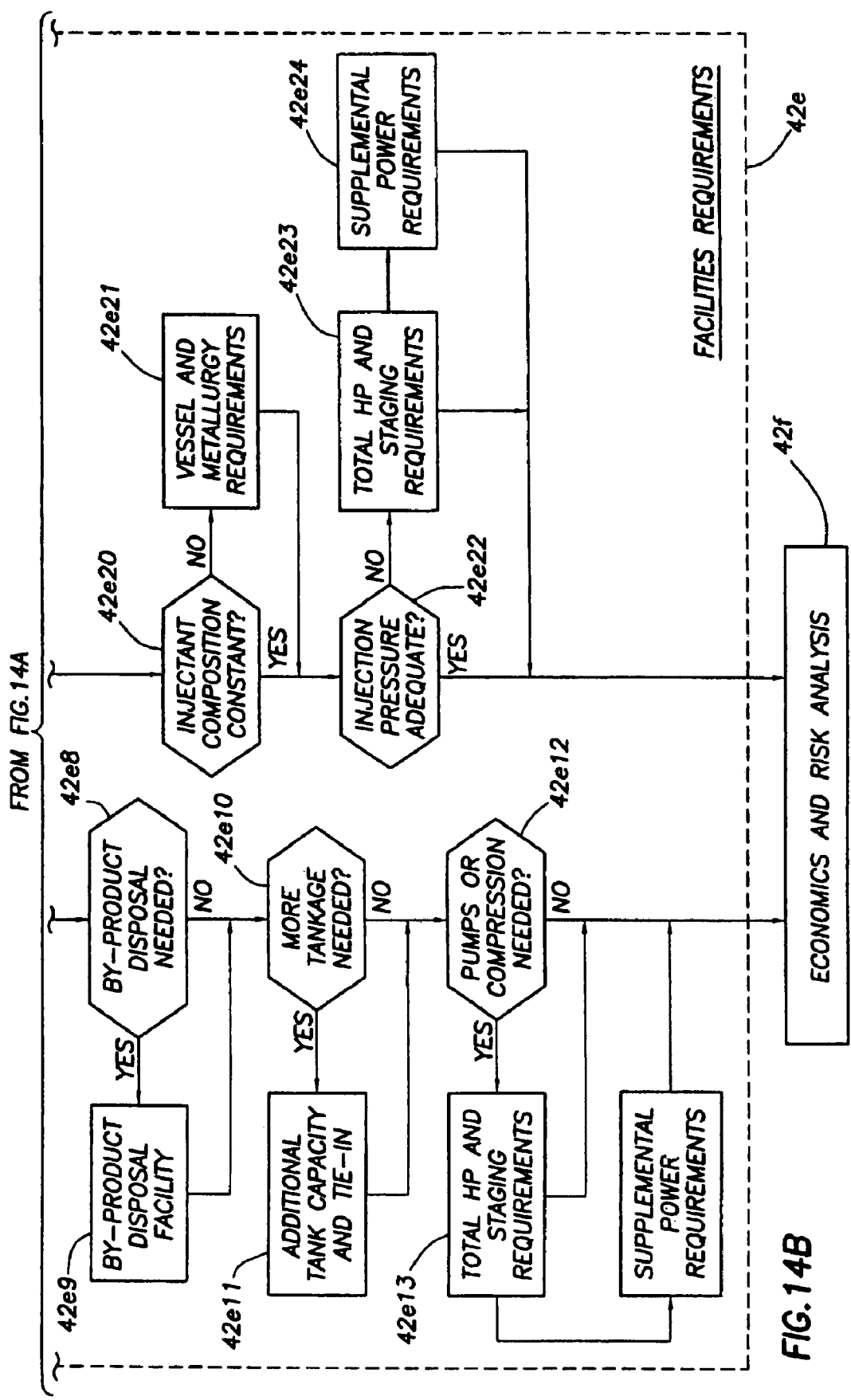

Referring to FIGS. 14A and 14B, a detailed construction of the 'Facilities Requirements' block $42e$ of FIG. 7 is illustrated. The detailed construction of the 'Facilities Requirements' block $42e$ of FIG. 7, as shown in FIGS. 14A and 14B, is new and novel and that detailed construction shown in FIGS. 14A and 14B sets forth a ninth new and novel feature of the present invention.

In FIGS. 14A and 14B, from the 'production and reserves forecast' block $42c$, a schedule of rates of production and injection is generated that have been forecast for the next twenty years (for example) on an annual or a 6-monthly basis. Those forecasts have been generated based on a set of constraints on facilities. Here, we must estimate the facilities that must be required for a depletion mechanism or an optimization case. The basic inputs that come from the 'production and reserves forecast' block 42c are the 'reservoir fluids production rates & pressures' block 42e1 (i.e., the 'production side') and the 'total fluids injection rates & pressures' block 42e2 (i.e., the 'injection side'). At this point, consider first the 'production side'. On the 'production side', the 'optimized separator conditions' block 42e3 include the conditions that are in effect for the existing separation equipment. In the 'more capacity needed' decision triangle block 42e4, this block represents a first check on whether your separator conditions from block 42e3 and the production rates that you project from block 42e1 are consistent. That is, in block 42e4, do you have sufficient capacity currently to handle the forecast of production rates (i.e., do you need more capacity)? If you do need more capacity, take the 'yes' output from the decision triangle block 42e4 which leads to the 'revised separator train configuration' block 42e5. In this block 42e5, the configuration of the existing separator facilities is examined and either a new train is added or one of the existing trains is replaced (and estimate capital costs associated therewith). A second check is now implemented in the 'new components in train' decision triangle block 42e6. For example, the reservoir field facility may not now include any water handling facilities; therefore, the question now is 'are you going to install those water handling facilities'? If yes, take the 'yes' output from the decision triangle block 42e6 which leads to the 'component tie-ins to current train' block 42e7. If you need to add-in those components, where do they fit in the design stream and estimate the costs associated therewith. A third check is now implemented in the 'by-product disposal needed' decision triangle block 42e8. In this decision triangle block 42e8, do you need any additional by-product disposal? If yes, take the 'yes' output from decision triangle block 42e8 which leads us to the 'by-product disposal facility' block 42e9. In block 42e9, if, for example, you do produce substantial amounts of water, what are you going to do with all that water? High pressure pumps may be required to inject the water underground. Do you need to install the facilities to handle the by-products? A fourth check is now implemented in the 'more tankage needed' decision triangle block 42e10. In this decision triangle block 42e10, if you increase the production rates from the field, you may need to increase the tankage on the main product (if its oil), or, if your by-product is water, you may need extra tankage for the water. Therefore, if more tankage is needed, take the 'yes' output from the decision triangle block 42e10 which leads us to the 'additional tank capacity and tie-in' block 42e11. A fifth check is now implemented in the 'pumps or compression needed' decision triangle block 42e12. If pumps or compression is needed, take the 'yes' output from the decision triangle block 42e12 which leads us to the 'total HP and staging requirements' block 42e13. In blocks 42e12 and 42e13, if you are going to switch to a concurrent oil and gas sales program at some point in the future, and having identified a market for gas, are you going to need to compress the gas in order to get the compressed gas to the sales terminal? What is your existing compressor capacity? You may need to add more compression. If the compression ratio is very high, will you need to stage the compressors? Each of the above referenced changes to the existing facilities, in connection with blocks 42e4, 42e6, 42e8, 42e10, and 42e12, carries with it a capital cost and possibly incremental operating costs (hereinafter, 'factors') and these 'factors' flow down into the 'economic and risk analysis' block 42f. At this point, consider now the 'injection side'. On the 'injection side', there exists a similar series of checks. A first check is the 'recycled volumes adequate' decision triangle block 42e14. If the recycled volumes are not adequate, take the 'no' output from the decision triangle block 42e14 which leads us to the 'external supply capacity and condition' block 42e15. In blocks 42e14 and 42e15, if you have proposed a scheme where you are injecting produced gas, and you have made the assumption that you are going to inject a specific volume of injectant (e.g. fluids or a gas) to maintain reservoir pressure in order to support your expected oil production target rates, is the volume of gas that you will be producing from the field sufficient to make-up your injection requirements, or do you need to look for an external supply of such injectant? Do you need to buy the injectant (e.g. gas) from a neighboring pipeline. The injectant can be gas or it might be water or any other injectant. Do you have sufficient resources on your own or do you need to purchase the resources (i.e., the injectant) from an external supplier? If you do need to purchase the resources from an external supplier, as noted in the 'external supply capacity and condition' block 42e15, refer to the 'chemical compatibility' decision triangle block 42e16. In this block 42e16, do you have compatibility of the injectant (such as water) with the system that you are running (e.g., in water injection programs, do you have water compatibility between your reservoir and the alternate source)? If there is no compatibility, take the 'no' output from the decision triangle 42e16 which leads us to the 'processing or treatment facility' block 42e17. In block 42e17, in addition to installing production handling facilities, do you need to also install a processing plant for your injectant fluids? A second check is the 'adequate treatment capacity' decision triangle block 42e18. With respect to block 42e18, if your forecast shows that you do have sufficient volumes from your own site, do you have sufficient capacity to handle those volumes? For example, if in the future the gas rates will be ten times what they are today, you can inject a gas today at today's gas rates but, in the future, do you have the ability to inject at ten times that rate? If, in block 42e18, you do not have sufficient capacity, take the 'no' output from block 42e18 which leads us to the 'injectant treating expansion' block 42e19. In block 42e19, an expansion to the injectant treatment is required. A third check is the 'injectant composition constant' decision triangle block 42e20. With respect to block 42e20, are you making any changes to your injection stream? For example, your mechanism that you are using might include carbon dioxide in substantial fractions. Since carbon dioxide is corrosive, does that impose certain requirements on the metallurgy of the equipment that you have to handle the carbon dioxide? Do you need to change the equipment metallurgy to stainless steel, or do you need to use plastic liners in the separation vessels? Those changes to the equipment metallurgy will be dealt with in the 'vessel and metallurgy requirements' block 42e21. A fourth check is the 'injection pressure adequate' decision triangle block 42e22. In block 42e22, do you have adequate injection capacity? In connection with this injection system, if you have a situation where the reservoir has been depleted and you are trying to install a new facility and repressure the reservoir, what sort of capacity for the injection pressure is required here. In the 'total HP and staging requirements' block 42e23 and in the 'supplemental power requirements' block, what sort of staging of the compression is required and what are the pumping requirements and what is the impact of that compression and pumping requirement on your local power supply? For example, the installation of high volume downhole pumps may require power that is not required by the rest of the installation. Therefore, if you choose to install those types of pumps, you must buy and install the pumps and you must also provide for the electricity requirements in order to meet the driver needs. Each of the above referenced changes to the existing facilities, in connection with blocks 42e14, 42e18, 42e20, and 42e22, carries with it a capital cost and possibly incremental operating costs (hereinafter, 'additional factors') and these 'additional factors' flow down into the 'economic and risk analysis' block 42f.

E. Environmental Considerations, Block 42d

Figure 15A:
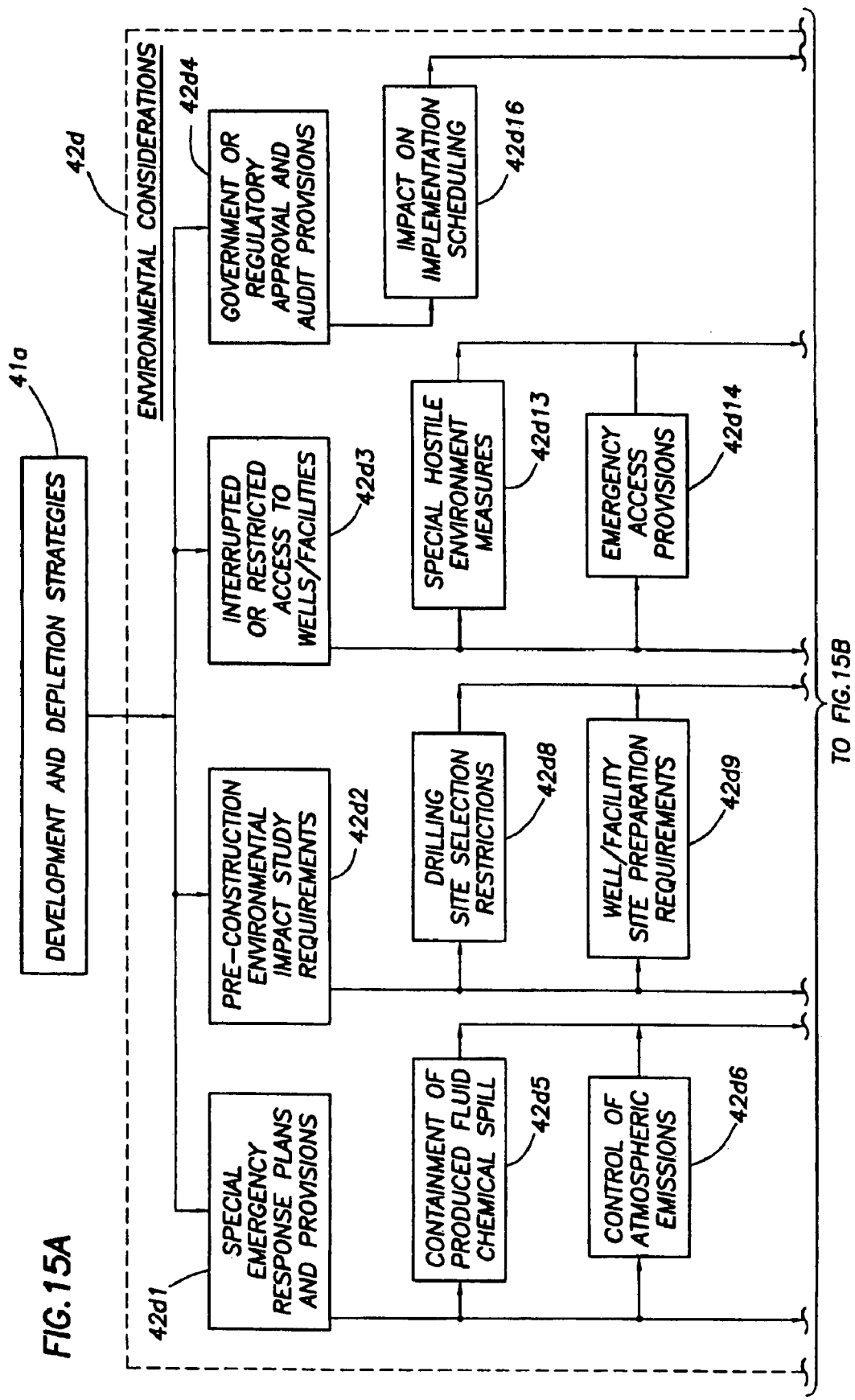
FIGS. 15A and 15B illustrate a detailed construction of the Environmental Considerations block in FIG. 7.
Figure 15B:
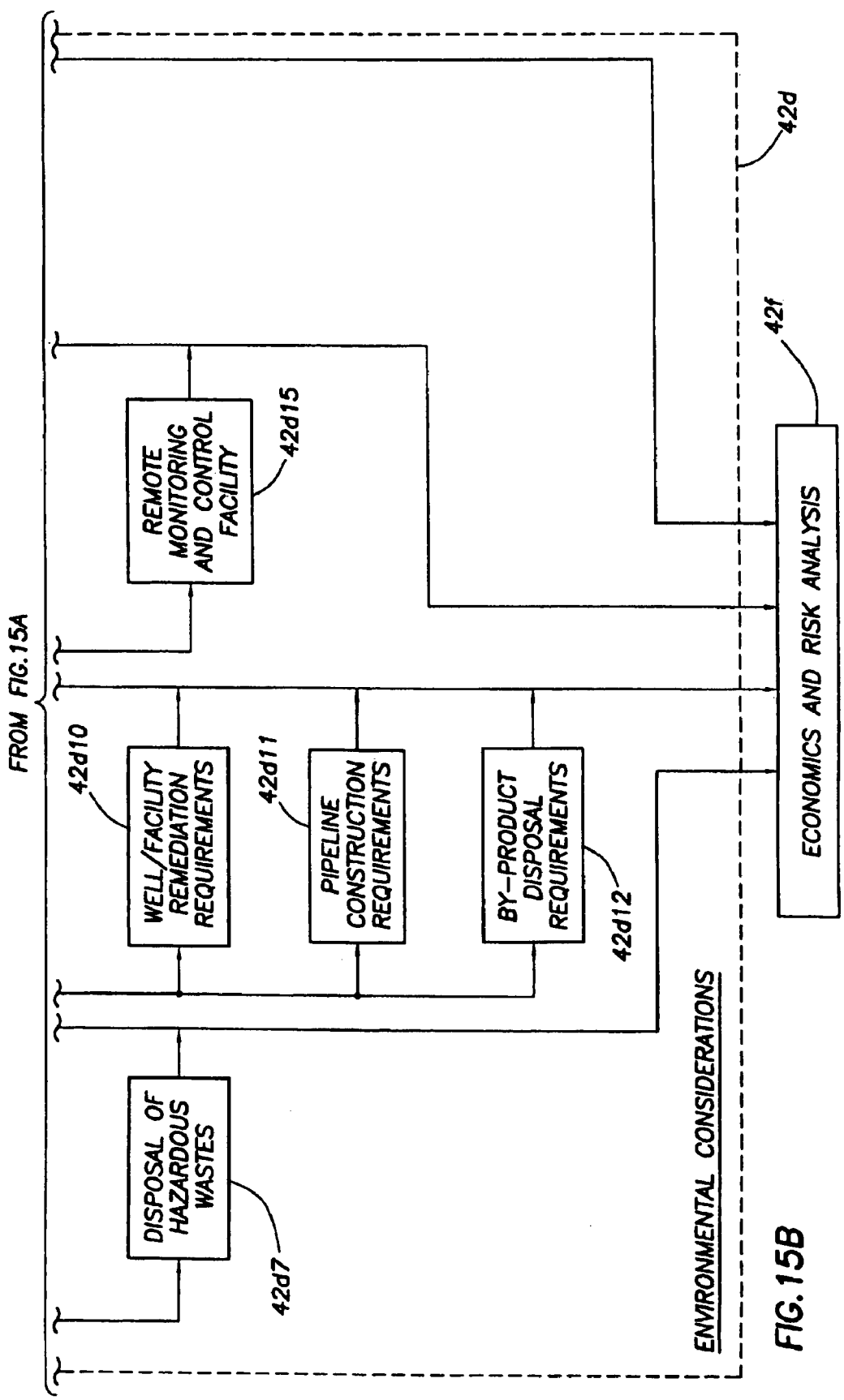

Referring to FIGS. 15A and 15B, a detailed construction of the 'Environmental Considerations' block 42d of FIG. 7 is illustrated. The detailed construction of the 'Environmental Considerations' block 42d of FIG. 7, as shown in FIGS. 15A and 15B, is new and novel and that detailed construction shown in FIGS. 15A and 15B sets forth a tenth new and novel feature of the present invention.

In FIGS. 15A and 15B, the term 'environmental considerations' includes air and water quality considerations, but it also includes the business environment and the geographical environment. These are issues which will arise depending on: where the reservoir field is located, whether it is on-shore or off-shore, what kind of government is in place, and the impact these issues have on planning, economic provisions, and the risk that must be considered when deciding to implement a particular field development plan. These are issues that will be considered separately from main stream technical evaluations. Therefore, the 'environmental considerations' must be taken into account when doing risk analysis and economic appraisals. In FIGS. 15A and 15B, four broader categories of 'environmental considerations' have been identified: the 'special emergency response plans and provisions' block 42d1, the 'pre-construction environmental impact study requirements' block 42d2, the 'interrupted or restricted access to wells/facilities' block 42d3, and the 'government or regulatory approval and audit provisions' block 42d4. In the 'special emergency response plans and provisions' block 42d1, there are several issues which need to be considered. For example, one issue relates to the 'containment of produced fluid chemical spills' block 42d5. In connection with block 42d5, in an 'on-land' type of installation, most producing sites would be required to be surrounded by earthen dykes having the ability to contain a certain number of days of production. However, these types of considerations would be much more prohibitive in an off-shore installation since, in an off-shore installation, you must provide the government with enough provision to contain potential chemical or produced fluid spills. Another issue relates to the 'control of atmospheric emissions' block 42d6. In block 42d6, this is primarily related to sour gas production in accompanyment with the oil. Various governments are very particular about how much hydrogen sulfide is being burned or unprocessed and released into the atmosphere. These provisions are typically dealing with the process facilities associated with an oilfield development plan. Another issue relates to the 'disposal of hazardous wastes' block 42d7. In block 42d7, this relates to disposal of chemicals used to treat wells or chemicals used during drilling and workover operations or chemicals used in the recovery and processing of fluids. For each of these chemicals, some sort of hazardous waste disposal program must exist in order to properly dispose of each of these chemicals. In the 'pre-construction environmental impact study requirements' block 42d2, several additional issues need to be considered. The 'preconstruction environmental impact study requirements' identifies special needs and restrictions depending on the geographical location and local regulations in effect (which will vary from one location to another). In the 'drilling site selection restrictions' block 42d8, one such restriction is the selection of a drilling site. In some cases, you are not permitted to drill in certain areas because of migration patterns of wild animals. In other cases, you may be required to drill from a single pad location to minimize the impact on the environment, or you may be required to drill directionally which will present a cost burden on the development plan. In the 'well/facility site preparation requirements' block 42d9, this block relates to what is required in order to minimize damage to the environment as a result of the construction of the facility. In the 'well/facility remediation requirements' block 42d10, when the oilfield has been depleted, what provisions are required for remediation of the facility of site? In the 'pipeline construction requirements' block 42d11, what kind of preparations do you have to make, and what kind of remediations do you have to make to the pipeline in order to comply with government restrictions and regulations? In the 'by-product disposal requirements' block 42d12, the production of oil containing sour gas streams produces a large amount of hydrogen sulfide in the gas. Processing plants will have several trains that will reduce the hydrogen sulfide to elemental sulfur, but the elemental sulfur can create a huge storage burden on the operator. Yet, there are only limited applications for sulfur outside the industry. Care must be taken to prevent the elemental sulfur from being reduced to powder form and distributed by wind across the country. Therefore, there must be a natural way to store the sulfur in the open without being adversely affected by wind/rain, etc. In the 'interrupted or restricted access to wells/facilities' block 42d3, several additional issues need to be considered related to interrupted or restricted access to wells and facilities. In the 'special hostile environment measures' block 42d13, some fields are flooded during part of the year and are not accessible except by boat or barge. For other fields, during the spring, certain roads are in poor condition to support the transportation of heavy equipment in order to get access to the well site. In the 'emergency access provisions' block 42d14, if something were to go wrong, what provisions must you make in order to get access to a remote well site? For example, off shore platforms are often remotely operated by electronically actuated values and control mechanisms. If the valves fail to operate, what provisions have been taken in order to get access to that failed valve? In the 'remote monitoring and control facility' block 42d15, this block is closely related to block 42d14, but each block 42d14 and 42d15 have a separate slightly different contribution to the costs which need to be accounted for when doing the 'economics and risk analysis' of block 42f. In the 'government or regulatory approval and audit provisions' block 42d4, several additional issues here need to be considered. Governmental regulations do have an impact on the implementation of a field development plan because it does take time to get those governmental approvals. For example, in the 'impact on implementation scheduling' block 42d16, if you undertake a study that may take a year to complete which results in a field development plan, and when you give that field development plan to the government for approval, how long does it take to get all the approvals? It is not uncommon to take 2 to 5 years to get approval for a specific plan. These factors have an impact on the economics as well because, for every year the project is delayed, the projected cash flows and expected capital investments in implementing the development plan are also affected.

Therefore, in FIGS. 15A and 15B, all of the factors discussed above, which are identified in blocks 42d1 through 42d16 of FIGS. 15A and 15B, need to be considered in the 'economics and risk analysis' block 42f of FIGS. 16A and 16B (discussed in detail below).

F. Economics & Risk Analysis, Block 42f

Figure 16A:
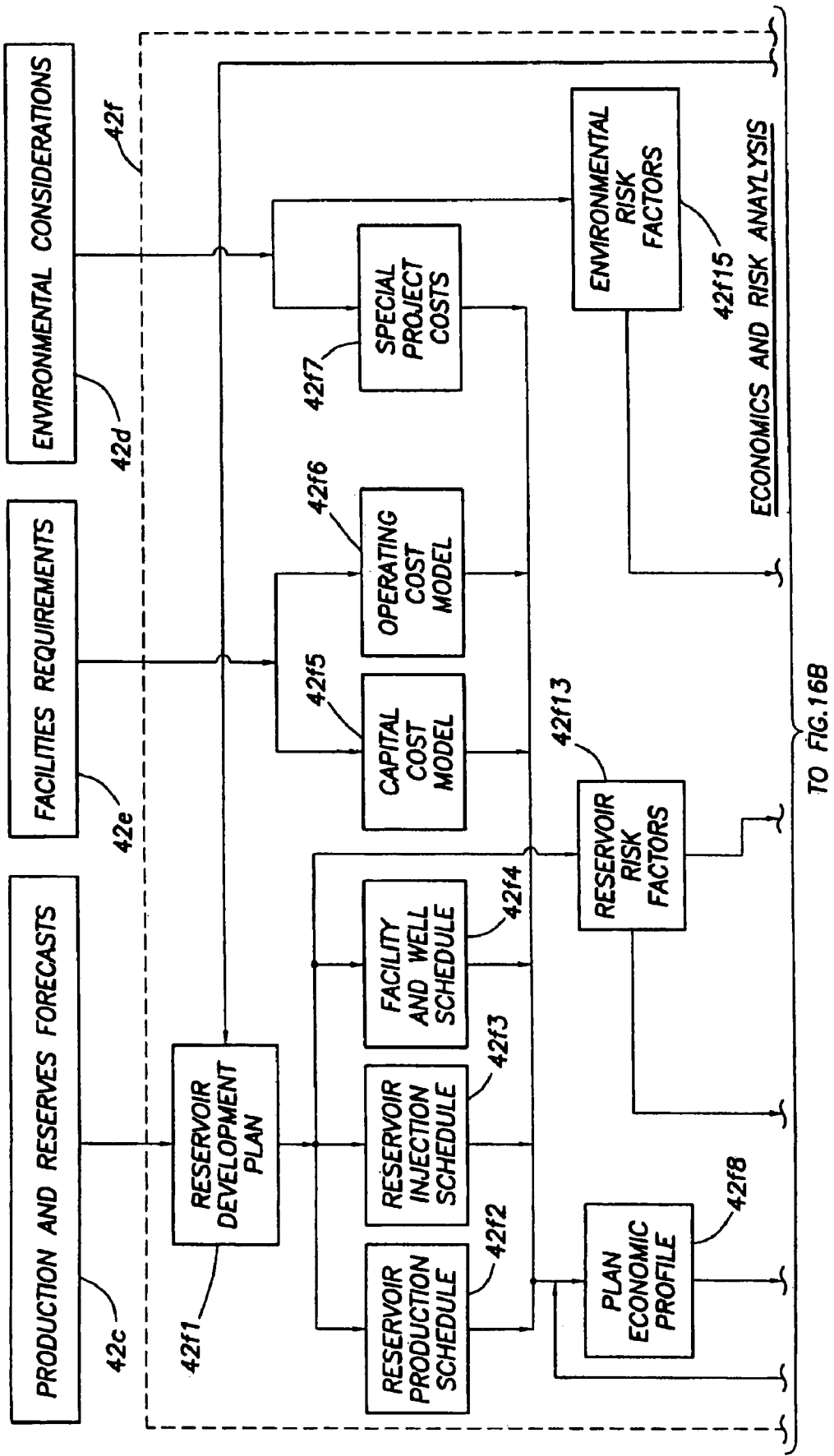
FIGS. 16A and 16B illustrates a detailed construction of the Economics and Risk Analysis block in FIG. 7.
Figure 16B:
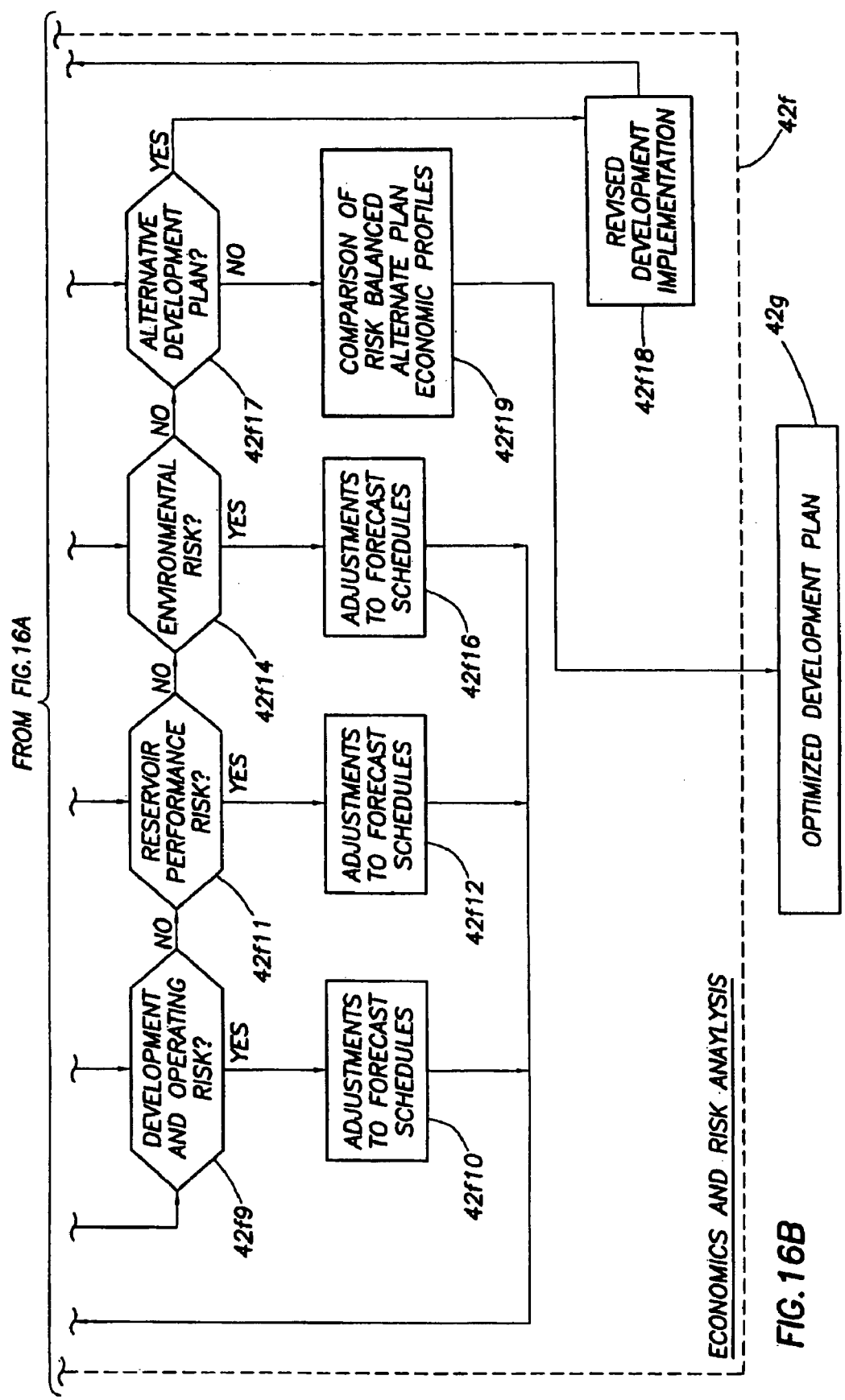

Referring to FIGS. 16A and 16B, a detailed construction of the 'Economics & Risk Analysis' block 42f of FIG. 7 is illustrated. The detailed construction of the 'Economics & Risk Analysis' block 42f of FIG. 7, as shown in FIGS. 16A and 16B, is new and novel and that detailed construction shown in FIGS. 16A and 16B sets forth an eleventh new and novel feature of the present invention.

In FIGS. 16A and 16B, the general approach taken in the 'economics & risk analysis' block 42f is to try to evaluate, for each of the alternative depletion plans that you think have merit, the economics of each plan. Then, it is necessary to incorporate, into your evaluation of said economics, any sensitivity work that has been done on any, as yet, poorly defined reservoir parameters. It is also necessary to identify provisions which pertain to the risks associated with each plan. In the 'reservoir development plan' block 42/1, this block 42/1 provides the following: a produced fluids or production schedule in the 'reservoir production schedule' block 42/2, an injected fluids schedule in the 'reservoir injection schedule' block 42/3, and a schedule of the facility requirements (e.g., the wells, either interventions or new wells) in the 'facility and well schedule' block 42/4. From the production schedule in block 42/2 and the injection schedule in block 42/3 and the well schedule in block 42/4, we have been able to develop the 'facilities requirements' 42e. The 'facilities requirements' 42e will include the processing, drilling, and workover plans, each of which will have the 'capital cost model' block 42/5 and the 'operating cost model' block 42/6 associated therewith. In addition, considerations which result from the 'environmental considerations' block 42d might add 'special project costs' block 42/7 associated either with where the reservoir is located, what the government is, or it may be the depletion mechanism being implemented. Blocks 42/2, 42/3, 42/4, 42/5, 42/6, and 42/7 all feed into the 'plan economic profile' block 42/8 which will give an economic profile for the development plan that has been selected (hereinafter, the 'selected development plan'). This block 42/8 will also provide a cash flow summary from which you can decide how attractive, from an economic standpoint, is the 'selected development plan'. Having developed a 'plan economic profile' in block 42/8, we can now decide, in the 'development & operating risk' decision triangle block 42/9, whether there are significant development and operating risks that you need to consider associated with the 'selected development plan'. If there are significant development and operating risks, refer now to the 'adjustments to forecast schedules' block 42/10 where you would be making adjustments to your forecast schedules. A first input to the 'development and operating risk' block 42/9 and a second input to the 'reservoir performance risk' block 42/11 each originate from the 'reservoir risk factors' block 42/13. Different examples of 'reservoir risk factors' will now follow. For example, a 'development and operating risk' in block 42/9 could include a projection in the 'selected development plan' indicating a need for 100 wells to exploit the field effectively. What is the risk of losing a particular wellbore after having made a bulk of the investment in drilling the wellbore? Or perhaps we could lose tools in the wellbore. These could be defined to be possible 'development risks'. Relative to the term 'operating risk', how often would it be necessary to shut down a plant in order to perform special work resultant from vessel failure? What is the frequency of pipeline failures if we are shipping our produced product by pipeline to market? With all of these considerations, an adjustment to your forecast production schedules can be made. When those adjustments are made, in the 'adjustments to forecast schedules' block 42/10, and when simultaneously maintaining everything else unchanged, and noting the feedback loop from the output of block 42/10 to the input of block 42/8, the 'plan economic profile' block 42/8 can be re-run which gives you an estimate of the associated risk associated costs. When you have considered and dealt with the 'development and operating risk' of block 42/9, a 'reservoir performance risk' in block 42/11 must also be considered. A 'reservoir performance risk' in block 42/11 relates to the character and nature of the reservoir that you have not been able to firmly establish from the history matching and the geologic studies. In the 'adjustments to forecast schedules' block 42/12, it may be necessary to adjust your production forecast in some manner, perhaps based on your sensitivity forecast that was implemented in either the analytical or numerical models. When we generated production forecasts, we talked about ways that you can then run sensitivities to reservoir parameters. With each of those, you would have different production and injection schedules for each of the development plans on which you are evaluating the economics. Having incorporated those adjustments in block 42/12, re-run the economic profiles in the 'plan economic profile' block 42/8. In the 'environmental risk' decision triangle block 42/14, there are different ways to account for these types of risks, ranging from expected risks to catastrophic risks. If environmental risks do exist, with reference to the 'adjustments to forecast schedules' block 42/16 and the 'plan economic profile' block 42/8, you may want to re-run the economic profiles in the 'plan economic profile' block 42/8 in a similar manner as previously indicated in connection with blocks 42/9 and 42/11. You may also want to make provision for the risks/catastrophic losses by a required net present value over and above a particular rate of return. For example, if running a large number of projects worldwide, you can account for one catastrophic failure per some many hundreds of millions barrels of production, and, thus, you may want to require that each project carry its fair share of such catastrophic failures. You may have to generate a net present value of at least 50 million dollars at a discount rate of 20%. Therefore, there are different ways to accounting for the 'environmental risk factors', as set forth in the 'environmental risk factors' block 42/15. In the 'alternative development plan' decision triangle block 42/17, you may have to decide to evaluate economically an alternative development plan. If there are alternative development plans, as indicated in the 'revised development implementation' block 42/18, it is necessary to loop back to the input of the 'reservoir development plan' block 42/1, which represents the beginning of this process, and repeating the economic profile generation for the new development/depletion plan while taking into account its attendant risks and uncertainties. The alternative development plans will have its own production and injection schedules, the facilities and wellbores that are necessary, the capital and operating costs provisions, and some changes to the special project costs. When you have dealt with all the alternative development plans, take the 'no' output from the 'alternative development plan' decision triangle block 42/17 and refer to the 'comparison of risk balanced alternate plan economic profiles' block 42/19. Here, in block 42/19, you will compare the various alternative development plan economic profiles, and, responsive to that comparison of economic profiles, you will assess the risk which is associated with each of the various economic profiles. For example, assume that two alternative development plans exist. Assume that a first alternative development plan has on its up side additional profit potential but on its down side it has more risk. Assume further that a second alternative development plan has a lower level of risk and a lower level of risk-costs but it also produces a lower annual revenue stream. A relatively senior level management decision is required in order to decide whether the first alternative development plan or the second alternative development plan should be selected. Generally, however, the alternative development plans will fall together and there will be a reasonable comparison and it will be fairly obvious which alternative development plan is the 'appropriate development plan' to adopt. The 'appropriate development plan' to adopt will be the 'optimized development plan' of block 42g. The 'optimized development plan' will be the one for the conditions and the information that are available to you at the time. This is not necessarily the optimized development plan for all time.

G. Optimized Development Plan, Block 42g

In FIGS. 4 and 16A/16B, the 'appropriate development plan' is the 'optimized development plan' of block 42g in FIG. 16B. The 'optimized development plan' of block 42g in FIG. 16B represents the 'reservoir development plan' of block 42 in FIG. 4. In FIG. 4, having made the selection of the 'appropriate development plan' as the 'reservoir development plan' of block 42, you now start the 'incrementally advance capital program' block 43 in FIG. 4. Now, you start spending money in the reservoir field in response to and in accordance with the selected 'appropriate development plan'/'reservoir development plan' 42. In FIG. 4, you then monitor and operate in the 'operate/monitor' block 44 while gathering the 'high rate monitor data' of block 62. Having collected the new data, via block 44, implement the 'data assimilation and updating' block 45 in FIG. 4. After a period of time, the additional information might prove that your interpretations of the reservoir fell short and that your 'optimized development plan' 42g, based on that previous description, needs to change. In FIG. 4, in that case, it would be necessary to cycle back from the output of block 45 (data assimilation and updating) to the input of block 41 (initial reservoir characterization). At this point, new data is collected and a new development plan is generated. However, a new development plan is not generated more often than several years apart because: (1) large capital investment requirements are needed each time a new development plan is generated, and (2) the true behavior of the reservoir cannot be observed until the reservoir has been given enough time to reach a 'semi-steady-state' condition. By responding too quickly to adjust the development plan, you have not seen everything; that is, you have not observed enough data to warrant changing the development plan. For a reservoir life of 25 to 30 years, you might have 3 or 4 shifts in the basic development plan.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of performing a numerical model study to accurately forecast a production of a well in a reservoir, comprising:

determining, a property distribution of the reservoir using a digital 3D structure and property model for providing an estimate of a 3D structure, wherein the estimate of the 3D structure includes the property distribution;

determining a grid system, including a grid and layering mechanism that is superimposed on said 3D structure and said property distribution associated with the digital 3D structure and property model, using a 3D simulator grid system; and determining a rock model using an initial 3D reservoir simulator in response to the estimate of the property distribution associated with the digital 3D structure and property model and the grid system associated with the 3D simulator grid system, wherein the rock model is used to accurately forecast the production of the well in the reservoir.

2. The method of claim 1, further comprising:

superimposing, using a fluid property and saturation model, a saturation distribution onto said rock model that is defined by the initial 3D reservoir simulator.

3. The method of claim 2, further comprising:

defining outside influences using an initial reservoir conditions and aquifer model, the outside influences including an extent of an aquifer system that is in fluid communication with an oil and/or gas accumulation.

4. The method of claim 3, wherein said initial 3D reservoir simulator receives the saturation distribution from the fluid property and saturation model, the outside influences including the extent of the aquifer system from the initial reservoir conditions and aquifer model, the estimate of the 3D structure and property distribution from the digital 3D structure and property model, and the grid system from the 3D simulator grid system thereby creating an initial reservoir model in said initial 3D reservoir simulator.

5. The method of claim 4, further comprising:

determining whether the grid system that is superimposed on the rock model is a reliable representation of a property distribution that was developed in response to a geologic work including a set of volumes calculated from a geologic description in connection with other reservoir volume calculations.

6. The method of claim 5, further comprising:

indicating a corrected volume model when there is consistency in a set of initial volumes;

when there is no consistency in the initial volumes, manually adjusting the grid to ensure a proper representation between the grid system in the reservoir simulator and a geologic description; and when the grid is adjusted, identifying any uncertainties that are remaining.

7. The method of claim 6, further comprising:

adding constraints to said corrected volume model.

8. The method of claim 7, wherein the constraints include historical well data, well positioning, well trajectories, where the wells have completed over time, and the history of well production and injection.

9. The method of claim 7, further comprising:

executing a model through a historic period and obtaining a set of model responses to production and injection stimuli, the set of model responses being compared to the actual measured performance.

10. The method of claim 9, further comprising:

generating a history calibrated model;

comparing model performance to historical data;

making adjustments to model properties when the model performance does not reliably represent the historical data; and generating said history calibrated model when the model performance reliably represents the historical data.

11. A method of performing an analytical model study accurately forecast a production of a well in a reservoir, comprising:

receiving, using a computer system, a plurality of input data; and in response to the plurality of input data, utilizing an analytical approach to forecast a production of a well in a reservoir,
the plurality of input data including analogous reservoir performance, well drilling and completion histories, historic well performance trends, reservoir property and structure maps, and material balance volumes and aquifer model.

12. The method of claim 11, wherein said analytical approach to forecast the production of the well does not represent a modeling approach, and wherein said method of performing the analytical model study further comprises, responsive to the historic well performance trends, establishing at least one of a group consisting of a set of decline characteristics and a set of productivity characteristics from the historic well performance trends.

13. The method of claim 12, further compfising:
responsive to the historic well performance trends, mapping several performance indicators from the historic well performance trends.

14. The method of claim 13, further comprising:
receiving map displays and the reservoir property and structure maps and, responsive thereto, comparing a map of the conformance indictors set forth in the map displays with geological interpretations set forth in the reservoir property and structure maps.

15. The method of claim 14, further comprising:
identifying any opportunities to drill one or more infill wells, the opportunities to drill one or more infill wells being identified when the map of the conformance indictors, set forth in the map displays, does not compare or conform with the geological interpretations set forth in the reservoir property and structure maps.

16. The method of claim 15, further comprising:
determining how a set of performance trends of the well balance out with any estimates of fluid in place and pressure support from material balance equations, the set of performance trends being determined when the map of the conformance indictors, set forth in the map displays, does compare and conform with the geological interpretations set forth in the reservoir property and structure maps.

17. The method of claim 16, further comprising:
performing at least one of a group consisting of working over a well and installing an artificial lift in connection with said well, wherein future performance trends that are expected from existing wells are forecast using analytical methods.

18. The method of claim 17, further comprising:
identifying, from actual well performance, an average performance to be expected from existing wells; and
comparing individual wells to said average performance thereby identifying superior performing wells and poorer performing wells in a reservoir field,
wherein future performance trends that are expected from existing wells are forecast using analytical methods.

19. The method of claim 18, further comprising:
analytically forecasting, for said existing wells, what future performance trends of the reservoir field will be in the event no action is taken, wherein future performance trends, including decline characteristics, that are expected from existing wells are forecast using analytical methods.

20. The method of claim 19, further comprising:
generating a set of incremental production forecasts.

21. The method of claim 20, further comprising:
determining, from the decline characteristics of existing wells, a forecast of what an extra well, in a particular infill well location, will generate in terms of production.

22. The method of claim 21, further comprising:
checking a consistency of a set of forecasts with a set of estimates of the total amount of oil in place; and
generating a 'no' output when there are some differences and generating a 'yes' output when there is conformance between the set of forecasts and the set of estimates of the total amount of oil in place, thereby determining a forecast of what a reservoir field can produce.

23. A method of managing a reservoir, comprising:
determining, using a computer system, whether either a rigorous scientific approach associated with a numerical forecasting model should be used to build a numerical simulator for generating a production forecast or various standard analytical methods which are not associated with the numerical forecasting model should be used to generate the production forecast,
a numerical model studies step being performed when the rigorous scientific approach associated with the numerical forecasting model is used, and
an analytical model studies step being performed when the various standard analytical methods are used;
generating a revised development plan for the reservoir based on the production forecast; and
modifying field operations of the reservoir based on the revised development plan.

24. The method of claim 23, wherein the numerical model studies step is for utilizing a modeling approach to accurately forecast a production of a well, the numerical model studies step comprising:
usina a digital 3D structure and property model, providing an estimate of a 3D structure including a property distribution of the reservoir;
using a 3D simulator grid system, providing a grid system including a grid and layering mechanism that is superimposed on said 3D structure and said property distribution associated with the digital 3D structure and property model; and
using an initial 3D reservoir simulator, defining a rock model in a reservoir simulator in response to the estimate of the 3D structure and property distribution associated with the digital 3D structure and property model and the grid system associated with the 3D simulator grid system.

25. The method of claim 24, wherein the numerical model studies step further comprises:
using a fluid property and saturation model, superimposing a saturation distribution onto said rock model that is defined by the initial 3D reservoir simulator.

26. The method of claim 25, wherein the numerical model studies step further comprises:
using an initial reservoir conditions and aquifer model, defining outside influences, the outside influences including an extent of an aquifer system that is in fluid communication with an oil and/or gas accumulation.

27. The method of claim 26, wherein said initial 3D reservoir simulator receives the saturation distribution from the fluid property and saturation model, the outside influences including the extent of the aquifer system from the initial reservoir conditions and aquifer model, the estimate of the 3D structure and property distribution from the digital 3D structure and property model, and the grid system from the 3D simulator grid system thereby creating an initial reservoir model in said initial 3D reservoir simulator.

28. The method of claim 27, wherein the numerical model studies step further comprises:
using a volumes consistent step, determining whether the grid system that is superimposed on the rock model is a reliable representation of a property distribution that was developed in response to a geologic work including a set of volumes calculated from a geologic description in connection with other reservoir volume calculations.

29. The method of claim 28, wherein the numerical model studies step further comprises:
indicating a corrected volume model when there is consistency in a set of initial volumes;
when there is no consistency in the initial volumes, manually adjusting the grid to ensure a proper representation between the grid system in the reservoir simulator and a geologic description; and
when the grid is adjusted, identifying any uncertainties that are remaining.

30. The method of claim 29, wherein the numerical model studies step further comprises:
adding constraints to said corrected volume model.

31. The method of claim 30, wherein the constraints include historical well data, well positioning, well trajectories, where the wells have completed over time, and the history of well production and injection.

32. The method of claim 30, wherein the numerical model studies step further comprises:
running a model through a historic period; and
obtaining a set of model responses to the production and injection stimuli, the set of model responses being compared to actual measured performance.

33. The method of claim 32, wherein the numerical model studies step further comprises:
generating a history calibrated model;
comparing model performance to historical data;
making adjustments to model properties when the model performance does not reliably represent the historical data; and
generating said history calibrated model when the model performance does reliably represent the historical data.

34. The method of claim 23, the analytical model studies step further comprising:
receiving a plurality of input data; and
in response to the plurality of input data, utilizing an analytical approach to forecast a production of a well in a reservoir,
the plurality of input data including analogous reservoir performance, well drilling and completion histories, historic well performance trends, reservoir property and structure maps, and material balance volumes and aquifer model,
wherein the analytical model studies step utilizes an analytical approach to accurately forecast the production of the well in the reservoir.

35. The method of claim 34, wherein said analytical approach to forecast the production of the well does not represent a modeling approach, and wherein the analytical model studies step further comprises a well production decline characteristics step, responsive to the historic well performance trends, for establishing at least one of a group consisting of a set of decline characteristics and a set of productivity characteristics from the historic well performance trends.

36. The method of claim 35, wherein the analytical model studies step further comprises a map display, responsive to the historic well performance trends, for mapping several performance indicators from the historic well performance trends.

37. The method of claim 36, wherein the analytical model studies step further comprises receiving the map display and the reservoir property and structure maps and, responsive thereto, comparing the map of the conformance indictors set forth in the map displays with geological interpretations set forth in the reservoir property and structure maps.

38. The method of claim 37, wherein the analytical model studies step further comprises identifying any opportunities to drill one or more infill wells, each of the opportunities to drill one or more infill wells being identified on the condition that the map of the conformance indictors, set forth in the map display, does not compare or conform with the geological interpretations set forth in the reservoir property and structure maps.

39. The method of claim 38, wherein the analytical model studies step further comprises a volumetric and material balance fluids for determining how a set of performance trends of the well balance out with any estimates of fluid in place and pressure support from material balance equations, the performance trends being determined on the condition that the map of the conformance indictors, set forth in the map display, does compare and conform with the geological interpretations set forth in the reservoir property and structure maps.

40. The method of claim 39, wherein said well production decline characteristics step is forecasts by analytical methods future performance trends that are expected from existing wells, and wherein the analytical model studies step further comprises, responsive to the well production decline characteristics, selecting at least one of a group consisting of working over a well and installing an artificial lift in connection with said well.

41. The method of claim 40, wherein said well production decline characteristics step forecasts by analytical methods future performance trends that are expected from existing wells, and wherein the analytical model studies step further comprises, responsive to the well production decline characteristics, identifying, from actual well performance, an average performance to be expected from existing wells, and comparing individual wells to said average performance thereby identifying superior performing wells and poorer performing wells in a reservoir field.

42. The method of claim 41, wherein said well production decline characteristics step forecasts by analytical methods future performance trends including decline characteristics that are expected from existing wells, and wherein the analytical model studies step further comprises, responsive to the well production decline characteristics, analytically forecasting, for said existing wells, future performance trends of the reservoir field in the event no action is taken.

43. The method of claim 42, wherein the analytical model studies step further comprises, responsive to the well production decline characteristics step, generating a set of incremental production forecasts.

44. The method of claim 43, wherein the analytical model studies step further comprises, responsive to the well production decline characteristics step, determining, from the decline characteristics of existing wells, a forecast of what an extra well, in a particular infill well location, will generate in terms of production.

45. The method of claim 44, wherein the analytical model studies step further comprises:
receiving the current well forecasts and the infill forecasts;
checking for consistency of a set of forecasts with a set of estimates of the total amount of oil in place;
generating a 'no' output when there are some differences; and
generating a 'yes' output when there is conformance between the set of forecasts and the set of estimates of the total amount of oil in place,
thereby determining a forecast of what a reservoir field can produce.

* * * * *